United States Patent
Asada et al.

(10) Patent No.: US 6,674,702 B2
(45) Date of Patent: Jan. 6, 2004

(54) LASER DRIVE INTEGRATED CIRCUIT AND OPTICAL DISK APPARATUS USING THE SAME

(75) Inventors: Akihiro Asada, Chigasaki (JP); Hideo Ohnuki, Yokohama (JP); Masaaki Kurebayashi, Ebina (JP); Yasuhito Tanaka, Tokyo (JP); Toshimitsu Kaku, Sagamihara (JP); Takashi Hoshino, Yokohama (JP); Hidehiko Kando, Matsudo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/270,448

(22) Filed: Oct. 15, 2002

(65) Prior Publication Data
US 2003/0151995 A1 Aug. 14, 2003

Related U.S. Application Data

(63) Continuation of application No. 09/239,516, filed on Jan. 29, 1999, now Pat. No. 6,483,791.

(30) Foreign Application Priority Data

Feb. 2, 1998 (JP) .............................. 10-021041
Jul. 22, 1998 (JP) .............................. 10-206083

(51) Int. Cl.[7] .............................................. G11B 7/125
(52) U.S. Cl. .............................. 369/47.52; 369/44.12; 369/116; 369/121; 369/59.11; 372/38.02; 372/50
(58) Field of Search ..................... 369/47.52, 59.11, 369/44.12, 47.53, 116, 44.14, 112.04, 112.17, 44.23, 44.37, 44.29, 53.2, 44.27, 121; 250/205; 372/38.02, 31, 33, 38.01, 38.04, 50; 257/13

(56) References Cited

U.S. PATENT DOCUMENTS

| | | | |
|---|---|---|---|
| 5,216,659 A | 6/1993 | Call et al. | 369/116 |
| 5,418,770 A | 5/1995 | Ide et al. | 369/116 |
| 5,463,600 A | 10/1995 | Kirino et al. | 369/116 |
| 5,495,463 A | 2/1996 | Akagi et al. | 369/116 |
| 5,745,451 A | 4/1998 | Mukawa et al. | 369/116 |
| 5,777,964 A | 7/1998 | Furuta et al. | 369/116 |
| 5,790,491 A | 8/1998 | Jaquette et al. | 369/116 |
| 5,912,694 A * | 6/1999 | Miyake et al. | 347/247 |
| 6,049,073 A * | 4/2000 | Roddy et al. | 250/205 |
| 6,111,901 A * | 8/2000 | Taguchi et al. | 372/38.02 |
| 6,154,433 A | 11/2000 | Hoshino et al. | 369/112.04 |

FOREIGN PATENT DOCUMENTS

JP 8-147697 6/1996

* cited by examiner

Primary Examiner—William Korzuch
Assistant Examiner—Kim-Kwok Chu
(74) Attorney, Agent, or Firm—Antonelli, Terry, Stout & Kraus, LLP

(57) ABSTRACT

A laser drive circuit includes a first current supply unit which supplies a first drive current to a first laser diode based on a drive waveform signal generated by a drive waveform generating unit, a second current supply unit which supplies a second drive current to a second laser diode based on the drive waveform signal generated by the drive waveform generating unit, and a switching unit which selectively supplies the drive waveform signal generated by the drive waveform generating unit to one of the first current supply unit and the second current supply unit. The drive waveform generating unit may be part of the laser drive circuit, or may be separate from the laser drive circuit, and may include a drive waveform information storage unit which stores a recording strategy according to a type of disk.

20 Claims, 47 Drawing Sheets n : 3 , 4 , 5T OR MORE

ADDRESS CONVERSION    FIG.11A

| PATTERN NO. | PRECEDING SPACE LENGTH S(N-1) | SUCCEEDING SPACE LENGTH S(N) | DETECTION RESULT | | | | VALUE OF DAD 3,2,1,0 | |
|---|---|---|---|---|---|---|---|---|
| | | | DS3T | DS4T | DK3T | DK4T | CONVERSION (1) | CONVERSION (2) |
| Pn (3,3) | 3T | 3T | 1 | 0 | 1 | 0 | 0 | 10 |
| Pn (3,4) | 3T | 4T | 1 | 0 | 0 | 1 | 1 | 9 |
| Pn (3,5e) | 3T | 5T OR MORE | 1 | 0 | 0 | 0 | 2 | 8 |
| Pn (4,3) | 4T | 3T | 0 | 1 | 1 | 0 | 4 | 6 |
| Pn (4,4) | 4T | 4T | 0 | 1 | 0 | 1 | 5 | 5 |
| Pn (4,5e) | 4T | 5T OR MORE | 0 | 1 | 0 | 0 | 6 | 4 |
| Pn (5e,3) | 5T OR MORE | 3T | 0 | 0 | 1 | 0 | 8 | 2 |
| Pn (5e,4) | 5T OR MORE | 4T | 0 | 0 | 0 | 1 | 9 | 1 |
| Pn (5e,5e) | 5T OR MORE | 5T OR MORE | 0 | 0 | 0 | 0 | 10 | 0 |

FIG.11B

2-BIT ENCODING ( LOW - ORDER BIT )

| DK3T | DK4T | VALUE OF DAD 1,0 |
|---|---|---|
| 1 | 0 | 0 |
| 0 | 1 | 1 |
| 0 | 0 | 2 |

FIG.11C

2-BIT ENCODING (MID - ORDER BIT )

| DS3T | DS4T | VALUE OF DAD 3,2 |
|---|---|---|
| 1 | 0 | 0 |
| 0 | 1 | 1 |
| 0 | 0 | 2 |

FIG.12

CONVERSION (1)

| MEMORY ADDRESS | | MEMORY PATTERN |
|---|---|---|
| DAD 5,4 | DAD 3,2,1 | |
| 0 | 0 | P3 ( 3,3 ) |
| | 1 | P3 ( 3,4 ) |
| | 2 | P3 ( 3,5e ) |
| | 3 | ✳✳✳ |
| | 4 | P3 ( 4,3 ) |
| | 5 | P3 ( 4,4 ) |
| | 6 | P3 ( 4,5e ) |
| | 7 | ✳✳✳ |
| | 8 | P3 ( 5e,3 ) |
| | 9 | P3 ( 5e,4 ) |
| | 10 | P3 ( 5e,5e ) |
| | 11 | ✳✳✳ |
| | 12 | ✳✳✳ |
| | 13 | ✳✳✳ |
| | 14 | ✳✳✳ |
| | 15 | ✳✳✳ |
| 1 | 0 | P4 ( 3,3 ) |
| | 1 | P4 ( 3,4 ) |
| | ⋮ | ⋮ |
| | 10 | P4 ( 5e,5e ) |
| | ⋮ | ⋮ |
| | 15 | ✳✳✳ |
| 2 | 0 | P5e ( 3,3 ) |
| | 1 | P5e ( 3,4 ) |
| | ⋮ | ⋮ |
| | 10 | P5e ( 5e,5e ) |
| | ⋮ | ⋮ |
| | 15 | ✳✳✳ |

3T MARK 9 PATTERNS (addresses 0–10)

4T MARK 9 PATTERNS

5T MARK OR MORE 9 PATTERNS

FIG.14

CONVERSION (3)

| MEMORY ADDRESS | | MEMORY PATTERN |
|---|---|---|
| DAD 5,4 | DAD 3,2,1 | |
| 0 | 0 | P3 (3,3) |
| | 1 | P3 (3,4) |
| | 2 | P3 (3,5e) |
| | 3 | P3 (4,3) |
| | 4 | P3 (4,4) |
| | 5 | P3 (4,5e) |
| | 6 | P3 (5e,3) |
| | 7 | P3 (5e,4) |
| | 8 | P3 (5e,5e) |
| | 9 | P4 (3,3) |
| | 10 | P4 (3,4) |
| | 11 | P4 (3,5e) |
| | 12 | P4 (4,3) |
| | 13 | P4 (4,4) |
| | 14 | P4 (4,5e) |
| | 15 | P4 (5e,3) |
| 1 | 0 | P4 (5e,4) |
| | 1 | P4 (5e,5e) |
| | 2 | P5e (3,3) |
| | 3 | P5e (3,4) |
| | 4 | P5e (3,5e) |
| | 5 | P5e (4,3) |
| | 6 | P5e (4,4) |
| | 7 | P5e (4,5e) |
| | 8 | P5e (5e,3) |
| | 9 | P5e (5e,4) |
| | 10 | P5e (5e,5e) |
| | 11 | ✻✻✻ |
| | 12 | ✻✻✻ |
| | 13 | ✻✻✻ |
| | 14 | ✻✻✻ |
| | 15 | ✻✻✻ |

3T MARK 9 PATTERNS (addresses 0–8)

4T MARK 9 PATTERNS (addresses 9–15, then 0–1)

5T MARK OR MORE 9 PATTERNS (addresses 2–10)

FIG.16A

ADDRESS CONVERSION

| PATTERN NAME | PRECEDING SPACE LENGTH OR S(n-1) | SUCCEEDING SPACE LENGTH OR S(n) | DETECTION RESULT | | | | | | VALUE OF 4 LOW-ORDER BITS (DAD 3,2,1,0) |
|---|---|---|---|---|---|---|---|---|---|
| | | | DS3T | DS4T | DS5T | DS3T | DS4T | DS5T | |
| Pn(3, 3) | 3T | 3T | 1 | 0 | 0 | 1 | 0 | 0 | 0 |
| Pn(3, 4) | 3T | 4T | 1 | 0 | 0 | 0 | 1 | 0 | 1 |
| Pn(3, 5) | 3T | 5T | 1 | 0 | 0 | 0 | 0 | 1 | 2 |
| Pn(3, 6e) | 3T | 6T OR MORE | 1 | 0 | 0 | 0 | 0 | 0 | 3 |
| Pn(4, 3) | 4T | 3T | 0 | 1 | 0 | 1 | 0 | 0 | 4 |
| Pn(4, 4) | 4T | 4T | 0 | 1 | 0 | 0 | 1 | 0 | 5 |
| Pn(4, 5) | 4T | 5T | 0 | 1 | 0 | 0 | 0 | 1 | 6 |
| Pn(4, 6e) | 4T | | 0 | 1 | 0 | 0 | 0 | 0 | 7 |
| Pn(5, 3) | 5T | 3T | 0 | 0 | 1 | 1 | 0 | 0 | 8 |
| Pn(5, 4) | 5T | 4T | 0 | 0 | 1 | 0 | 1 | 0 | 9 |
| Pn(5, 5) | 5T | 5T | 0 | 0 | 1 | 0 | 0 | 1 | 10 |
| Pn(5, 6e) | 5T | 6T OR MORE | 0 | 0 | 1 | 0 | 0 | 0 | 11 |
| Pn(6, 3) | 6T OR MORE | 3T | 0 | 0 | 0 | 1 | 0 | 0 | 12 |
| Pn(6, 4) | 6T OR MORE | 4T | 0 | 0 | 0 | 0 | 1 | 0 | 13 |
| Pn(6, 5) | 6T OR MORE | 5T | 0 | 0 | 0 | 0 | 0 | 1 | 14 |
| Pn(6, 6e) | 6T OR MORE | 6T OR MORE | 0 | 0 | 0 | 0 | 0 | 0 | 15 |

FIG.16B

2-BIT ENCODING (LOW-ORDER BIT)

| DK3T | DK4T | DK5T | VALUE OF DAD 1,0 |
|---|---|---|---|
| 1 | 0 | 0 | 0 |
| 0 | 1 | 0 | 1 |
| 0 | 0 | 1 | 2 |
| 0 | 0 | 0 | 3 |

FIG.16C

2-BIT ENCODING (MID-ORDER BIT)

| DS3T | DS4T | DS5T | VALUE OF DAD 3,2 |
|---|---|---|---|
| 1 | 0 | 0 | 0 |
| 0 | 1 | 0 | 1 |
| 0 | 0 | 1 | 2 |
| 0 | 0 | 0 | 3 |

FIG.17

CONVERSION (4)

| MEMORY ADDRESS | | MEMORY PATTERN | |
|---|---|---|---|
| DAD5, 4 | DAD3, 2, 1, 0 | | |
| 0 | 0 | P3(3, 3) | 3T MARK 16 PATTERNS |
| | 1 | P3(3, 4) | |
| | 2 | P3(3, 5) | |
| | 3 | P3(3, 6e) | |
| | 4 | P3(4, 3) | |
| | 5 | P3(4, 4) | |
| | 6 | P3(4, 5) | |
| | 7 | P3(4, 6e) | |
| | 8 | P3(5, 3) | |
| | 9 | P3(5, 4) | |
| | 10 | P3(5, 5) | |
| | 11 | P3(5, 6e) | |
| | 12 | P3(6e, 3) | |
| | 13 | P3(6e, 4) | |
| | 14 | P3(6e, 5) | |
| | 15 | P3(6e, 6e) | |
| 1 | 0 | P4(3, 3) | 4T MARK 16 PATTERNS |
| | 1 | P4(3, 4) | |
| | ⋮ | ⋮ | |
| | ⋮ | ⋮ | |
| | 15 | P4(6e, 6e) | |
| 2 | 0 | P5(3, 3) | 5T MARK 16 PATTERNS |
| | 1 | P5(3, 4) | |
| | ⋮ | ⋮ | |
| | ⋮ | ⋮ | |
| | 15 | P5(6e, 6e) | |
| 3 | 0 | P6e(3, 3) | 6T MARK OR MORE 16 PATTERNS |
| | 1 | P6e(3, 4) | |
| | ⋮ | ⋮ | |
| | ⋮ | ⋮ | |
| | 15 | P6e(6e, 6e) | |

FIG. 18

W = Pw
C1 = Pc1
C2 = Pc2
Er = Pers
C3 = Pc3
S = Pshut
B = Pb

| | PATTERN NAME | PACKET 0 | | | PACKET 1 | | | PACKET 2 | | | PACKET 3 | | | PACKET 4 | | | PACKET 5 | | |
|---|---|---|---|---|---|---|---|---|---|---|---|---|---|---|---|---|---|---|---|
| | | L10 | L20 | RL0 | L11 | L21 | RL1 | L12 | L22 | RL2 | L13 | L23 | RL3 | L14 | L24 | RL4 | L15 | L25 | RL5 |
| (1) 3T MARK | P3(3,3) | ER | C1 | 1 | * | * | 0 | C1 | S | 1 | S | S | 1 | S | Er | 1 | Er | Er | 1 |
| | P3(3,4) | ER | C1 | 1 | * | * | 0 | C1 | S | 1 | S | S | 1 | C3 | Er | 1 | Er | Er | 1 |
| | P3(3,5e) | ER | C2 | 1 | * | * | 0 | C2 | S | 1 | S | S | 1 | Er | Er | 1 | Er | Er | 1 |
| | P3(4,3) | ER | W | 1 | * | * | 0 | C1 | S | 1 | S | S | 1 | S | Er | 1 | Er | Er | 1 |
| | P3(4,4) | ER | W | 1 | * | * | 0 | C1 | S | 1 | S | S | 1 | C3 | Er | 1 | Er | Er | 1 |
| | P3(4,5e) | ER | W | 1 | * | * | 0 | C1 | S | 1 | S | S | 1 | Er | Er | 1 | Er | Er | 1 |
| | P3(5e,3) | ER | W | 1 | * | * | 0 | W | S | 1 | S | S | 1 | S | Er | 1 | Er | Er | 1 |
| | P3(5e,4) | ER | W | 1 | * | * | 0 | W | S | 1 | S | S | 1 | C3 | Er | 1 | Er | Er | 1 |
| | P3(5e,5e) | ER | W | 1 | * | * | 0 | W | S | 1 | S | S | 1 | Er | Er | 1 | Er | Er | 1 |
| (2) 4T MARK | P4(3,3) | C1 | C1 | 1 | S | W | 1 | W | S | 1 | S | S | 1 | S | Er | 1 | Er | Er | 1 |
| | P4(3,4) | C1 | C1 | 1 | S | W | 1 | W | S | 1 | S | S | 1 | C3 | Er | 1 | Er | Er | 1 |
| | P4(3,5e) | C2 | C2 | 1 | B | W | 1 | W | S | 1 | S | S | 1 | Er | Er | 1 | Er | Er | 1 |
| | P4(4,3) | W | C1 | 1 | S | W | 1 | W | S | 1 | S | S | 1 | S | Er | 1 | Er | Er | 1 |
| | P4(4,4) | W | C1 | 1 | S | W | 1 | W | S | 1 | S | S | 1 | C3 | Er | 1 | Er | Er | 1 |
| | P4(4,5e) | W | C1 | 1 | S | W | 1 | W | S | 1 | S | S | 1 | Er | Er | 1 | Er | Er | 1 |
| | P4(5e,3) | W | W | 1 | B | W | 1 | W | S | 1 | S | S | 1 | S | Er | 1 | Er | Er | 1 |
| | P4(5e,4) | W | W | 1 | B | W | 1 | W | S | 1 | S | S | 1 | C3 | Er | 1 | Er | Er | 1 |
| | P4(5e,5e) | W | W | 1 | B | W | 1 | W | S | 1 | S | S | 1 | Er | Er | 1 | Er | Er | 1 |
| (3) 5T MARK OR MORE | P5e(3,3) | C1 | C1 | 1 | S | W | 1 | W | S | 1 | S | S | 1 | S | Er | 1 | Er | Er | 1 |
| | P5e(3,4) | C1 | C1 | 1 | S | W | 1 | W | S | 1 | S | S | 1 | C3 | Er | 1 | Er | Er | 1 |
| | P5e(3,5e) | C2 | C2 | 1 | B | W | 1 | W | S | 1 | S | S | 1 | Er | Er | 1 | Er | Er | 1 |
| | P5e(4,3) | W | C1 | 1 | S | W | 1 | W | S | 1 | S | S | 1 | S | Er | 1 | Er | Er | 1 |
| | P5e(4,4) | W | C1 | 1 | S | W | 1 | W | S | 1 | S | S | 1 | C3 | Er | 1 | Er | Er | 1 |
| | P5e(4,5e) | W | C1 | 1 | S | W | 1 | W | S | 1 | S | S | 1 | Er | Er | 1 | Er | Er | 1 |
| | P5e(5e,3) | W | W | 1 | B | W | 1 | W | S | 1 | S | S | 1 | S | Er | 1 | Er | Er | 1 |
| | P5e(5e,4) | W | W | 1 | B | W | 1 | W | S | 1 | S | S | 1 | C3 | Er | 1 | Er | Er | 1 |
| | P5e(5e,5e) | W | W | 1 | B | W | 1 | W | S | 1 | S | S | 1 | Er | Er | 1 | Er | Er | 1 |

PATTERN DESCRIPTION

FIG.21A

| TOP(1) SECTION | PACKET 0 | |
|---|---|---|
| PATTERN NAME | L0 | RL0 |
| PT1-0 | Er | 1 |
| PT1-1 | * | 0 |

| PATTERN CODE PT1 |
|---|
| 0 |
| 1 |

FIG.21B

| TOP(2) SECTION | PACKET 0 | | PACKET 1 | |
|---|---|---|---|---|
| PATTERN NAME | L0 | RL0 | L1 | RL1 |
| PT2-0 | W | 2 | * | 0 |
| PT2-1 | W | 1 | C1 | 0 |
| PT2-2 | C2 | 2 | * | 0 |
| PT2-3 | C1 | 2 | * | 0 |
| PT2-4 | W | 1 | C2 | 0 |

| PATTERN CODE PT2 |
|---|
| 000 |
| 001 |
| 010 |
| 011 |
| 100 |

FIG.21C

| RPEAT SECTION | PACKET 0 | |
|---|---|---|
| PATTERN NAME | L1 | L2 |
| PMR-0 | B | W |
| PMR-1 | S | W |

| PATTERN CODE PMR |
|---|
| 0 |
| 1 |

FIG.21D

| TAIL SECTION | PACKET 0 | | PACKET 1 | |
|---|---|---|---|---|
| PATTERN NAME | L0 | RL0 | L1 | RL1 |
| PTa-0 | * | 0 | S | 3 |
| PTa-1 | W | 1 | S | 3 |

| PATTERN CODE PTa |
|---|
| 0 |
| 1 |

FIG.21E

| SPACE SECTION | PACKET 0 | | PACKET 1 |
|---|---|---|---|
| PATTERN NAME | L0 | RL0 | L1 |
| PS-0 | Er | 1 | Er |
| PS-1 | S | 1 | Er |
| PS-2 | C3 | 1 | Er |

| PATTERN CODE PS |
|---|
| 00 |
| 01 |
| 10 |

FIG.22

| | PATTERN NAME | PATTERN DESCRIPTION | | | | |
|---|---|---|---|---|---|---|
| | | PcT1 | PcT1 | PcMR | PcTa | PcS |
| (1) 3T MARK | P3(3, 3) | 0 | 011 | * | 0 | 01 |
| | P3(3, 4) | 0 | 011 | * | 0 | 10 |
| | P3(3, 5e) | 0 | 010 | * | 0 | 00 |
| | P3(4, 3) | 0 | 001 | * | 0 | 01 |
| | P3(4, 4) | 0 | 001 | * | 0 | 10 |
| | P3(4, 5e) | 0 | 001 | * | 0 | 00 |
| | P3(5e, 5e) | 0 | 000 | * | 0 | 00 |
| | P3(5e, 3) | 0 | 000 | * | 0 | 01 |
| | P3(5e, 4) | 0 | 000 | * | 0 | 01 |
| (2) 4T MARK | P4(3, 3) | 1 | 011 | 1 | 1 | 01 |
| | P4(3, 4) | 1 | 011 | 1 | 1 | 10 |
| | P4(3, 5e) | 1 | 010 | 0 | 1 | 00 |
| | P4(4, 3) | 1 | 001 | 1 | 1 | 01 |
| | P4(4, 4) | 1 | 001 | 1 | 1 | 10 |
| | P4(4, 5e) | 1 | 001 | 0 | 1 | 00 |
| | P4(5e, 3) | 1 | 000 | 0 | 1 | 01 |
| | P4(5e, 4) | 1 | 000 | 0 | 1 | 10 |
| | P4(5e, 5e) | 1 | 000 | 0 | 1 | 00 |
| (3) 5T MARK OR MORE | P5e(3, 3) | 1 | 011 | 1 | 1 | 01 |
| | P5e(3, 4) | 1 | 011 | 1 | 1 | 10 |
| | P5e(3, 5e) | 1 | 100 | 0 | 1 | 00 |
| | P5e(4, 3) | 1 | 001 | 1 | 1 | 01 |
| | P5e(4, 4) | 1 | 001 | 1 | 1 | 10 |
| | P5e(4, 5e) | 1 | 001 | 0 | 1 | 00 |
| | P5e(5e, 3) | 1 | 000 | 0 | 1 | 01 |
| | P5e(5e, 4) | 1 | 000 | 0 | 1 | 10 |
| | P5e(5e, 5e) | 1 | 000 | 0 | 1 | 00 |

*: DON'T CARE

FIG.29

DECODER LOGIC EXAMPLE

| DATA VALUE | SW1 | SW2 | SW3 | SW4 | SW5 | SW6 | SW7 |
|---|---|---|---|---|---|---|---|
| 0 | ON | ON | ON | ON | ON | ON | ON |
| 1 |  | ON | ON | ON | ON | ON | ON |
| 2 |  |  | ON | ON | ON | ON | ON |
| 3 |  |  |  | ON | ON | ON | ON |
| 4 |  |  |  |  | ON | ON | ON |
| 5 |  |  |  |  |  | ON | ON |
| 6 |  |  |  |  |  |  | ON |
| 7 |  |  |  |  |  |  |  |

FIG.37

| PERIOD | M/S | CP-1 | L-1 | CP-2 | L-2 | R-FLAG | PACKET FUNCTION |
|---|---|---|---|---|---|---|---|
| ① | M | 0 | PER | TPRE | PPRE | 0 | 1) PRE PULSE PACKET |
| ② | M | TTOP | PW | N.C | * | 0 | 2) TOP PULSE PACKET |
| ③ | M | 0 | PW | TMP | PB | 1 | 3) MULTI PULSE REPEAT PACKET |
| ④ | M | 0 | PW | TMP | PB | 1 | 3) MULTI PULSE REPEAT PACKET |
| ⑤ | M | 0 | PW | TCL | PCL | 0 | 4) COOLING PULSE PACKET |
| ⑥ | S | 0 | PCL | TER | PER | 0 | 5) ERASE PULSE PACKET |
| ⑦ | S | N.C | * | N.C | * | 0 | 6) PRECEDING VALUE HOLD PACKET |
| ⑧ | S | N.C | * | N.C | * | 1 | 7) PRECEDING VALUE HOLD REPEAT PACKET |
| ⑨ | M | 0 | PER | TPRE | PPRE | 0 | 1) PRE PULSE PACKET |
| ⑩ | M | TTOP | PW | N.C | * | 0 | 2) TOP PULSE PACKET |
| ⑪ | M | 0 | PW | TCL | PCL | 0 | 4) COOLING PULSE PACKET |
| ⑫ | S | 0 | PCL | TER | PER | 0 | 5) ERASE PULSE PACKET |
| ⑬ | S | N.C | * | N.C | * | 0 | 6) PRECEDING VALUE HOLD PACKET |
| ⑭ | S | N.C | * | N.C | * | 1 | 7) PRECEDING VALUE HOLD REPEAT PACKET |
| ⑮ | S | — | — | — | — | — | — |

N.C : NO LEVEL CHANGE POINT IN PERIOD

LASER DRIVE INTEGRATED CIRCUIT AND OPTICAL DISK APPARATUS USING THE SAME

This application is a continuation of application Ser. No. 09/239,516 filed on Jan. 29, 1999, now issued as U.S. Pat. No. 6,483,791, the contents of which are hereby incorporated herein by reference in their entirety.

BACKGROUND OF THE INVENTION

The present invention relates to a recordable optical disk apparatus, and in particular to a laser drive integrated circuit for controlling a pulse-segmented laser drive waveform of multi-valued levels, or more in particular to a laser drive integrated circuit and an optical disk apparatus with the laser drive integrated circuit mounted thereon, in which the operation can be switched at high speed and high accuracy in keeping with various drive waveforms.

In recent years, an optical disk recording and reproduction system higher in density has been in demand. The basic principle of an optical disk lies in the on/off control in which the laser is radiated when recording data corresponding to "1" of information and the laser is not radiated when recording data corresponding to "0" of information.

The techniques now essential to meet this trend includes the single-beam overwrite technique (the recorded data is erased while recording new data with a single laser beam) and the technique called the write strategy in which the recording power is controlled by pulse segmentation into multi-valued levels for controlling the recording mark shape to improve the density. These techniques increase the number of data input to the laser driver. A simple on/off control requires only one data. In a waveform requiring an intermediate level for overwrite operation or waveform control in which high-density marks are formed, however, the switching of a plurality of currents is required.

A conventional method, as disclosed in JP-A-8-147697, for example, has additional data for on/off control of intermediate power and requires a total of four current control systems. For the recent method of recording mark control for high density, the recording power level is controlled to three-valued or more levels and therefore the number of data is increased to four or five. To follow the future trend toward a still higher density, an even greater number of data are required.

SUMMARY OF THE INVENTION

In the future, a higher data transfer rate and a greater detail of segmentation of pulse width will be required for an increased number of power levels.

Also, an optical disk apparatus will be required to change the laser drive waveform adaptively in accordance with the recording/reproduction characteristic of the disk, to improve the data reliability by recording the data in an optimum drive waveform, and to make various disks recordable in keeping with various drive waveforms caused by different recording materials of the disk.

Normally, in an optical disk apparatus, a pickup makes up a movable unit and a signal control system constitutes a fixed unit. Also, a laser drive unit is arranged in the neighborhood of a laser diode mounted on the pickup. The portion from the signal control unit to the laser drive unit is wired using a flexible cable or the like. The flexible cable is used for transmission of the servo signal as well as the laser drive signal, and requires at least a length larger than the disk radius due to the fact that the pickup constitutes a movable unit.

In the above-mentioned prior art, an increased number of levels of waveform control leads to a correspondingly increased number of lines for laser drive control. This in turn increases the size of the flexible cable, thereby making it difficult to secure the space for accommodating the flexible cable. Another problem is a lengthened flexible cable laid about.

Also, a finer pulse segmentation for high-density recording increases the clock frequency for pulse segmentation control. An increased clock frequency with a lengthened flexible cable or a smaller width of each line leads to the problem of the distortion or delay of the transmission waveform, etc. This affects the pulse rise and fall rate, and the laser emission at the desired timing becomes impossible. Thus, the mark shape and the mark position accuracy are adversely affected, resulting in a data error.

Still another problem is the unrequired radiation from the cable which causes a noise.

In order to solve the above-mentioned problems, according to the present invention, there is provided a laser drive integrated circuit and an optical disk apparatus using such a circuit, comprising drive waveform information storage means for storing at least one information on the drive waveform for driving a laser diode in accordance with a binary recording signal recorded in a recording medium, a drive waveform decoder for decoding the drive waveform based on the information stored in the drive waveform information storage means, an address generator for selecting the drive waveform information of the drive waveform information storage means based on the binary recording signal recorded in the recording medium, and control means for causing the drive waveform information supplied from an external source to be stored in the drive waveform information storage means.

BRIEF DESCRIPTION OF THE DRAWINGS

FIGS. 11A, 11B, 11C are diagrams showing the relation between the result of transition detection for 9 patterns of 3T, 4T, 5T or more and a memory address in the first configuration of the address generator.

FIG. 12 is a diagram showing the relation between a memory address and a storage pattern corresponding to the address conversion in FIGS. 11A, 11B, 11C.

FIG. 14 is a diagram showing the relation between a memory address and a storage pattern corresponding to the address conversion in FIG. 13.

FIGS. 16A, 16B, 16C are diagrams showing the relation between the result of detection for 3T, 4T, 5T, 6T or more and a memory address in the third configuration of the address generator.

FIG. 17 is a diagram showing the relation between a memory address and a storage pattern corresponding to the address conversion in FIG. 15.

FIG. 18 is a diagram showing a drive waveform described with a packet train for each pattern of 3T mark, 4T mark and 5T mark or more in the case where there are 9 mark/space state transitions.

FIGS. 21A to 21E are diagrams showing an example in which the partial pattern of each of the five portions into which the drive waveform is segmented is described with packets.

FIG. 22 is a diagram showing an example in which the drive waveform is described using the pattern code of the partial pattern of FIGS. 21A to 21E.

FIG. 29 is a diagram showing a logic example of a 3-to-8 decoder.

FIG. 37 is a diagram showing an example of description of the drive waveform for a laser diode according to the fourth and fifth embodiments.

DESCRIPTION OF THE PREFERRED EMBODIMENTS

Embodiments of the invention will be explained below with reference to the drawings.

(1) First Embodiment (1.1) Configuration of First Embodiment

Figure 1:
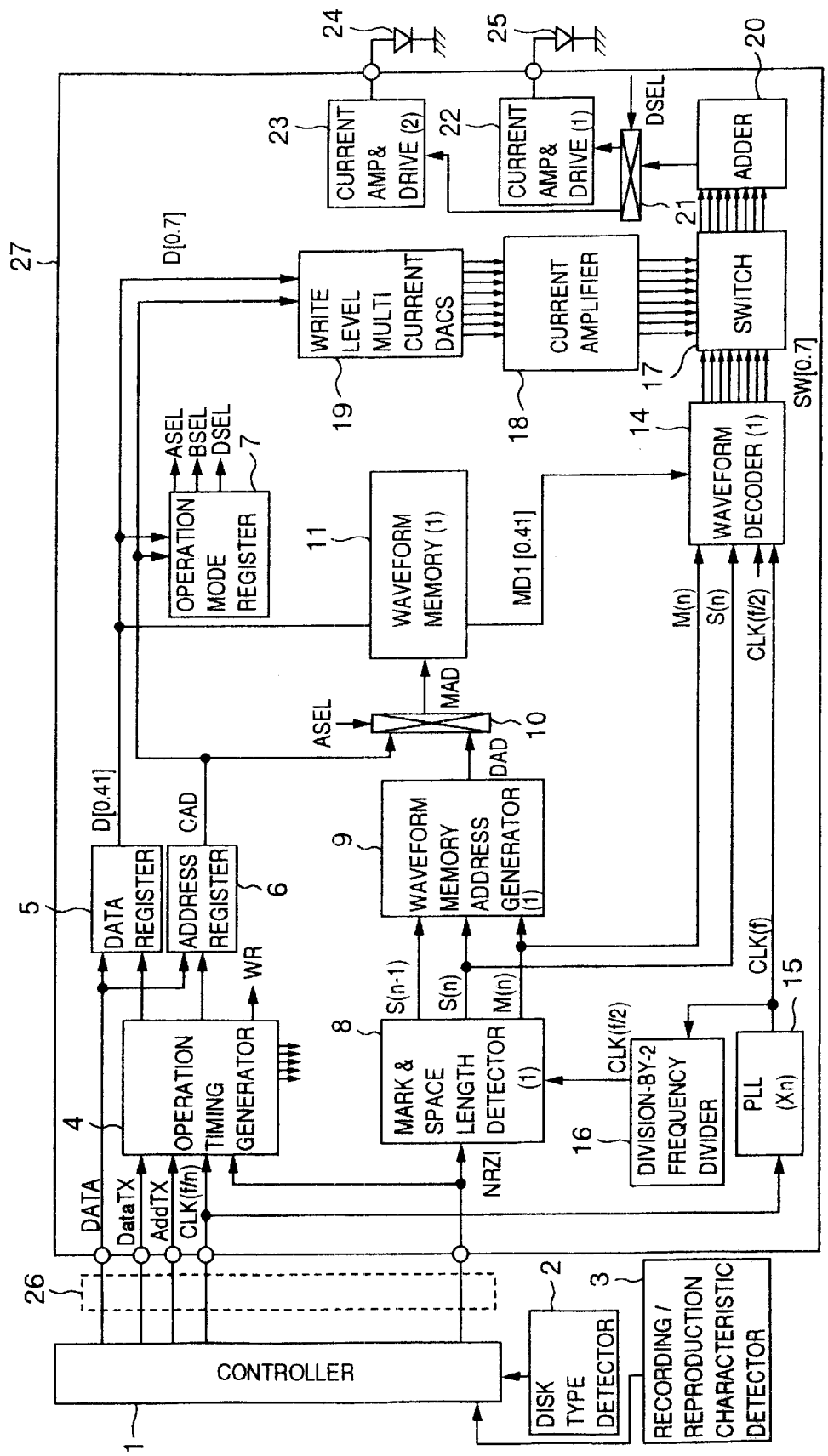
FIG. 1 is a diagram showing a configuration according to a first embodiment of the invention.

FIG. 1 is a diagram showing a configuration of a laser drive integrated circuit and an optical disk apparatus on which the laser drive integrated circuit is mounted according to a first embodiment of the invention. Reference numeral 1 designates a controller, numeral 2 disk type detector (detection means) for detecting the type of the disk, and numeral 3 recording/reproduction characteristic detector (detection means) for detecting the recording and reproduction characteristics of the disk. These component parts are arranged on the fixed unit side (main substrate) of the optical disk apparatus. Numeral 27 designates a laser drive integrated circuit mounted on an optical pickup together with a first laser diode 25 and a second laser diode 24. The laser drive integrated circuit is movable in accordance with the recording/reproduction track position of the disk. The fixed unit side and the movable unit side are supplied with signals through flexible cables 26. The remaining component parts are not shown. When the information are recorded in the disk in response to a command from a host, the recording data from the host are recorded in the disk with the optical pickup by the laser drive circuit through a modulation circuit. On the other hand, the signal read by the optical pickup is demodulated into the original data through a reproduction circuit and a demodulation circuit, and the demodulated data are transferred to the host through the controller.

The laser drive integrated circuit 27 is made up of mark/space length detector (mark and space length detecting means) 8 for detecting the mark length and the space length from a binary recording signal NRZI supplied from the controller 1, waveform memory address generator 9 for outputting an address signal DAD based on the detection result of the mark/space length detector 8, drive waveform storage (drive waveform storing means) (1) 11 for outputting the drive waveform information selected in accordance with the address signal DAD, drive waveform decoder (1) 14 for decoding the laser drive waveform based on the output information of the drive waveform storage (1) 11, a switch 17 controlled by the output signal of the drive waveform decoder (1) 14, current setting unit (write level multi current DACs) 19 for outputting an eight-channel current corresponding to a set current value from the controller 1, current amplifier (amplifier means) 18 for amplifying the output current of the current setting unit 19, adder (adding means) 20 for adding the currents through the switch 17, switching unit (switching means) 21 for supplying the output value of the adder 20 to either a drive unit (current amplifier and drive) (1) 22 for current-driving the laser diode 25 or a drive unit (current amplifier and drive) (2) 23 for current-driving the laser diode 24, a multiplication-by-n frequency multiplier circuit (PLL (Xn)) 15 for outputting a clock signal CLK(f) which is an n multiple of the clock signal CLK(f/n) supplied from the controller 1, a division-by-two frequency divider circuit 16 for outputting a clock signal CLK(f/2) obtained by dividing the frequency of the clock signal CLK(f) in half, a data register 5 for receiving data corresponding to the data section by the DATA signal supplied from the controller 1 through a single signal line, an address register 6 for receiving an address value corresponding to the address section from the DATA signal, drive waveform information storage (waveform memory) 11 for storing the timing of receiving the signal by the data register 5 and the address register 6 and the data of the data register 5 as the data corresponding to the address value of the address register 6 based on the signal DataTX indicating the data transfer section, the signal AddTX indicating the address transfer section, the clock signal CLK(f/n) and a record binary signal supplied from the controller 1, timing generator 4 for outputting a control signal WR written in the current setting unit 19 and an operation mode register, and the operation mode register 7 for setting the operation mode of the laser drive integrated circuit 27.

(1.2) Operation of First Embodiment

The operation and various parts of the first embodiment will be explained in detail below.

Figure 4:
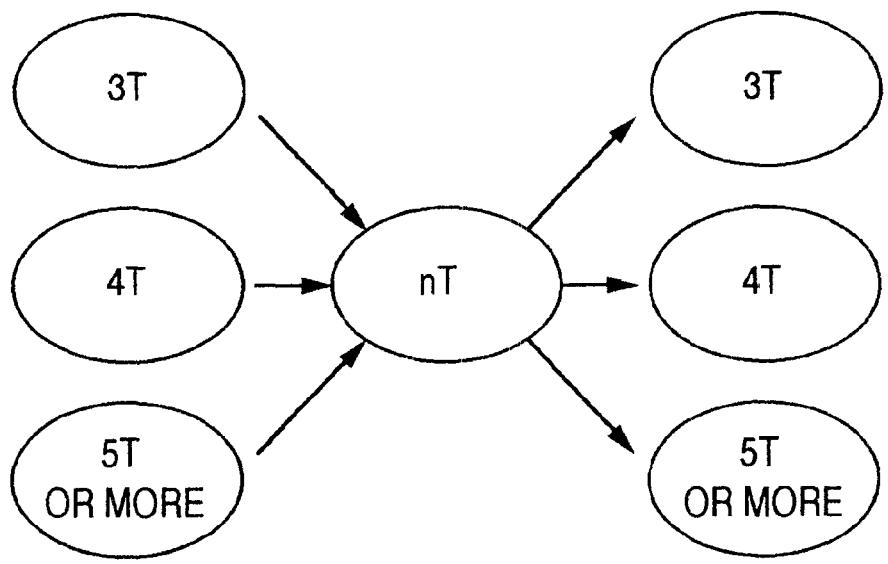
FIG. 4 is a first diagram showing the status transition of the mark length and the space length of a binary recording signal.

(1.2.1) Preceding and Succeeding Space Lengths Recording Mark Length and Laser Drive Waveform According to this embodiment, as shown in FIG. 4, the laser drive waveform of mark length of the binary recording signal NRZI is changed by the adjacent space length thereby to reduce the jitter at the mark edge on a recording medium. In the mark section, the laser power is increased and multi-pulses are used for driving the laser diode, while in the space section, the laser diode is driven with the power (smaller than the power for mark recording) for erasing the mark and space already recorded in the medium. When recording a mark, the edge of the mark is variously changed according to the adjacent space length under the thermal effect of the adjacent space length on the medium. In order to avoid this, the recording waveform of the mark section is changed taking the adjacent space length into account. The mark length and the space length are changed to any one of 3T to 11T (nine ways) (T is a minimum unit time of change of the binary recording signal NRZI and corresponds to the period of the clock CLK(f/2)). When recording the mark length 3T, therefore, 81 (=9×9) combinations of the adjacent space lengths including the preceding space and the succeeding space are available. When including the mark lengths of 3T to 11T, as many as 729 (=81×9) drive waveforms are available. In the case where the adjacent space length is more than a predetermined value, however, the thermal effect is small. In FIG. 4, the preceding space length for the mark length nT assumes three of 3T, 4T and 5T or more, and so is the succeeding space length. Therefore, nine combinations of the adjacent space lengths are available. There are three mark lengths, so that 27 (=3×9) drive waveforms are used.

(1.2.2) Mark/Space Length Detector

Figure 8:
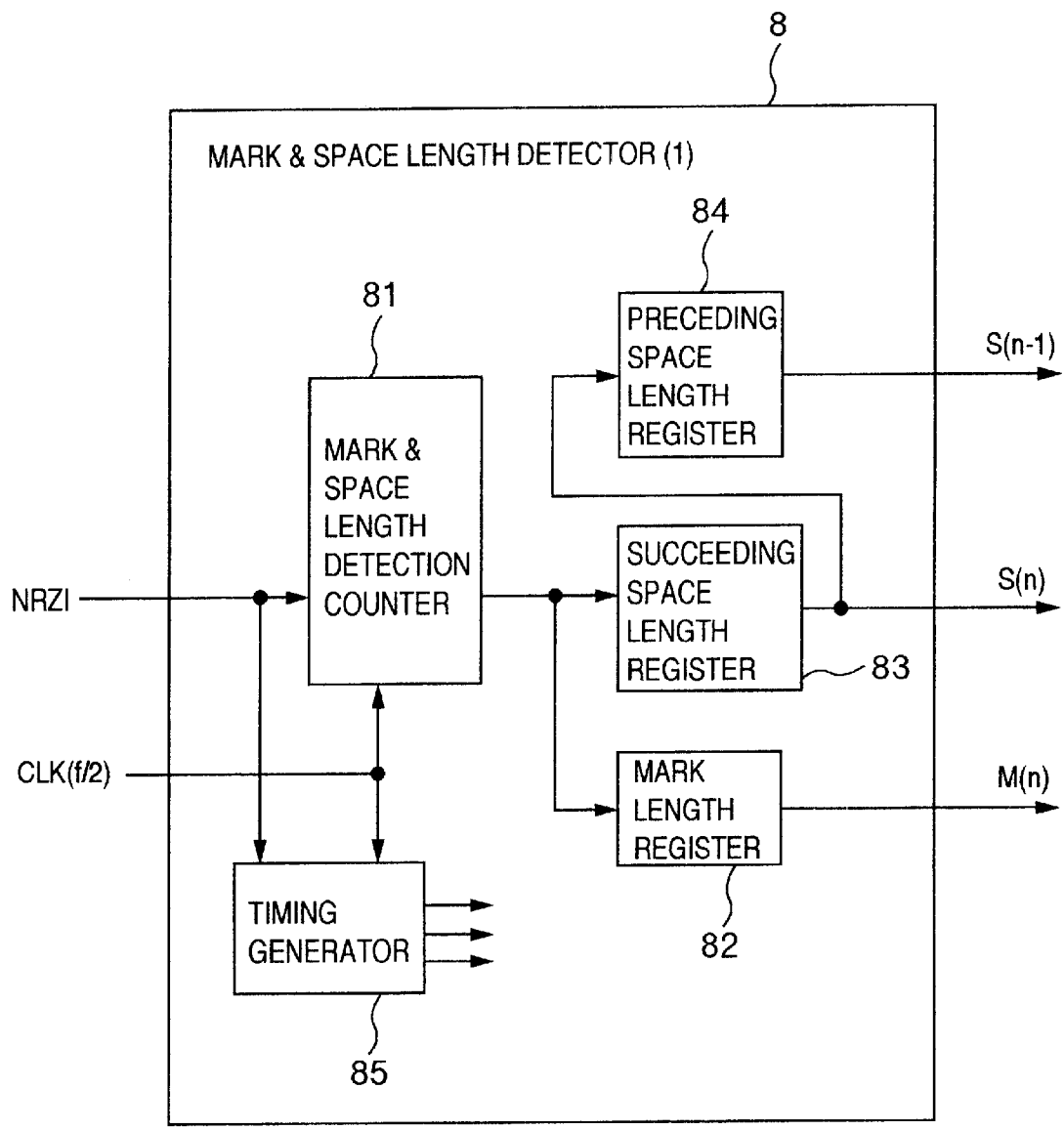
FIG. 8 is a diagram showing a configuration of a mark/space length detector.
Figure 9:
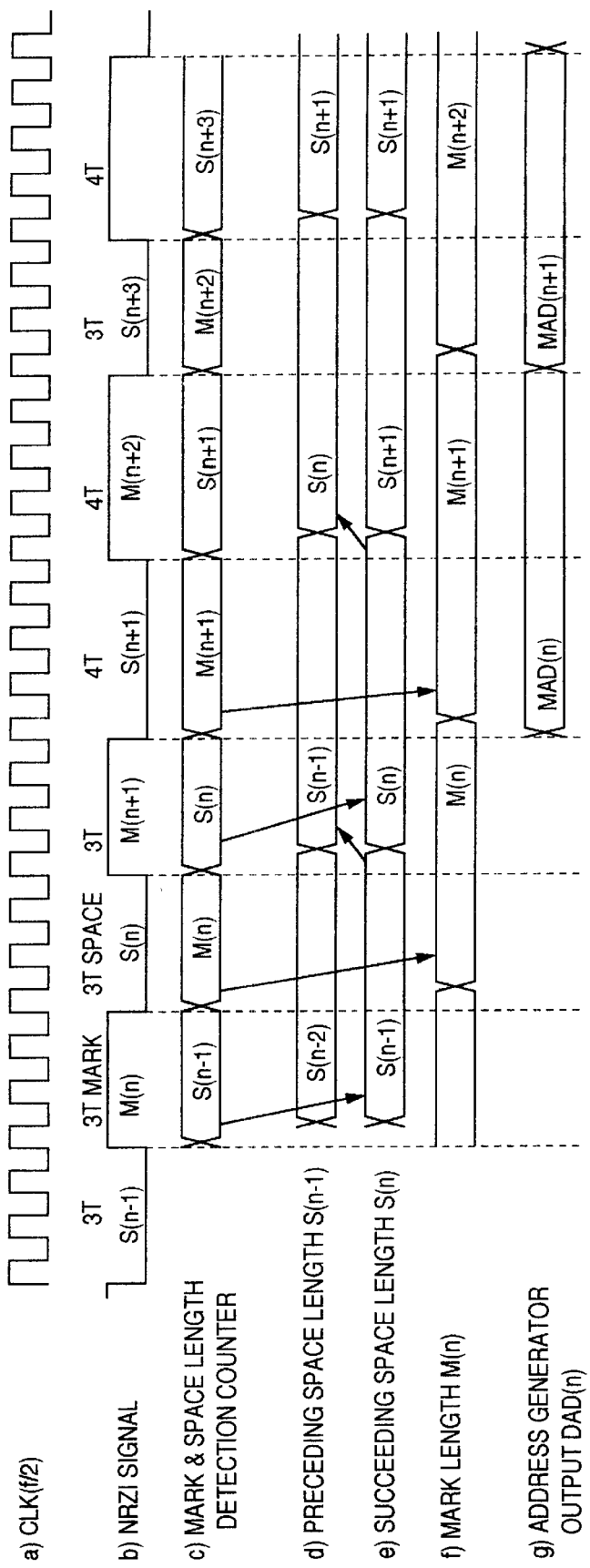
FIG. 9 is a diagram showing the operation timing of the mark/space length detector.

FIG. 8 shows a configuration of the mark/space length detector (1) 8, and FIG. 9 shows the operation timing thereof. A mark/space length detection counter 81 counts and outputs the mark length (high-level section) and the space length (low-level section) of the binary recording signal NRZI supplied from the controller 1 by the clock CLK(f/2) (shown in FIG. 9c). A mark length register 82 receives the mark length detection value in response to the timing signal of the timing generator 85. A succeeding space length register 83 similarly receives the space length. The space length already received is supplied to the preceding space length register 84. As shown in FIG. 9 at (d), (e) and (f), in accordance with the change in the NRZI signal, the mark length register 82 outputs the present mark length M(n), the preceding space length register 84 outputs the space length S(N−1) preceding to the present mark, and the succeeding space length register 83 outputs the space length S(n) succeeding to the present mark.

(1.2.3) Address Generator

The address generator 9 generates an address stored in the drive waveform information storage (1) 11 for the drive waveform to be selected, based on the mark length M(n), the preceding space length S(n−1) and the succeeding space length S(n).

(1.2.3.1) Address Generator (1)

Figure 10:
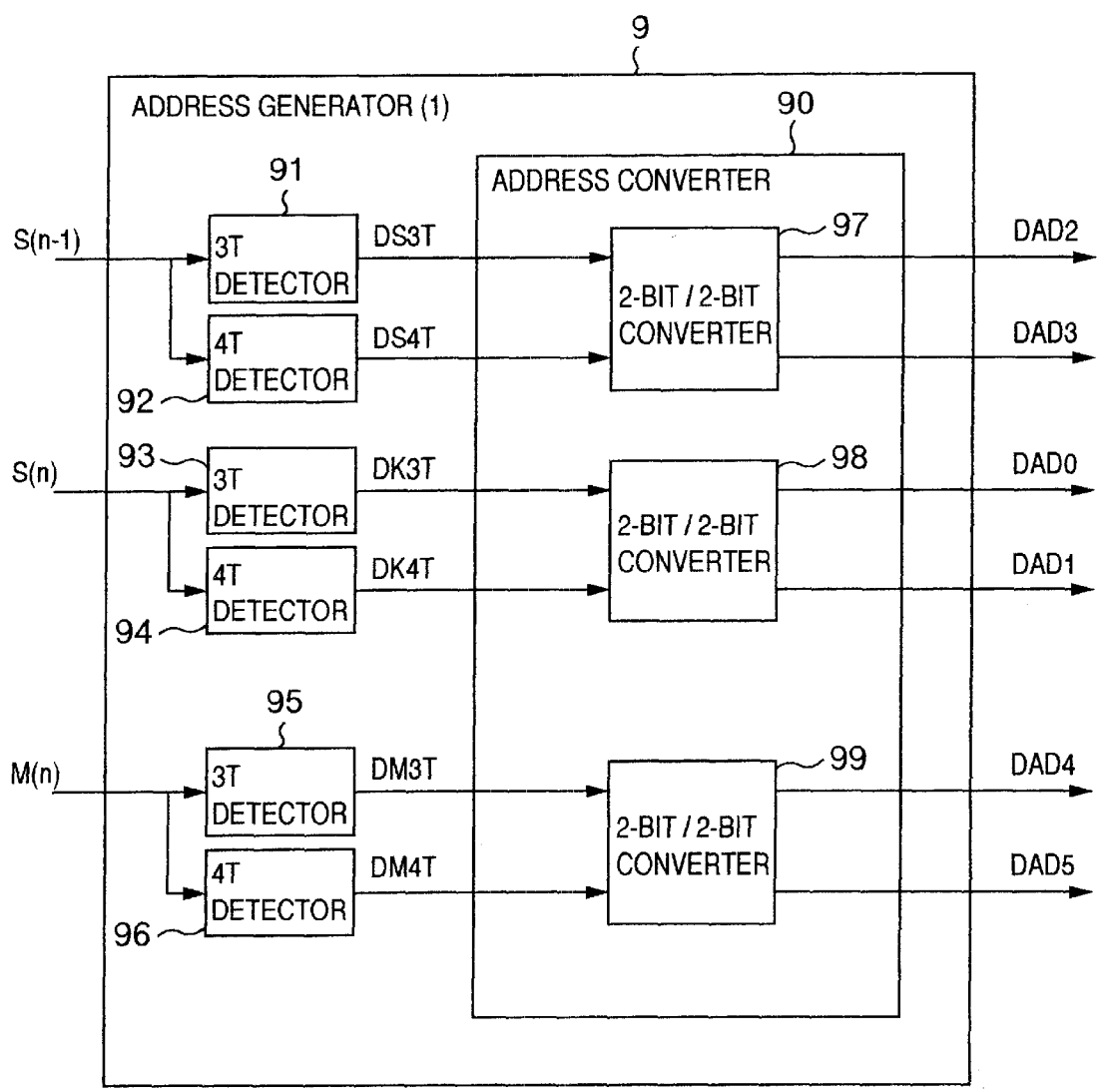
FIG. 10 is a diagram showing a first configuration of the address generator.

FIG. 10 shows a first example configuration of the address generator 9. Numeral 91 designates 3T detector (detection means) for detecting whether the preceding space length S(n−1) is 3T or not, and numeral 92 designates 4T detector (detection means) for detecting whether the preceding space length S(n−1) is 4T or not. Assume that the output of the 3T detector 91 is DS3T and the output of the 4T detector is DS4T. In the case where S(n−1)=3T, DS3T=1 and DS4T=0. Also, in the case of 5T or more, DS3T=0 and DS4T=0. Numerals 93 and 94 designate detectors for detecting whether the succeeding space length S(n) is 3T or 4T, which output DK3T and DK4T, respectively. In similar fashion, numerals 95, 96 designate detectors for detecting whether the present mark length M(n) is 3T or 4T, which output DM3T, DM4T, respectively. Address converter (conversion means) 90 generates an address based on the values of these 6 bits. In the case of FIG. 10, the 2-bit/2-bit converter designated by numerals 97, 98 and 99 convert each two bits thereby to generate 6 bits of the address DAD[0.5].

FIGS. 11A, 11B and 11C show the relation between the 3T, 4T detection result and the addresses generated for nine transitions of mark length nT. In FIGS. 11A, 11B, 11C, "conversion (1)" represents the four low-order bit values of the generated address in the case where the 2-bit/2-bit conversion is effected as shown in FIGS. 11B, C. In FIG. 11A, "Conversion (2) represents the values in the case of no conversion. "Pattern No", on the other hand, shows the transition and the drive waveform corresponding to the transition. For example, Pc(a, b) represents the mark length M(n)=c, the preceding space length S(n−1)=a and the succeeding space length S(n)=b. FIG. 12 shows the positional relation between the addresses generated in the case of "address conversion (1)" of FIG. 11A and the drive waveforms Pc(a, b) stored in the corresponding addresses of the drive waveform information storage 11.

Nine patterns for the 3T mark are arranged in the address area 0, those for the 4T mark in the address area 1, and those for the 5T mark or more in the address area 2 of the high-order address value DAD5, 4. In this case, nine patterns are available for each mark length, and therefore the arrangement of the drive waveforms Pc(a, b) is so discrete that the memory utilization rate is low.

(1.2.3.2) Address Generator (2)

Figure 13:
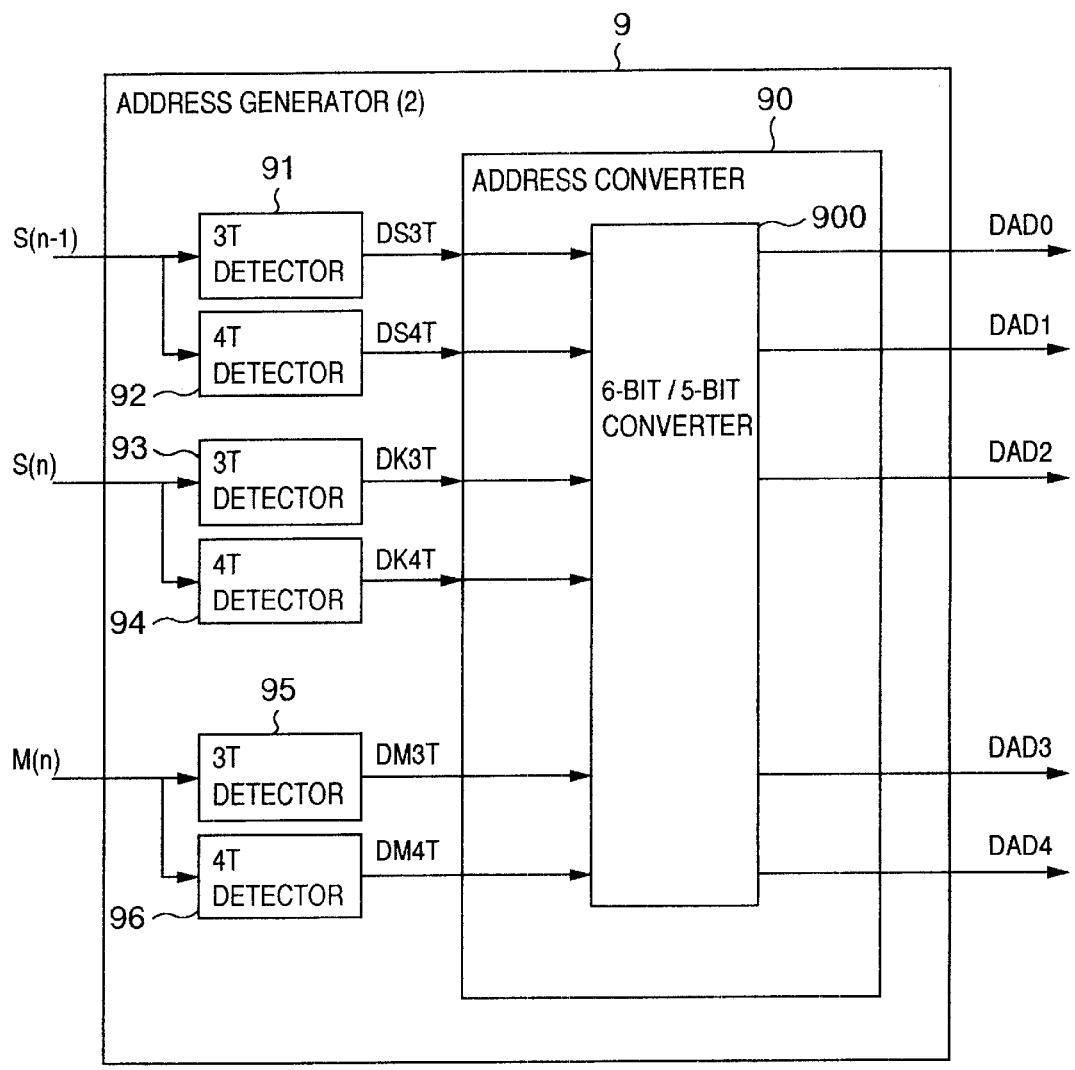
FIG. 13 is a diagram showing a second configuration of the address generator.

FIG. 13 shows a second example configuration of the address generator 9. In this case, address converter 90 is configured of 6-bit/5-bit converter. As described above, there are 27 transition states available for the marks 3T, 4T and 5T or more. These 27 transition states are expressed by 5 bits (since 32 expressions are possible). Various conversion methods are available and an example of them is shown in FIG. 14.

FIG. 14 shows the positional relation between the detection values of the 6-bit data converted into 5 bits for 3T, 4T, 5T or more and the drive waveforms Pc(a, b) stored in corresponding addresses. A total of 27 drive waveforms can be arranged continuously as values corresponding to the addresses for an improved memory utilization efficiency.

In the configuration of the first and second address generator (1), (2) 9, the marks and the space lengths are segmented into 3T, 4T and 5T or more as shown in FIG. 4. An attempt to improve the jitter characteristic by more detailed segmentation, however, sharply increases the number of patterns available (number of transition states).

Figure 5:
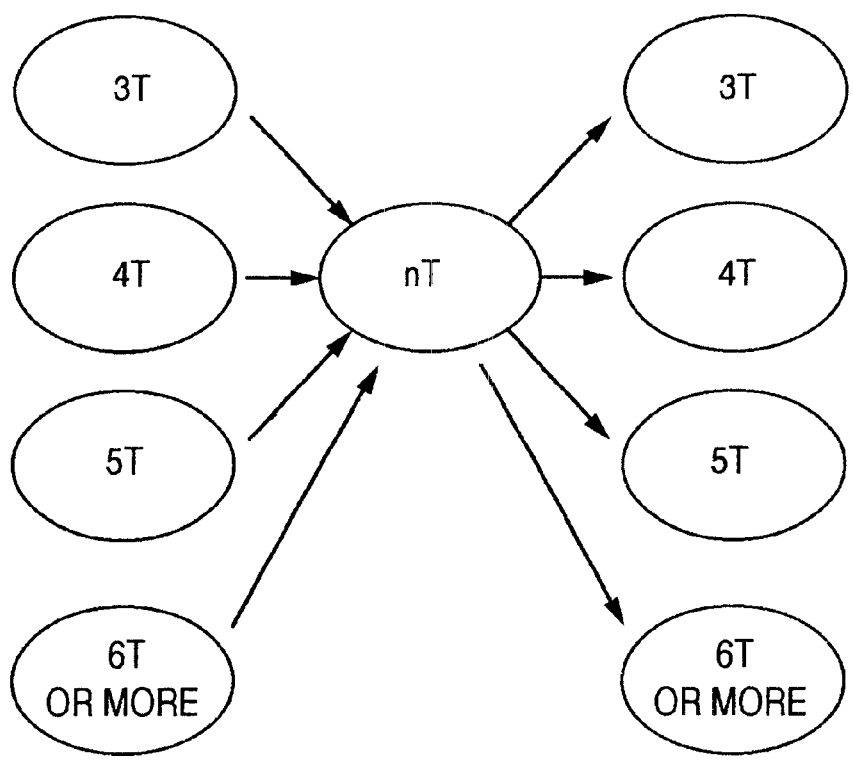
FIG. 5 is a second diagram showing the status transition of the mark length and the space length of a binary recording signal.

As shown in FIG. 5, when the mark and space lengths are segmented into 3T, 4T, 5T and 6T or more, 16 patterns are available for each nT mark length for a total of 64 patterns. To meet this situation, a different configuration of the address generator 9 is required.

(1.2.3.3) Address Generator (3)

Figure 15:
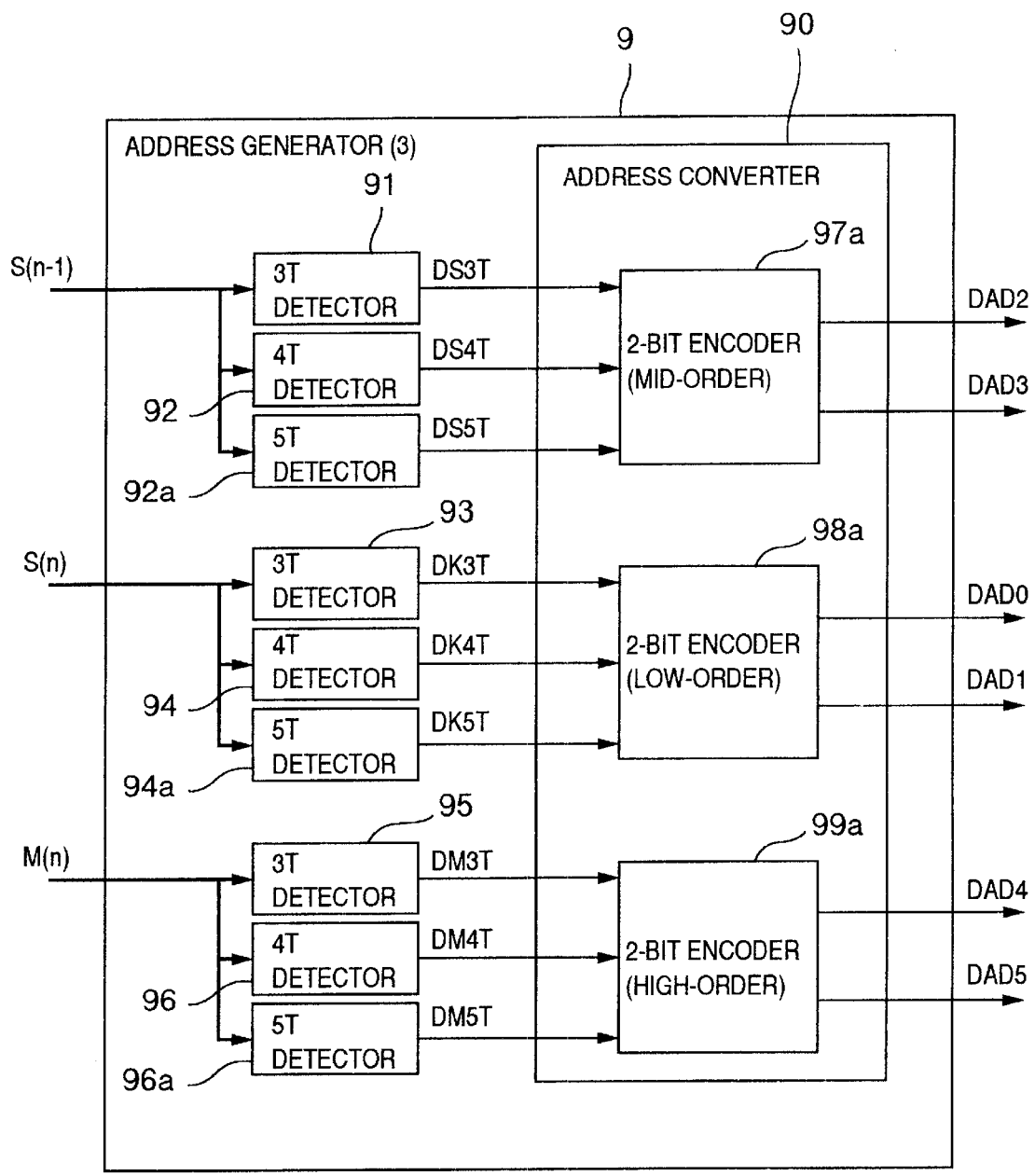
FIG. 15 is a diagram showing a third configuration of the address generator.

FIG. 15 shows a configuration of the addressing generator for the mark and space length segmented into four including 3T, 4T, 5T and 6T or more. In this configuration, 5T detector (means) 92a, 94a and 96a are added to the above-mentioned configuration. Also, the address converter 90 includes 2-bit encoder (coding means) 97a for converting the 3-bit detection result of the preceding space length into 2-bit data, 2-bit encoder (coding means) 98a for converting the 3-bit detection result of the succeeding space length into 2-bit data and 2-bit encoder (coding means) 99a for converting the 3-bit detection result of the mark length into 2-bit data. FIG. 16A shows the relation between the 3T, 4T and 5T detection result and the addresses generated. The result of coding by the 2-bit encoder is shown in FIGS. 16B, C.

FIG. 17 shows the positional relation between the addresses generated and the drive waveforms Pc(a, b) stored at corresponding addresses in the drive waveform information storage 11. In this case, there are four sets of 16 patterns. Therefore, the patterns are continuously arranged as shown, and the utilization rate of the memory is improved at the sacrifice of an increased memory capacity.

For more finely detailed control, more patterns are required. Thus, the memory capacity of the drive waveform information storage 11 is increased with the number of patterns. One of the critical problems to be overcome for realizing a laser drive integrated circuit is how to store a maximum number of patterns efficiently in a memory of small capacity.

(1.2.4) Drive Waveform and Method of Description

Now, an explanation will be given of a drive waveform stored in the drive waveform information storage 11 and a method of description thereof.

(1.2.4.1) Drive Waveform Example (1)

Figure 6A:
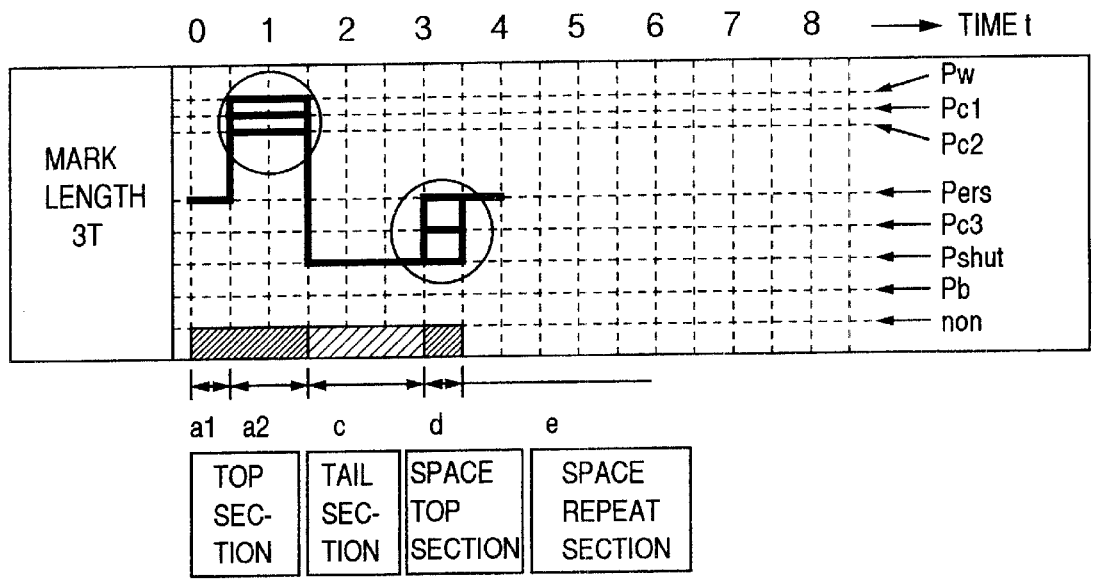
FIGS. 6A, 6B are diagrams showing an example of the drive waveform of a laser diode for the mark lengths of 3T and 4T.
Figure 6B:
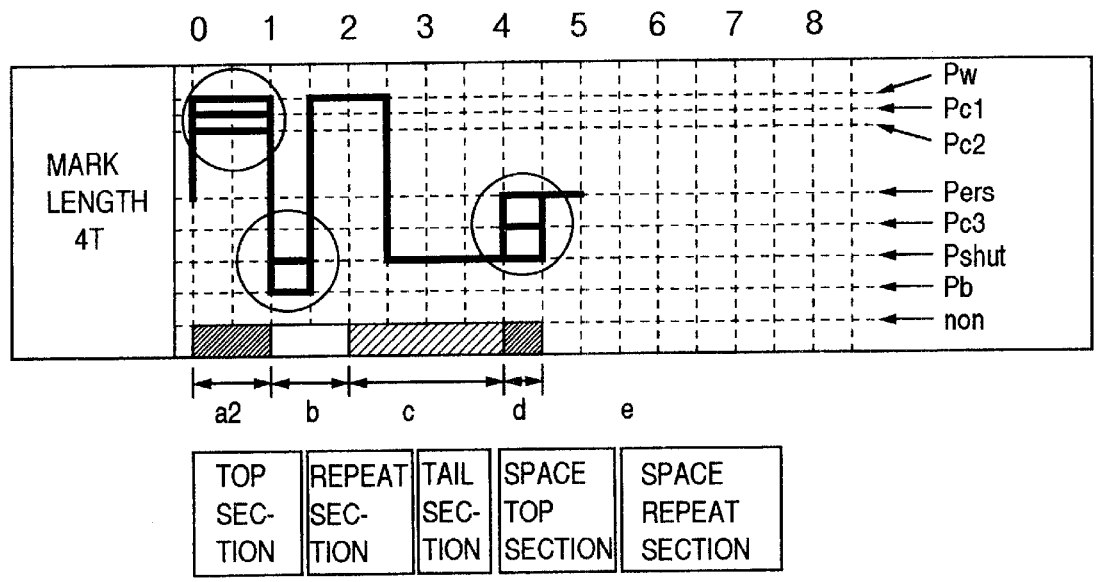
Figure 7:
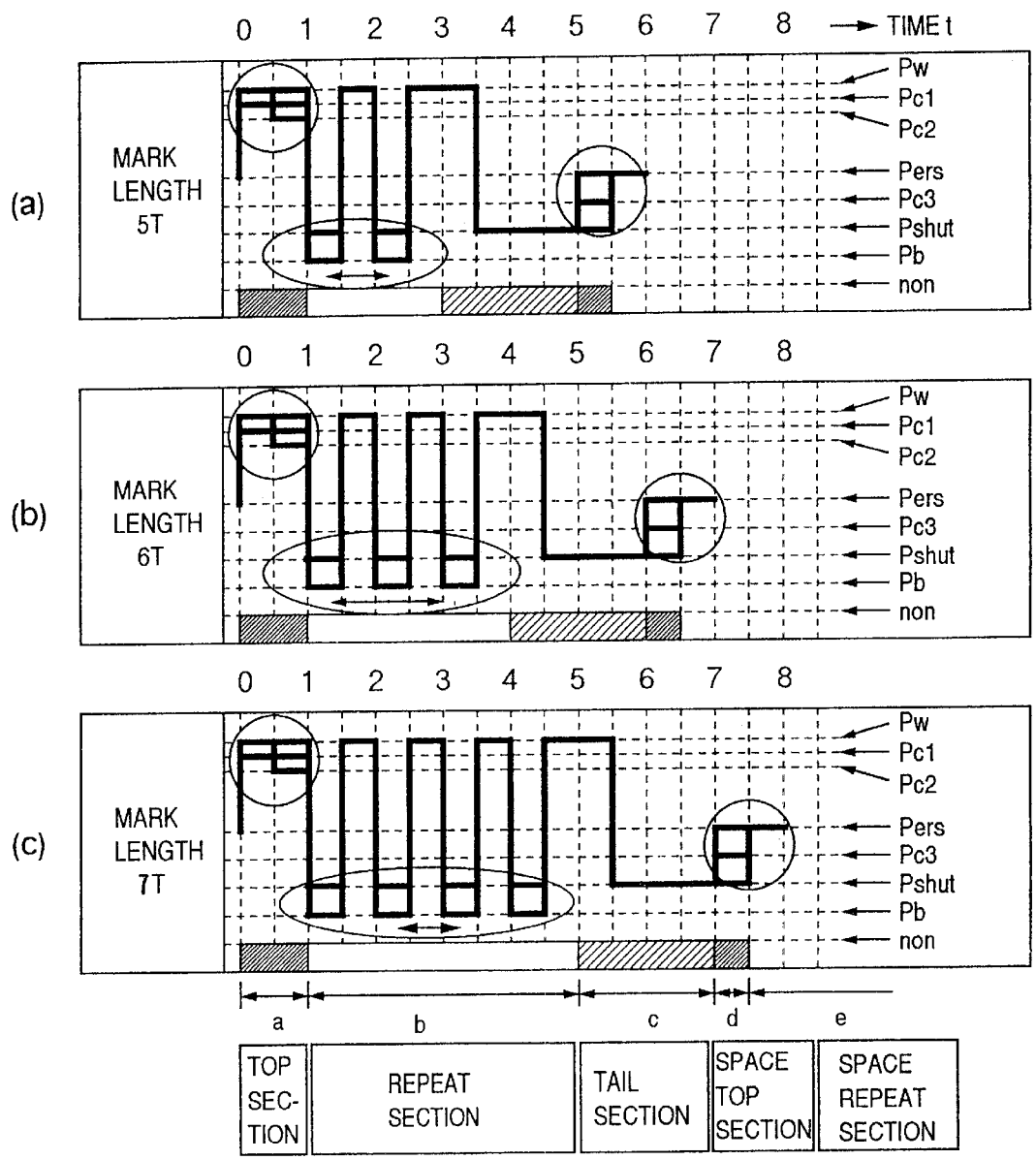
FIG. 7 is a diagram showing an example of the drive waveform of a laser diode for the mark lengths of 5T to 7T.

FIGS. 6A, 6B and 7 show examples of drive waveform of each mark length. The ordinate represents the recording power of the laser expressed as levels Pw, Pers, Pb and the like. The abscissa represents the time axis in units of T. The drive waveform changes in minimum units of T/2 as shown in the drawing. Also, the time T/2 corresponds to the period of the clock CLK(f) output from the multiplication-by-n frequency multiplying circuit 15. The portions circled in the drawing are changed according to the adjacent space length. This example represents the case in which the mark and space lengths are segmented into 3T, 4T, 5T or more, and gives 9 (=3×3) drive waveform patterns for each mark length.

According to this embodiment, the drive waveform is configured of a top section, a repeat section, a tail section, a space top section and a space repeat section as shown. Especially, the repeat section repeats the Pb-Pw pair of time T/2. The only difference for 5T or more is that the repeat section repeats different numbers of times. In view of this, the drive waveform is described with a smaller amount of information to reduce the storage capacity of the drive waveform information storage 11.

(1.2.4.2) Waveform Description Method (1) and Packet (L1, L2, RL)

Figure 26:
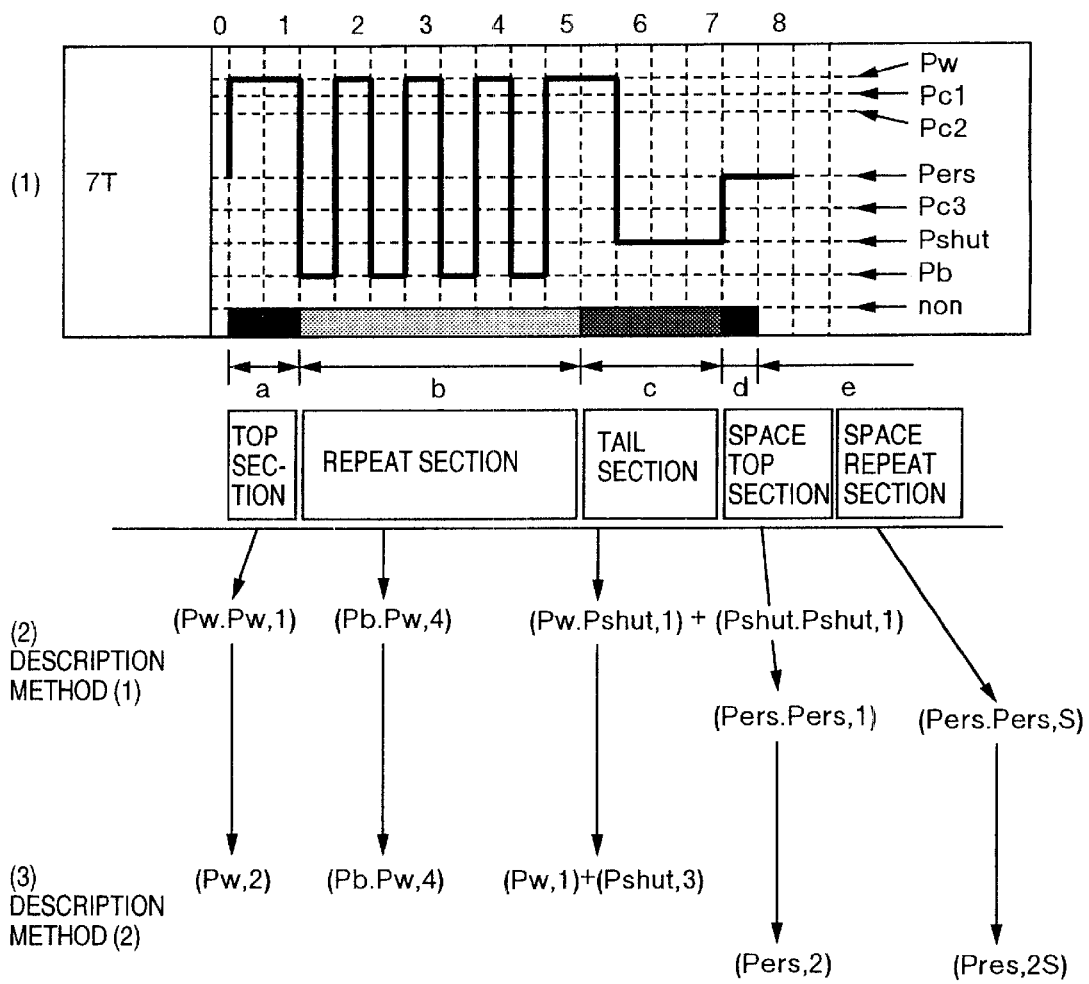
FIG. 26 is a diagram for explaining a method of describing a drive waveform (for 7T).

FIG. 26 shows an example of description for 7T. The description method (1) in (2) of FIG. 26 gives (L1, L2, RL) as a packet, where L1 represents the power level for the time section T/2, L2 the power level for the next time section T/2 and RL the number of repetitions with L1 and L2 as a pair. The description method (1) is for describing the drive waveform with this section T as a unit. In the case of 7T of FIG. 26, a mark and a space can be described with six packets.

(1.2.4.3) Waveform Description Method (2) and Packets (L1, L2, RL), (L, RL)

In the description method (2) in (3) of FIG. 26, (L, RL) is considered as a packet, which is described with level L and RL indicating the number of times that the level L repeats with the time section T/2 as a unit. In the description method (2), a waveform is described using two types of packets including this (L, RL) packet and the preceding (L1, L2, RL) packet. In this case, a mark and a space can be described with six packets.

The case of 7T was described above. In both of the two methods described above, only the length of the repeat section is different for each mark of 4T or more. Therefore, mark lengths other than 4T or more can also be described with six packets in similar fashion to the preceding cases. The shown example of drive waveform assumes seven levels and therefore the description of L is possible with three bits.

(1.2.4.4) Example Description of Drive Waveform

Figure 27:
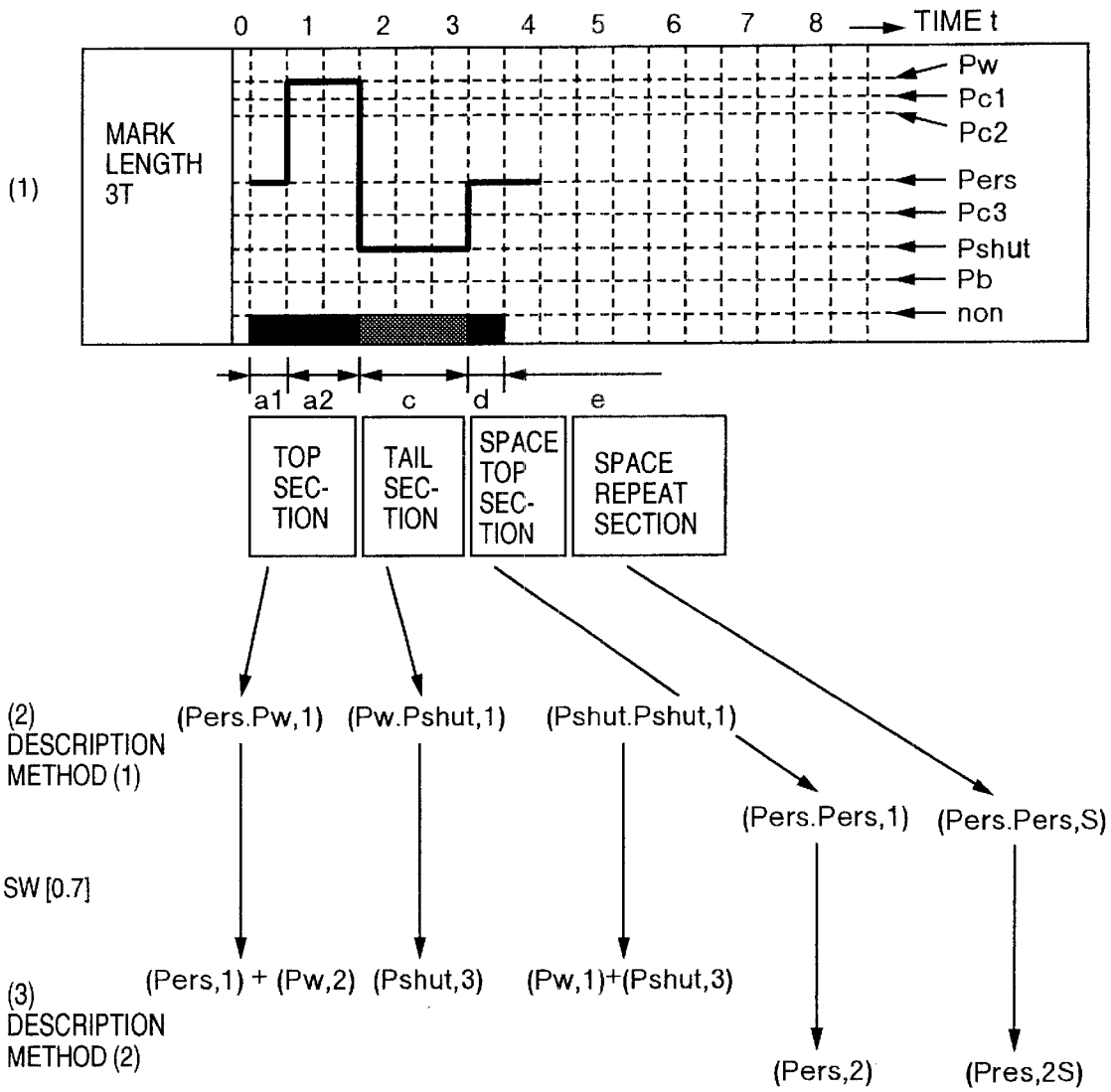
FIG. 27 is a diagram for explaining a method of describing a drive waveform (for 3T).

FIG. 27 shows an example description for 3T. In this case, for lack of the repeat section, a mark and a space can be expressed with five packets for both of the two methods described above.

FIG. 18 is a description of the marks of 3T, 4T and 5T or more and the succeeding mark using the description method (1). Each drive waveform can be described with a maximum of 6 packets. In view of the uniformity of the storage method of the drive waveform information storage 11 and the processing in the drive waveform decoder 14 described later, therefore, the 3T-mark drive waveform is also configured of six packets. In the case of 3T mark, the repeat section is lacking, so that the number RL of repetitions for the portion corresponding to the repeat section is set to 0 for unifying the packets (packet 1 in FIG. 18).

Also, the packet 1 and the packet 5 correspond to the repeat section of the mark and space, and has a RL value of only 0 or 1. This is by reason of the fact that as long as the mark length and the space length are detected, the number of repetitions can be uniquely calculated (by the drive waveform decoder as described later) and the storage of the number of repetitions in the drive waveform information storage 11 requires preparation of waveforms corresponding to all the mark lengths, resulting in an increased memory capacity.

For this reason, the drive waveform information storage 11 stores a total of 27 drive waveform information shown in FIG. 18 in the storage areas corresponding to the addresses generated by the address generator 9 described above. As a result, the drive waveform including the recording mark dependent on the adjacent space length and the succeeding space can be output from the drive waveform information storage 11.

(1.2.5) Drive Waveform Information Storage (1)

Figure 23A:
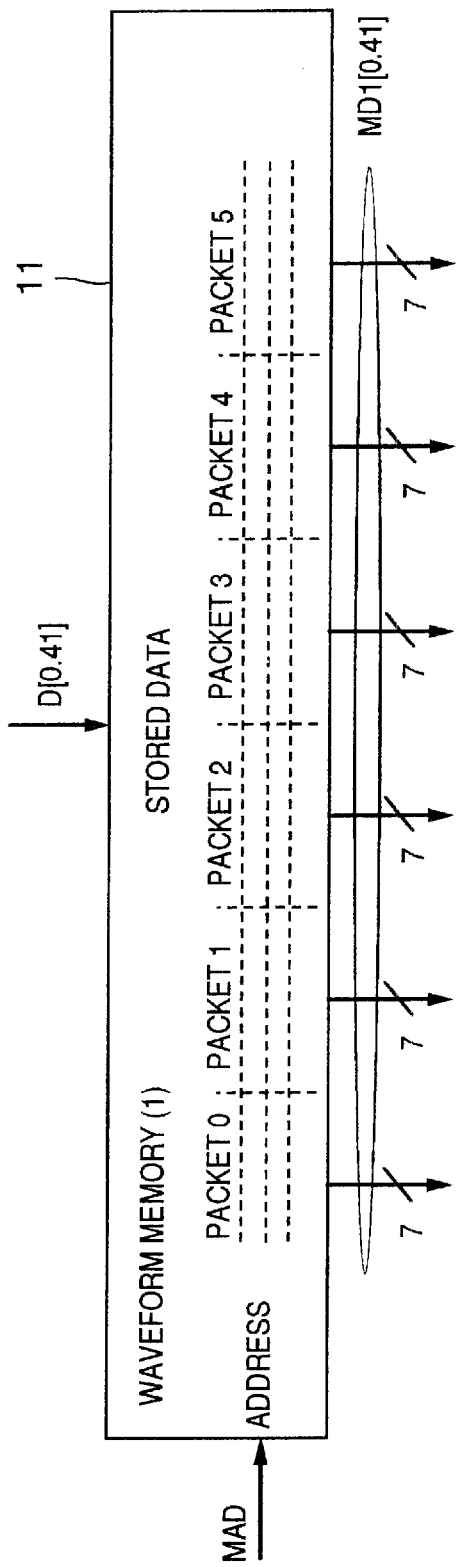
FIGS. 23A, 23B are diagrams showing the contents stored in the drive waveform information storage according to the first, second and third embodiments.

A configuration of the drive waveform information storage 11 according to a first embodiment is shown in FIG. 23A. The address DAD output from the address generator 9 is input as an address MAD through the switching unit 10. A packet train as shown is stored as a word corresponding to this address MAD value, and therefore this packet train is output. Each packet includes three bits each of levels L1 and L2, and a bit of the number RL of repetitions for a total of 7 bits. Therefore, one word is 42 bits. The number of bits per word increases in proportion to the number of packets in the case where a more finely detailed drive waveform is described. In consideration of the future expendability, slightly more packets than required can be prepared with the RL of the unrequired packets set to zero. Also, a word length corresponding to the required maximum number of packets can be provided for a particular disk type handled as an optical disk apparatus. The drive waveform information storage 11 may be of any type having the same function as the S-RAM or D-RAM in general use. The output MD[0, 41] of this drive waveform information storage 11 is supplied to the drive waveform decoder 14 so that the packet train is decoded sequentially to the drive waveforms by packet.

(1.2.6) Drive Waveform Decoder (1)

Figure 19:
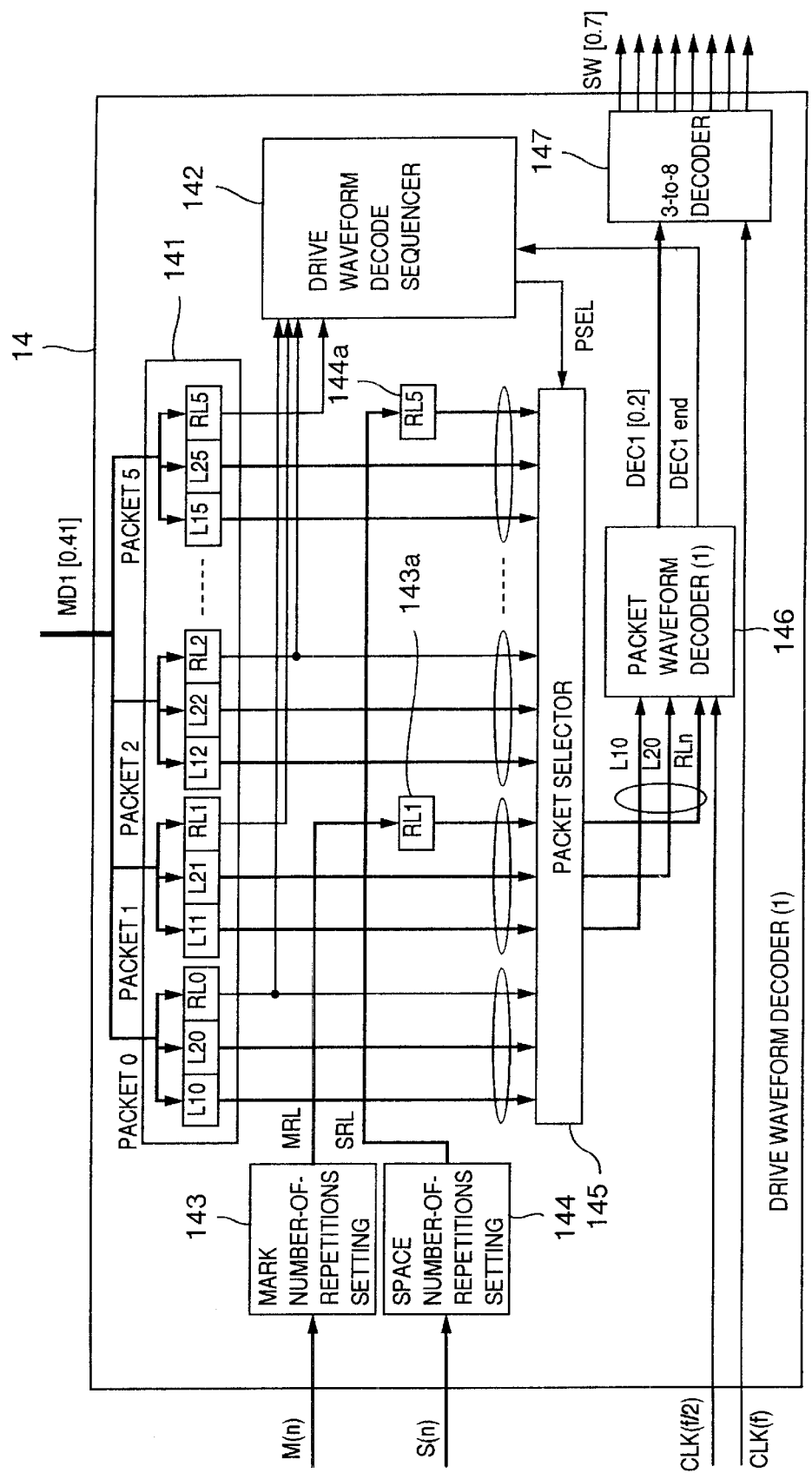
FIG. 19 is a diagram showing a first configuration of the drive waveform decoder.

FIG. 19 shows a configuration of the drive waveform decoder 14. This drive waveform decoder 14 includes a register 141 for temporarily receiving the packet train data MD[0,41] supplied from the drive waveform information storage 11, mark number-of-repetitions setting unit (setting means) 143 for calculating the number MRL of repetitions of the mark section from the mark length M(n) supplied from the mark/space length detector 8, space number-of-repetitions setting unit (setting means) 144 for calculating the number SRL of repetitions of the space section from the space length S(n), a register 143a for receiving the MRL, a register 144a for receiving the SRL, packet select or (selecting means) 145 for selecting a packet from the register 141 corresponding to the packet select signal PSEL from a drive waveform decode sequencer 142 and supplying it to the packet waveform decoder 146, the packet waveform decoder 146 for decoding the drive waveform by packet, a 3-to-8 decoder 147 for generating a control signal of the switch 17 from the decoded drive waveform, and the drive waveform decode sequencer 142 for controlling the operation of each component element of the drive waveform decoder 14.

The mark drive waveform is expressed in four packets in units of T (including the repeat packets), and the time section of the packets excepting the repeat packets is 3T. Therefore, the mark number-of-repetitions setting unit 143 calculates the mark length M(n)–3 as the mark number of repetitions and supplies it to the register 143a. Specifically, the number of repetitions is 0 for the mark length of 3T, 1 for the mark length of 4T and 4 for the mark length of 7T. On the other hand, the space drive waveform is expressed in 2 packets in units of T, and therefore, the space number-of-repetitions setting unit 144 calculates the space length S(n)–1 and supplies it to the register 144a. As a result, the repeat packets 1 (mark) and 5 (space) are completed as (L1, L2, RL).

The drive waveform decode sequencer 142 first detects the packet of RLn=0 by fetching RLn (n: 0 to 5) of each packet of the register 141. This packet is called an invalid packet. The invalid packet requires no decoding, and therefore the packet select means 145 is controlled by the PSEL signal in such a manner as not to supply the invalid packet to the packet waveform decoder 146. The drive waveform decode sequencer 142 supplies packet 0 and other valid packets sequentially to the packet waveform decoder 146 through the packet selector 145. Upon receipt of a signal DECend from the packet waveform decoder 146 indicating the complete decoding of the packets supplied, the drive waveform decode sequencer 142 supplies the next packet. In this way, after all the packets to the last are decoded, the next packet train begins to be received.

(1.2.6.1) Packet Decoder (1)

Figure 20A:
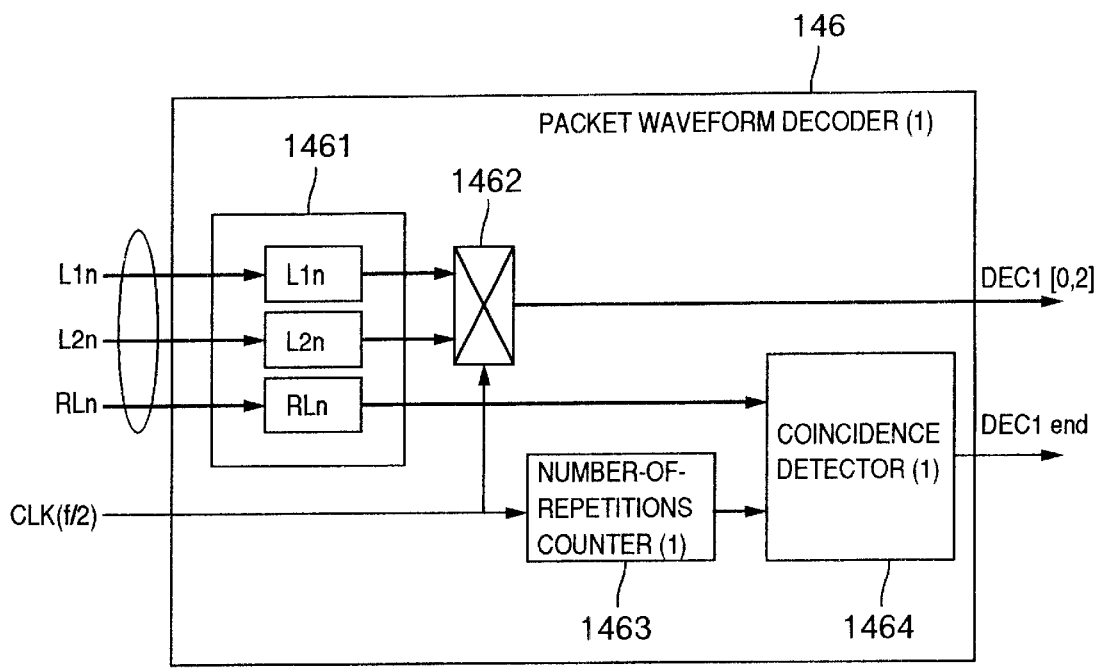
FIGS. 20A, 20B are diagrams showing a configuration of a packet waveform decoder (1) and a packet waveform decoder (2).

FIG. 20A shows a configuration of the packet decoder 146 according to this embodiment. The packet decoder 146 includes a register 1461 for receiving the packet (L1n, L2n, RLn), switching unit (switching means) 1462 for outputting the value of L1n or L2n of the register 1461, a number-of-repetitions counter 1463 for counting the number of repetitions in units of T based on the clock CLK(f/2) supplied from the division-by-two frequency divider circuit 16, and coincidence detector (detecting means) 1464 for detecting the coincidence between the RLn value of the register 1462 and the count on the number-of-repetitions counter 1463.

The period of the clock CLK(f/2) is T. Therefore, the switching unit 1462 outputs L1n and L2n alternately at intervals of T/2 section. The resulting number of repetitions is counted in units of T by the number-of-repetitions counter. Thus, L1n and L2n are repeated the number of times corresponding to RLn. The coincidence detector (selection means) 1464, upon detection of a coincidence, outputs the signal DECend indicating that the packet waveform decoding is complete. The number-of-repetitions counter 1463 counts the number of repetitions from 0 for each packet newly supplied thereto.

(1.2.6.2) 3-to-8 Decoder and Switches

The 3-bit output DEC1[0,2] of the packet waveform decoder 146 is supplied to the 3-to-8 decoder 147. The 3-to-8 decoder 147 synchronizes the eight output signals of the decoding result by the clock signal CLK(f), and supplies the resulting signals to the switch 17. This synchronization is for eliminating the skew of the eight signal lines SW[0,7] and reducing the deformation of the laser drive waveform.

Figure 28:
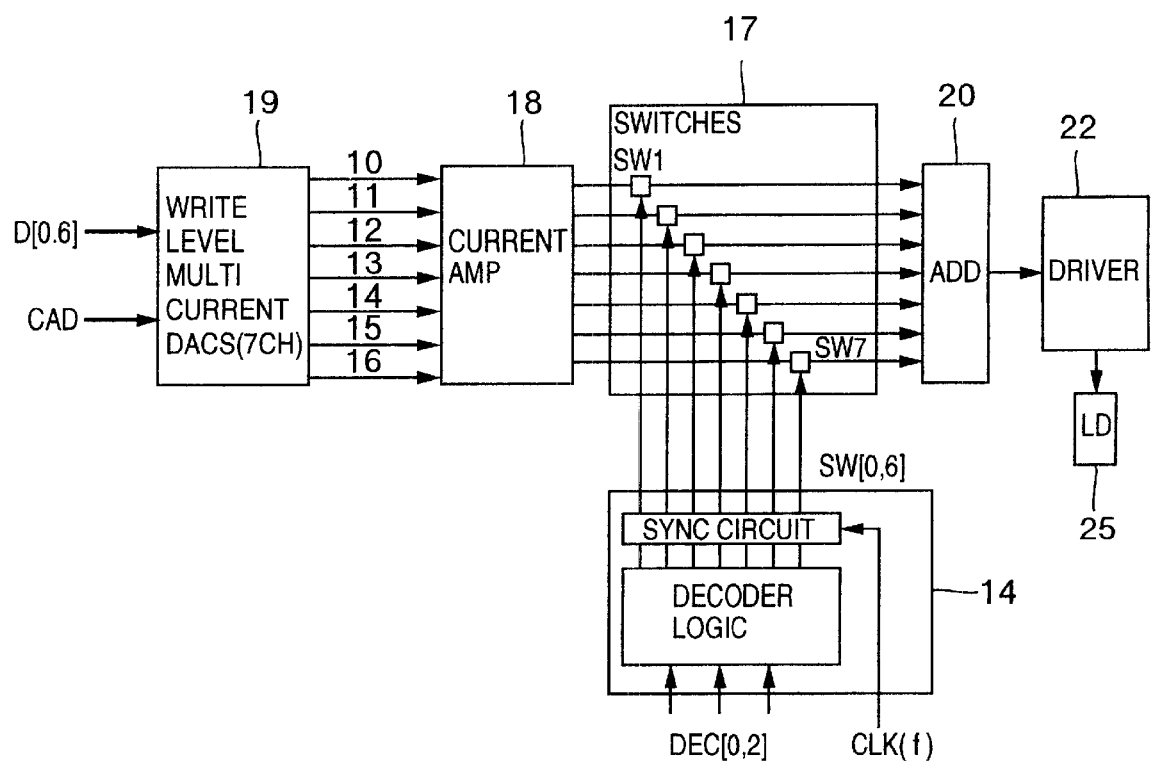
FIG. 28 is a diagram showing a configuration of switches.

FIG. 28 shows the relation between the 3-to-8 decoder and the parts arrangement around the switch 17. FIG. 29 shows an example of conversion logic of the 3-to-8 decoder. The output of the 3-to-8 decoder is used for on/off control of the switches SW1 to SW7. As a result, the current In supplied from the current setting unit 19 is amplified through the current amplifier 18, the current selected by the switches 17 is added by the adder 20, and the resulting signal is applied through the switching unit 21 and the drive unit 22 hereby to current-drive the laser diode 25. In this way, the laser drive waveform corresponding to the desired mark and space is reproduced and the desired optical power can be produced. The current setting unit 19 is configured of D/A converters, for example.

(1.2.7) Rewrite of Recording Strategy

The optical disk apparatus operates in such a manner that the data stored in the drive waveform information storage, i.e. the recording strategy is rewritten in accordance with the output value of the disk type detector 2 or the recording/reproduction characteristic detector 3. In the case where the recording strategy is varied depending on the material of the recording medium, even the same type of the recording medium is varied in characteristics. Such recording medium is written in as a trial, and the strategy is rewritten to change the recording strategy according to the reproduction characteristic such as the jitter of the result of the trial writing. The rewrite signal including the address and the data supplied serially from the controller 1 is supplied to the laser drive integrated circuit 27. The laser drive integrated circuit 27 fetches the resulting signal serially by the data register 5 and the address register 6. The data and the address are transferred in synchronism with the clock CLK(f/n). Therefore, the resulting signal is serially received by each register based on the DataTX signal indicating the data transfer section and the AddTX signal indicating the address transfer section. The data D[0,41] thus received and the address CAD are applied in parallel to the drive waveform information storage 11. The CAD is supplied through the switching unit 10. The control signal for controlling the mode of these switching unit is supplied and controlled by the operation mode register 7. The value of this operation mode register, as in the preceding case, is supplied from the controller 1 as a set of address and data, and stored through the data register 5 and the address register 6. The output current value of the current setting unit 19 is also set in similar fashion. In this way, the requirement for various media can be met, and an optimum drive waveform is obtained for recording, thereby improving the reliability of the recording data.

(1.3) Effects of First Embodiment

The first embodiment has the following effects:

(1) What is called the recording strategy (a group of drive waveforms) is stored in a rewritable storage means and the laser is driven. Various recording media can be used, therefore, by rewriting this recording strategy (drive waveforms). Also, with the same recording medium, an optimum recording strategy can be secured at real time so that highly reliable recording is made possible.

(2) The laser drive waveform is operated and output by internal multiplication based on the NRZI signal from the fixed unit and a frequency-divided clock signal. Therefore, the problem of the skew of the control signal due to the length of the flexible wiring and the problem of the unrequired radiation which have been posed in the prior art can be alleviated.

(3) Since the drive waveform can be expressed with a small amount of information, the circuit scale of the laser drive integrated circuit can be reduced.

(4) Since the drive waveform can be received in serial form for storage, the number of flexible wires can be reduced.

(5) A drive circuit for driving at least two laser diodes is built in, and the recording strategy can be switched to the one corresponding to each laser diode. Thus, the requirement for various disks can be met and the apparatus size can be reduced.

(6) Since a multi-channel power supply is built in, the number of signal lines of the flexible wiring can be reduced while at the same time reducing the apparatus size.

(7) The integration and the resulting smaller number of signal lines increases the freedom of arranging the laser drive integrated circuit in the vicinity of the laser diode. Thus the rounding of the drive waveform which occurs at the time of high-speed recording can be reduced.

(2) Second Embodiment (2.1) Configuration of Second Embodiment

Figure 2:
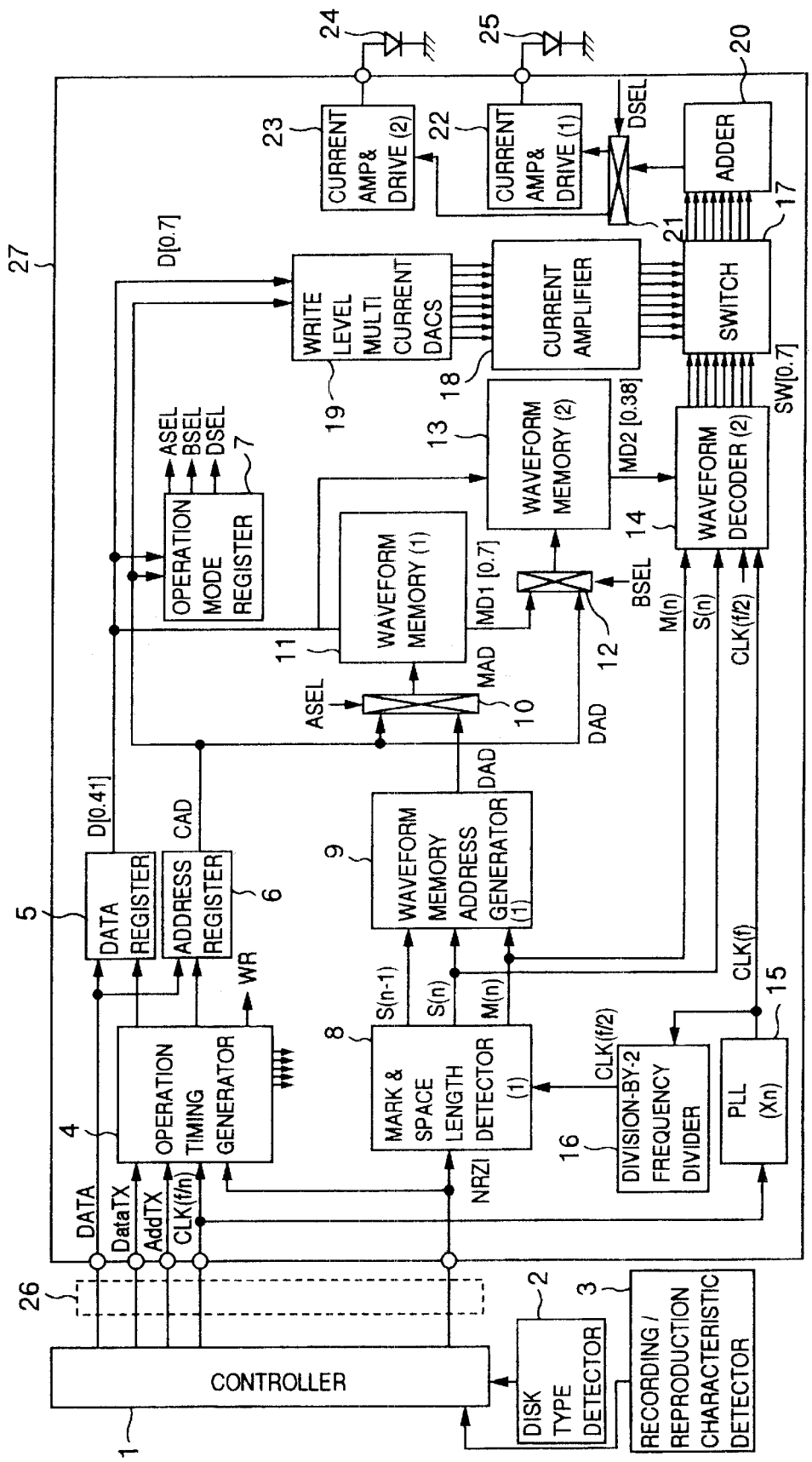
FIG. 2 is a diagram showing a configuration according to a second embodiment of the invention.

FIG. 2 shows a second embodiment of the invention. Those component parts having the same functions as the corresponding parts in FIG. 1 are designated by the same reference numerals, respectively. The second embodiment is different from the first embodiment in that drive waveform information storage (waveform memory) (2) 13 is newly added. This embodiment is intended to reduce the total information storage capacity and facilitate the circuit integration by dividing the storage capacity of the drive waveform information storage 11 of the first embodiment into the two drive waveform storages 11, 13.

(2.2) Operation of Second Embodiment (2.2.1) Drive Waveform Expressed in Partial Pattern Consider the top section, the repeat section, the tail section, the space top section and the space repeat section of the drive waveform example shown in FIGS. 6A, 6B and 7. The drive waveform of each of these sections is called the partial pattern. The number of partial patterns of each section is very small as compared with the number 27 of drive waveform patterns in the first embodiment.

FIGS. 21A to 21E show the partial pattern assumed by each section. The top (1) section (the area a1 in FIG. 6A) has 2 patterns, the top (2) section (the area a2 in FIGS. 6A and 6B) has 5 patterns, the repeat section (the area b in FIG. 6A) has 2 patterns, the tail section (the area c in FIGS. 6A and 6B) has 2 patterns, and the space section (the areas d, e in FIGS. 6A and 6B) has 3 patterns. FIGS. 21A to 21E describes the pattern of each section by the second description method explained above. When 3 bits is allocated to level Ln and 2 bits to the number RLn of repetitions. Only 116 bits are required for describing all the partial patterns.

(2.2.2) Partial Pattern Selected by Index Information

In the case where a partial pattern to be used for each section is stored, the drive waveform for each mark length can express a total of 27 patterns as in the first embodiment. A drive waveform can be expressed with 8 bits of a select code of a partial pattern. The drive waveform information described with this partial pattern select code is called the index information herein. The number of bits of this index information is 216 (=8 bits×27 waveforms). As a result, the total bits of the index information and the partial pattern information are 332. This compares with the figure of 1134 bits (=42 bits×27 waveforms) according to the first embodiment. Thus the memory capacity can be reduced to about one third.

FIG. 22 is a diagram specifically showing the index information for each mark length of 3T, 4T and 5T or more. PcT1 designates the select code for the partial pattern of the Top (1) section, and Pct2 the select code for the partial pattern of the Top (2) section. Similarly, PcMR designates the select code for the repeat section, PcTa the select code for the partial pattern of the tail section, and PcS the select code for the partial pattern of the space section.

The index information of FIG. 22 is stored in the drive waveform information storage 11, and the partial pattern of each section shown in FIGS. 21A to 21E is stored in a table prepared for each section. A partial pattern is selected from a table based on the index information, and supplied as a packet group to the drive waveform decoder 14 as in the embodiment described above.

(2.2.3) Drive Waveform Information Storage 11 (Storage of Index Information)

Figure 23B:
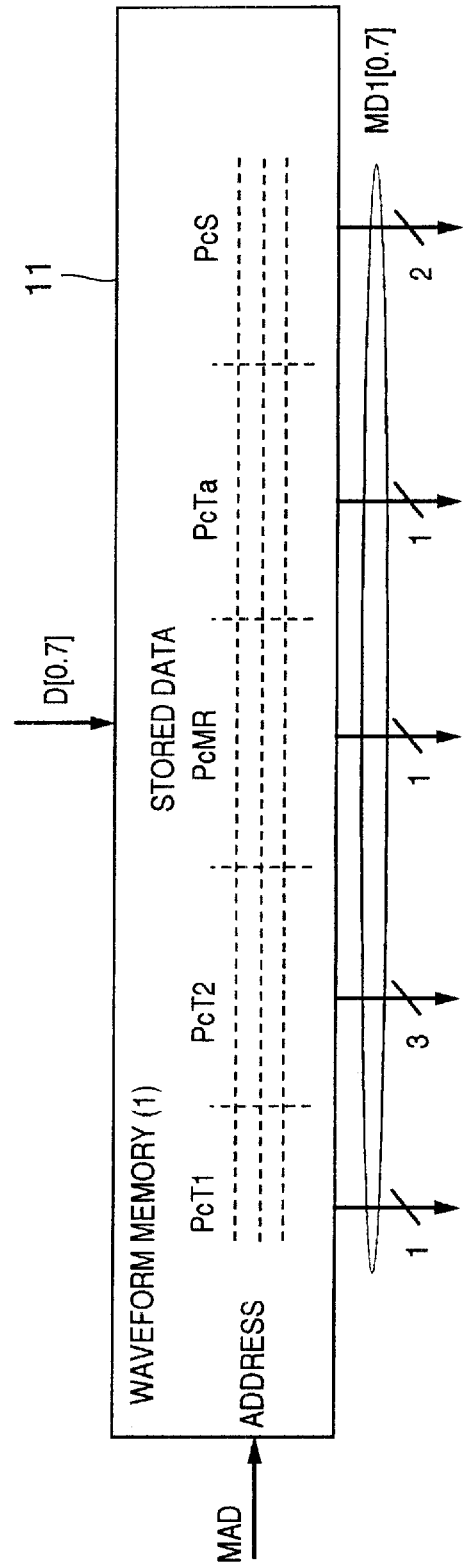

The storage image of the index information of the drive waveform information storage 11 according to this embodiment is shown in FIG. 23B. The output is 8 bits in total as described above.

(2.2.4) Drive Waveform Information Storage 13 (Storage of Partial Pattern)

Figure 24:
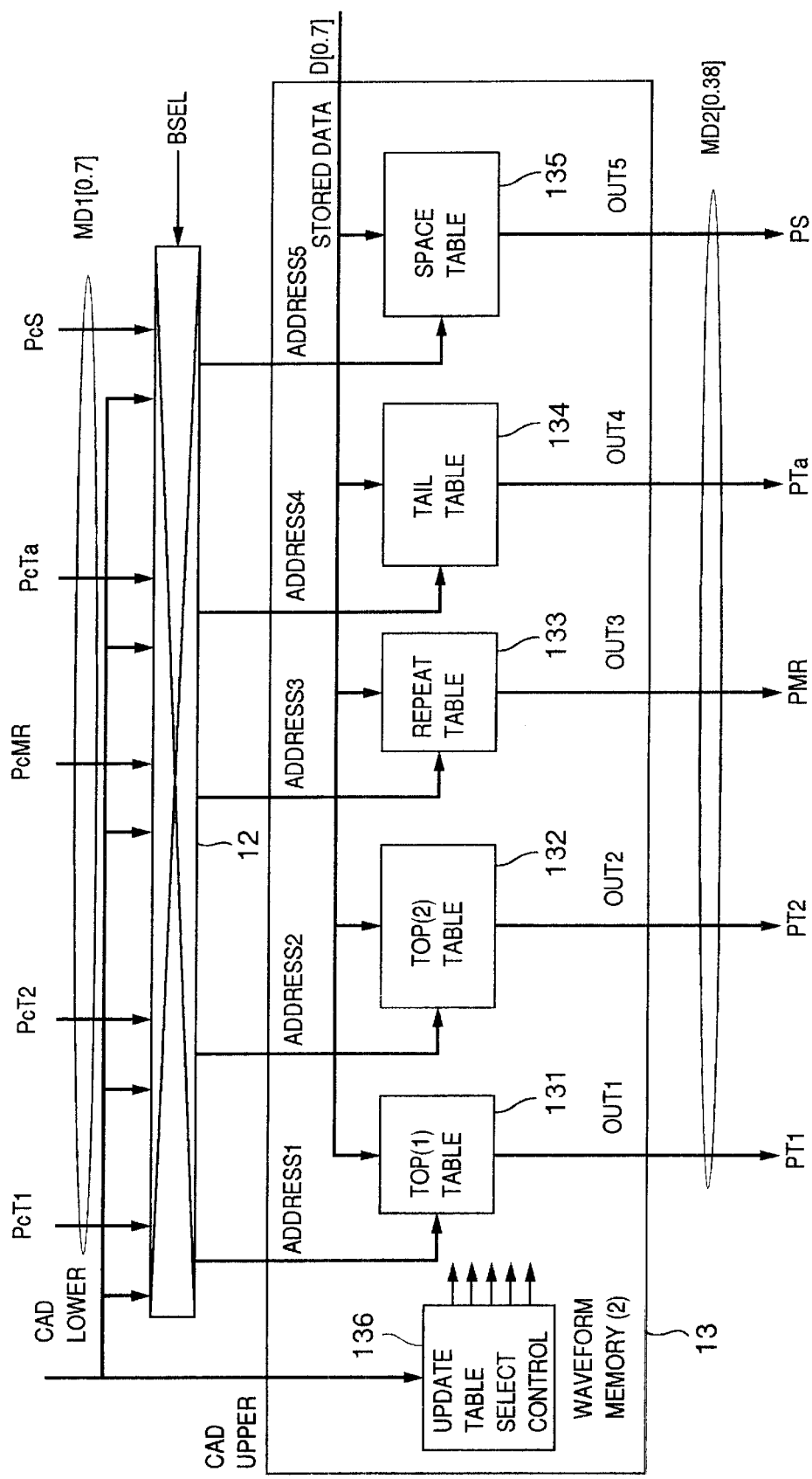
FIG. 24 is a diagram showing a configuration of the drive waveform information storage (2) according to the second and third embodiments.

FIG. 24 shows a corresponding configuration of the drive waveform information storage (waveform memory) 13. The drive waveform information storage 13 includes tables 131 to 135 for storing the partial patterns of the respective sections, and update table select controller (controlling means) 136 for selecting a table corresponding to high-order bits of the address CAD supplied from the controller 1 when writing the table contents. The index information is supplied through the switching unit 12. The switching unit 12 switches between the index information from the drive waveform information storage 11 and the address CAD from the controller 1 for rewrite operation.

The partial pattern of each section is selected by the index information and supplied to the drive waveform decoder (2) 14. The packet information of the partial pattern of each table is expressed as PT1, PT2, PMR, PTa and PS as shown.

(2.2.4) Drive Waveform Decoder (2)

Figure 25:
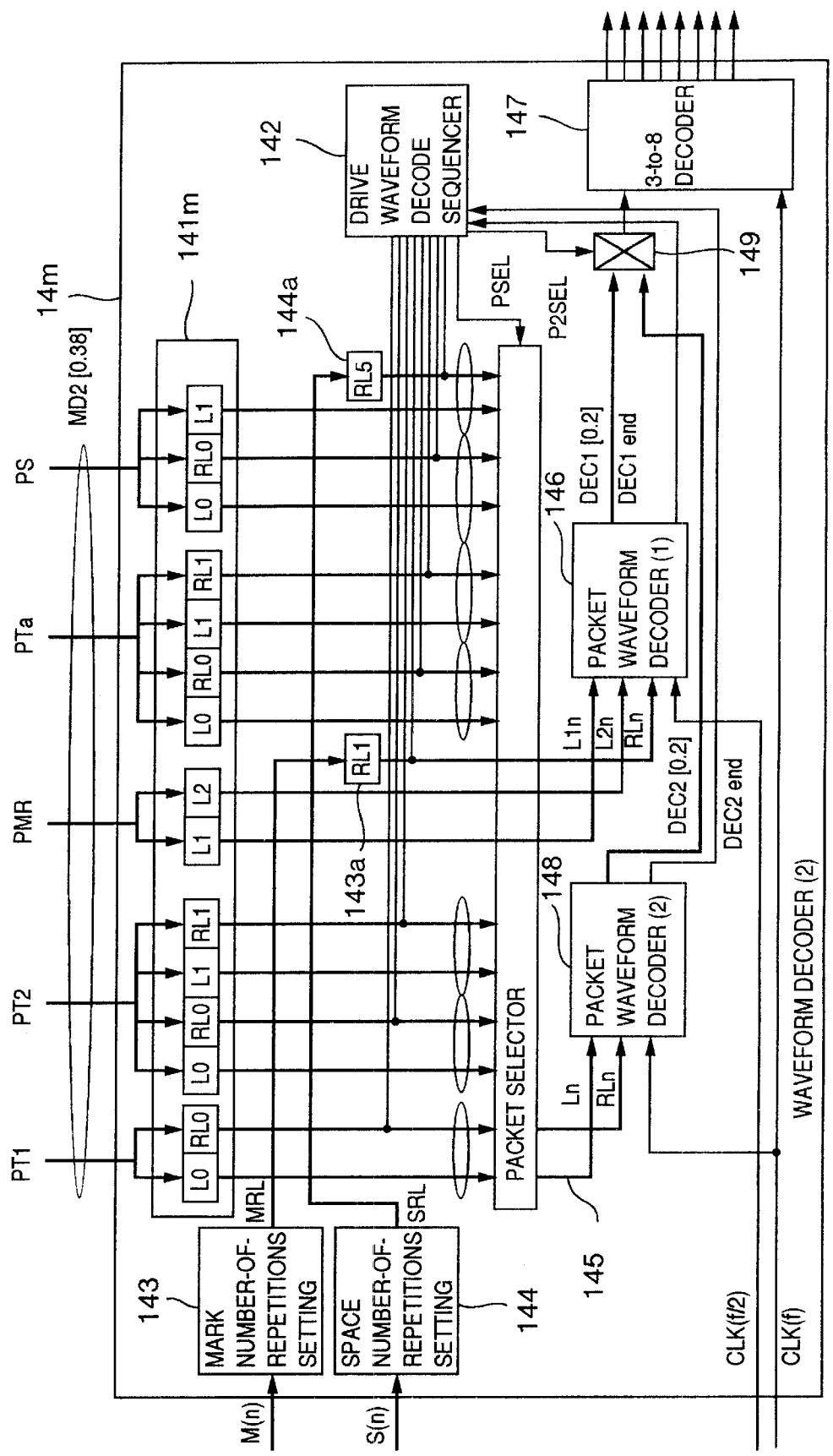
FIG. 25 is a diagram showing a configuration of the drive waveform decoder according to the second and third embodiments.

FIG. 25 shows a corresponding configuration of the drive waveform decoder (2) 14. This configuration is different from that of the drive waveform decoder (1) (FIG. 19) of the first embodiment in that two types of packets including (L, RL) and (L1, L2) are used as a partial pattern. The packet (L1, L2) is used for the repeat section as in the first embodiment. The partial pattern is described by the packet (L, RL) for the other sections. For this purpose, the packet waveform decoder (2) 148 is included. The partial pattern packet PMR for the repeat section is supplied to the packet waveform decoder (1), and the packets of the partial pattern for the other sections are supplied to the packet waveform decoder (2).

A drive waveform decode sequencer 142, which is similar to the one described above, supplies the packets sequentially from the PT1 packet of the Top(1) section to the packet waveform decoder through the packet selector. The outputs of the packet waveform decoder (1) 146 and the packet waveform decoder (2) 148 are selected by the switching unit 149 and supplied to the 3-to-8 decoder 147.

(2.2.4.1) Packet Decoder (2)

Figure 20B:
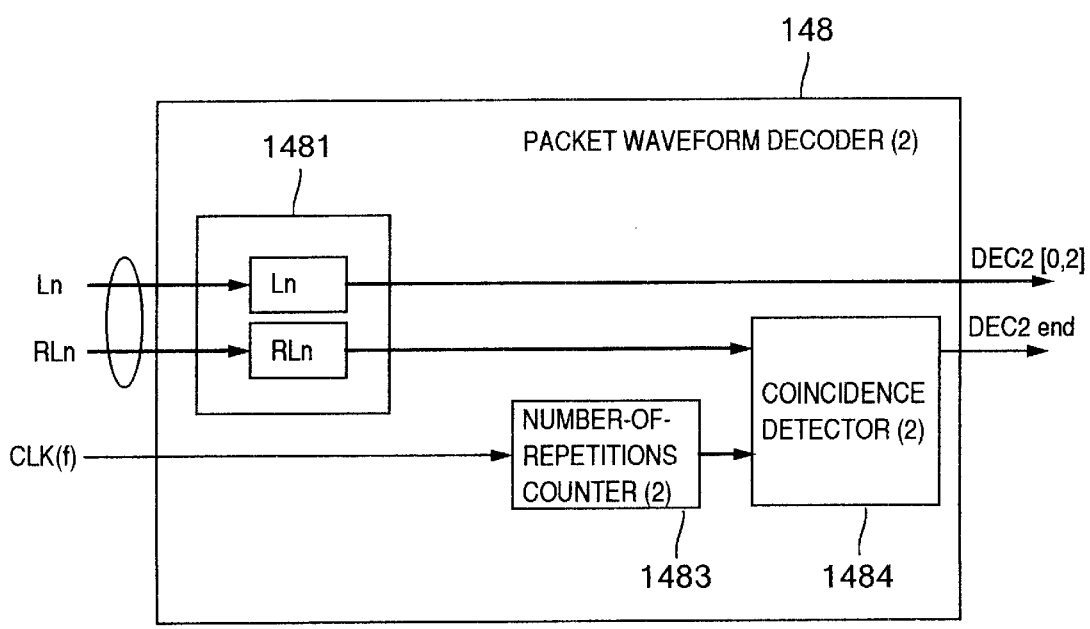

A configuration of the packet waveform decoder (2) is shown in FIG. 20B. The feature of this configuration is that the packet is (L, RL) and the clock for the number-of-repetitions counter 1483 is CLK(f).

(2.3) Effects of Second Embodiment

As compared with the first embodiment, the second embodiment has the following additional effect. The drive waveform is described by a partial pattern and the index information for selecting the particular partial pattern. As compared with the first embodiment, therefore, the capacity of the drive waveform information storage (memory) built in the laser drive integrated circuit can be reduced to one third.

(3) Third Embodiment

Now, a third embodiment of the invention will be explained.

(3.1) Configuration of Third Embodiment

Figure 3:
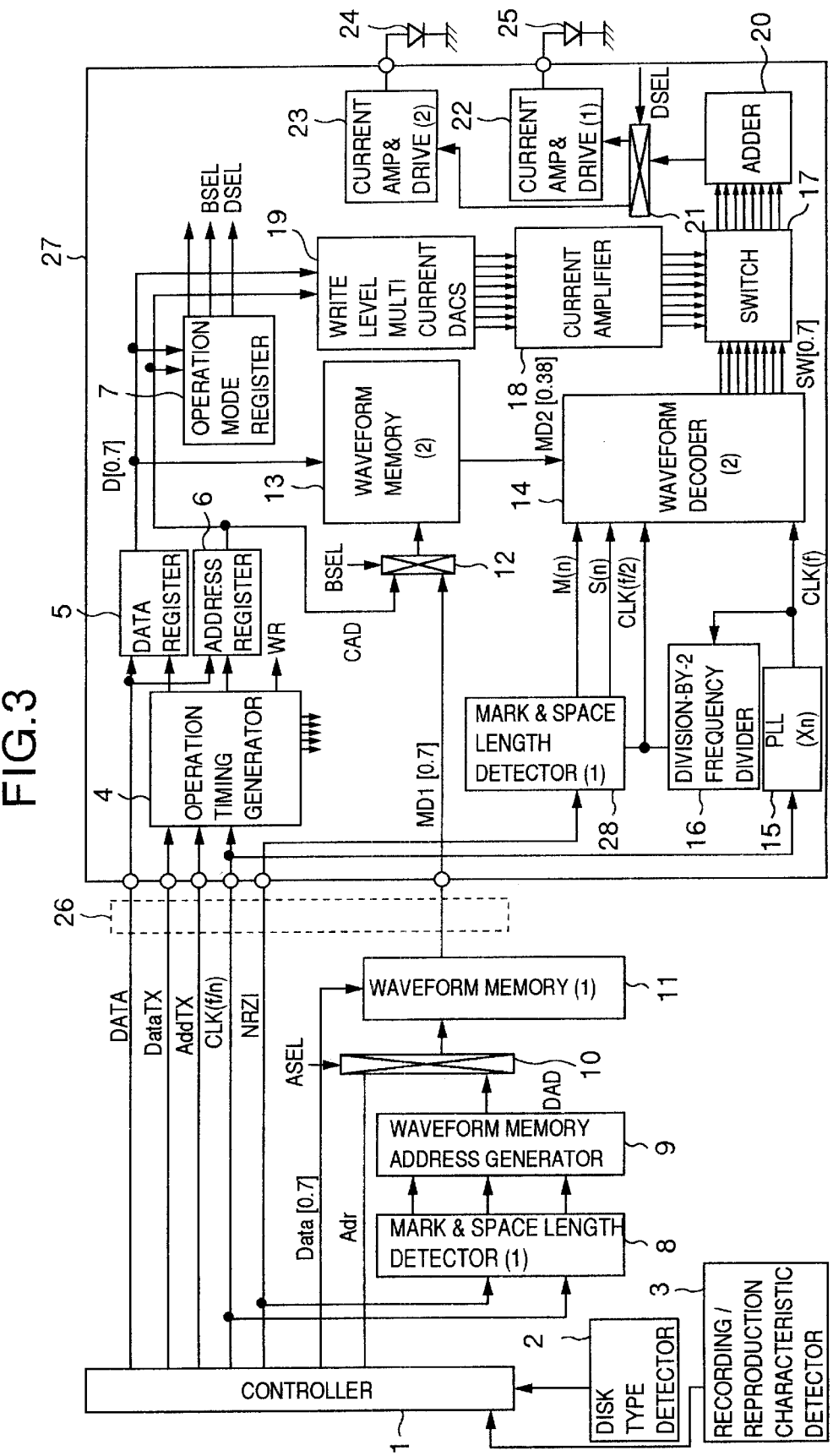
FIG. 3 is a diagram showing a configuration according to a third embodiment of the invention.

FIG. 3 is a diagram showing a configuration of the third embodiment. This configuration is different from that of the second embodiment in that the mark/space length detector 8, the address generator 9, the switching unit 10 and the drive waveform information storage (1) 11 are removed from the laser drive integrated circuit 27 and arranged on the fixed unit. In addition, the laser drive integrated circuit 27 includes mark/space length detector (2) for detecting the mark length M(n) and the space length S(n).

(3.2) Effects of Third Embodiment

In this embodiment, the partial pattern is stored in the drive waveform information storage (2) 14. Therefore, the total storage capacity of the drive waveform information can be further reduced to one third, and so can the size of the laser drive integrated circuit. The index information is supplied by flexible wires. Although the number of wires increases by eight, the index information can be transferred with a set of mark and space. Therefore, the signal speed can be reduced to at least one sixth for the NRZI signal.

As a consequence, high-speed data transfer is not required, and the unrequired radiation due to the increased speed poses no problem of the skew which otherwise might be caused by the wiring length. Also, the index information are temporally multiplexed with four wires of 4 bits plus 4 bits and supplied to the laser drive integrated circuit, and the received signal is decoded to eight bits. In this way, the number of wires can be reduced.

(4) Fourth Embodiment

Now, a fourth embodiment of the invention will be explained. The fourth embodiment is different from the first to third embodiments in that unlike in the first to third embodiments in which the drive waveform is stored and decoded in minimum time units of one half of the period T (minimum time unit in which NRZI signal changes), the fourth embodiment is such that the drive waveform is stored and decoded in minimum time units of T/m (m: integer).

(4.1) Configuration of Fourth Embodiment

Figure 30:
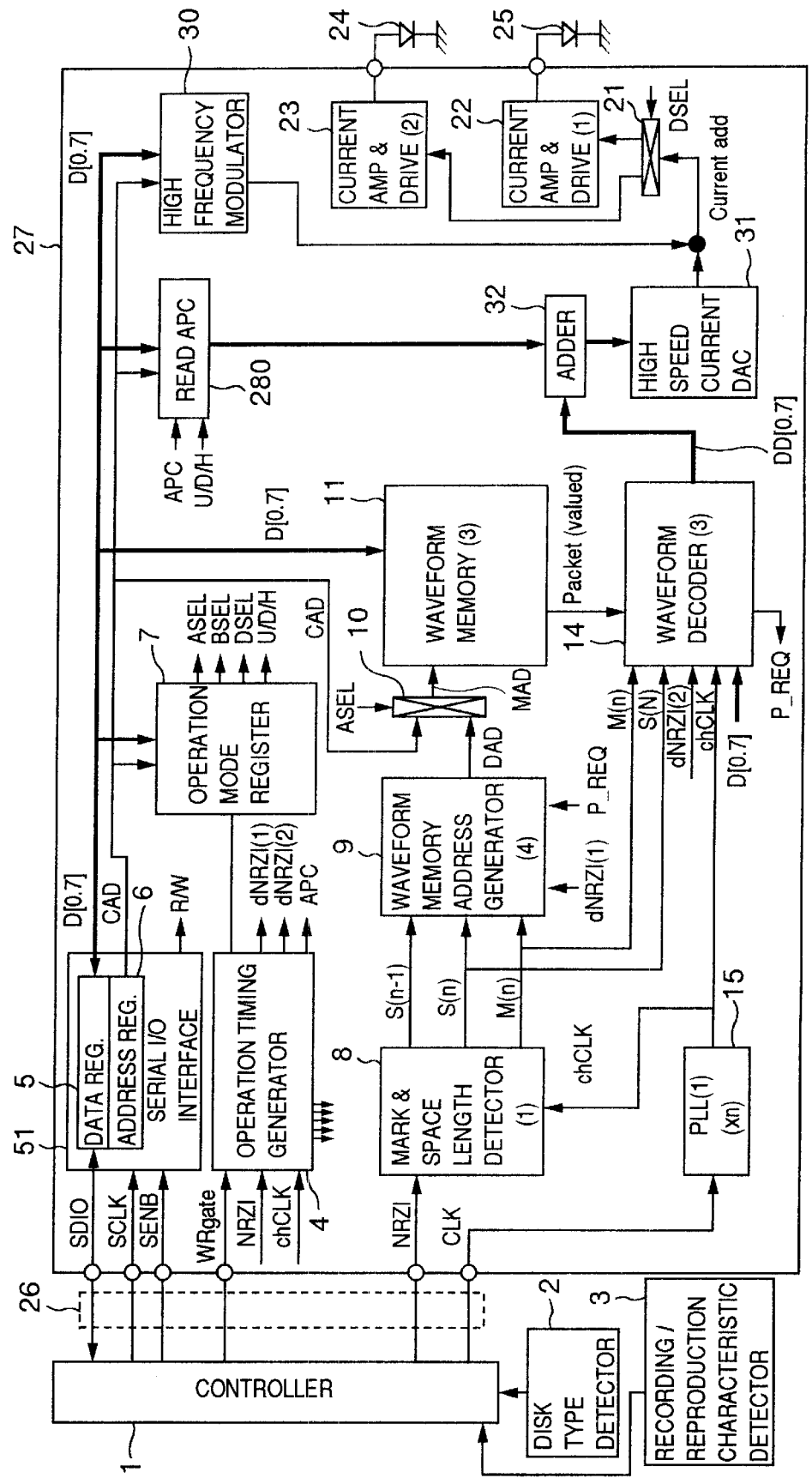
FIG. 30 is a diagram showing a configuration according to a fourth embodiment of the invention.

FIG. 30 is a diagram showing a configuration of the fourth embodiment. The component parts having the same functions as the corresponding ones in FIG. 1 are designated by the same reference numerals, respectively.

Numeral 32 designates an adder (digital adder means) for adding the output signal DD of the drive waveform decoder (3) 14 and the output signal of the read APC (auto power control) (reproduction power controller) 280 for controlling the laser drive current for reproduction, numeral 31 a high-speed current DAC (digital-to-analog converter) supplied with an output signal of the digital adder 32 for outputting a corresponding output current, numeral 30 a high frequency modulator (high frequency multiplexer circuit) for amplitude-modulating the laser drive current at high frequency for reproduction, numeral 21 switching unit for introducing a current signal constituting the sum, produced in current fashion, of the outputs of the high-speed current DAC 31 and the high-frequency multiplexer circuit 30 to the laser diode 24 or 25, and numeral 51 a serial I/O interface (serial I/F unit) for serially exchanging the data between the controller 1 and the laser drive integrated circuit 27 based on the serial data signal SDIO from the controller, the sync clock signal SCLK for the signal SDIO and the enable signal SENB indicating the transfer section of the serial data SDIO.

(4.2) Operation of Fourth Embodiment

The operation and each part of the fourth embodiment will be described in detail.

(4.2.1) General Operation of Fourth Embodiment

The mark/space length detector (1) 8, like the corresponding part of the first to third embodiments, outputs the preceding space length S(n−1), the mark length M(n) and the succeeding space length S(n) based on the binary recording signal NRZI (changing in units of period T) supplied from the controller 1 and the channel clock signal chCLK (period T) supplied from the n-tuple circuit 15. This output is supplied to the address generator (4) 9. The address generator (4) 9 outputs an address signal DAD to the drive waveform information storage (3) 11 based on S(n−1), M(n), S(n), the operation mode of the operation mode register 7, the signal dNRZI (1) (the NRZI signal delayed by a predetermined time) supplied from the timing generator 4 and the packet request signal P_REQ supplied from the drive waveform decoder (3) 14. The drive waveform information storage (3) 11 outputs the drive waveform information "packet (valued)" corresponding to the address signal DAD. The drive waveform decoder (3) 14 decodes the original drive waveform based on the drive waveform information "packet (valued)", M(n), S(n), chCLK and the signal dNRZI (2) (the NRZI signal further delayed by a predetermined time) supplied from the timing generator 4. The digital adder 32 adds the output signal DD of the drive waveform decoder (3) 14 to the laser drive current value information for reproduction supplied from the reproduction power controller 280. The resulting sum is supplied to the high-speed current DAC 31 and converted into a current. The output current of the high-speed current DAC 31 is further added in analog fashion to the amplitude-modulated current supplied from the high-frequency modulator circuit 30, and the sum is supplied to the switching unit 21. The driver 22 amplifies the current supplied from one of the outputs of the switching unit 21 thereby to current-drive the laser diode 24. The switching unit 21 is controlled by the operation mode register 7.

At the time of reproducing the data from the disk, the current value corresponding to the laser drive current value information for reproduction supplied from the reproduction power controller 280 is added to the amplitude-modulated current supplied from the high-frequency modulator circuit thereby to current-drive the laser diode 25 or 24. Also, at the time of recording in the disk, the output signal DD of the drive waveform decoder (3) 14 is added to the laser drive current value information for reproduction, so that the current-converted current drives the laser diode 25 or 24. The operation of the high-frequency modulator circuit 30 and the reproduction power controller 280 is controlled by the controller 1 through the serial I/F 51.

The address value and the data value supplied from the controller 1 through the serial I/F 51 are supplied to the drive waveform information storage (3) 11, and the drive waveform information is stored in the corresponding address of the drive waveform information storage (3) 11. At the same time, the switching means 10 is switched so as to supply the address signal CAD from the serial I/F 51 to the drive waveform information storage (3) 11.

Figure 36:
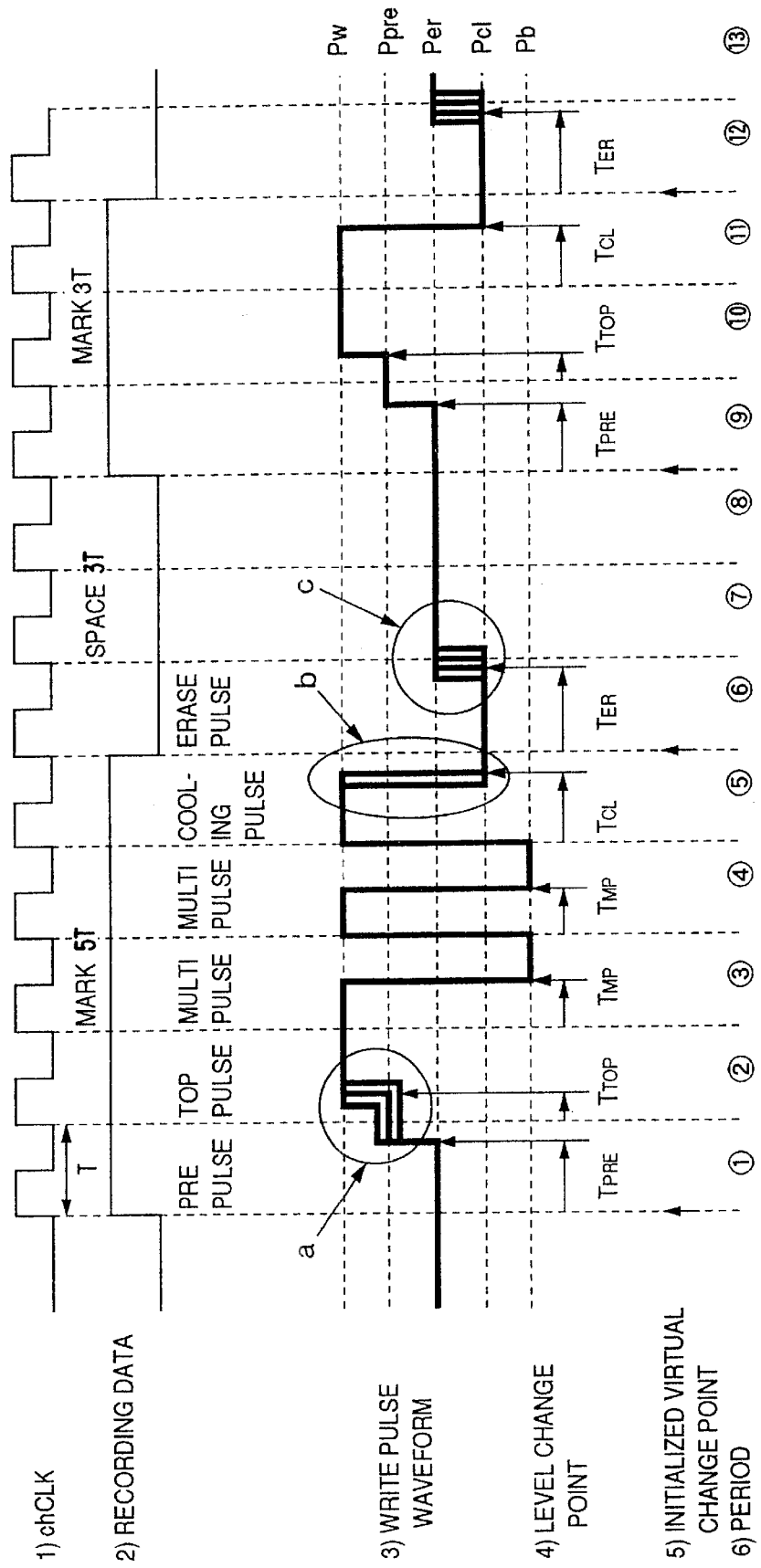
FIG. 36 is a diagram showing an example of the drive waveform for a laser diode according to the fourth and fifth embodiments.

(4.2.2) Drive Waveform and Description Method of Fourth Embodiment (4.2.2.1) Drive Waveform Example of Fourth Embodiment FIG. 36 shows a drive waveform example according to the fourth embodiment. In FIG. 36, the channel clock signal chCLK is shown in (1), the NRZI signal constituting the binary recording data in (2), the drive waveform in (3), the level change point of the drive waveform (time from the starting time point of each period T) in (4), and the section in (6). In this example, sections ① to ⑤ are for recording a 5T-long mark, sections ⑥ to ⑧ a 3T-long space, and sections ⑨ to ⑩ for recording a 3T-long mark. The characters Pw, Ppre, Per, Pc1 and Pb on the ordinate in (3) of FIG. 36 represent the levels of the drive waveform (corresponding to the magnitude of the drive current value).

The portion from the change point Tpre of section ① to the change point Ttop of section ② represents the Pre pulse, the portion from Ttop to the starting point of section ③ the Top pulse, sections ③ and ④ the Multi pulse, the portion from the starting point of section ⑤ to the change point Ter the Cooling pulse, and the portion from the change point Ter to the change point Tpre of the next mark the Erase pulse.

In FIG. 36, the portion designated by a indicates that the level after the change point Tpre changes in dependence on the mark length M(n), the preceding space length S(n−1), the succeeding space length S(n), etc. and that the change point Ttop changes in dependence on S(n−1), M(n) and S(n). In FIG. 36, the portion designated by b indicates that the change point Tc1 changes in dependence on S(n−1), M(n) and S(n). Similarly, the portion designated by c indicates that the change point Ter changes in dependence on S(n−1), M(n) and S(n). In this example in which Ppre is set as the level after the change point Tpre, the levels Ppre, Ttop, Tc1 and Ter change in dependence on S(n−1), M(n) and S(n). In this case, Ppre and Ttop are dependent on the preceding space length S(n−1) and the mark length M(n), and are assumed to change between 9 cases obtained from the product S(n−1) '*M(n)' of 3 cases S(n−1)={3T/4T/5T or more} and three cases M(n)={3T/4T/5T or more}. Also, the values of Tc1 and Ter change between 9 cases obtained from the product S(n) '*M(n)' of 3 cases of M(n)={3T/4T/5T or more} and 3 cases of S(n)={3T/4T/5T or more}. The minimum unit of change of the drive level Ppre is dependent on the resolution of the high-speed current DAC 31, and the minimum unit of temporal change of the change points Ttop, Tc1 and Ter is dependent on the time resolution T/m (m: integer) of the change point timing generator 1407 described later. Also, the number of Multi pulses, which is 0 for the 3T mark, one for the 4T mark, and two for the 5T mark, is dependent on the mark length M(n).

The change points Tpre and Tmp are not dependent on S(n−1), M(n) and S(n) but the level of the drive waveform is assumed to change at predetermined change points. Also, the levels Pw, Per, Pc1 and Pb of the drive waveform after each change point except for Ppre after Tpre are neither dependent on S(n−1), M(n) and S(n) but assume a predetermined value.

(4.2.2.2) Drive Waveform Description Method of Fourth Embodiment

In the drive waveform description method according to the fourth embodiment, the change point CP and a subsequent level L are paired and with this as a minimum drive waveform description unit, the drive waveform is described. This paired minimum drive waveform description unit and the attribute thereof are set as one packet to describe the drive waveform for the 1T section. The packet configuration is described below.

Packet=(CP-1, L-1, CP-2, L-2, attribute) where CP-1 is the position where the level of the drive waveform first changes in section T and is the time elapsed from the starting point of section T. L-1 is the level after the change point CP-1. CP-2 is the position (the time elapsed from the starting point of section T) where the level changes after CP-1 in section T (or in the subsequent section). L-2 is the level after the change point CP-2. The attribute is that of the packet, and is determined as R-flag in this case. R-flag is a flag indicating that the packet is repeated in units of T.

(4.2.2.3) Example of Drive Waveform Description of Fourth Embodiment

FIG. 37 shows an example description of the drive waveform explained above. The first column indicates the period, the second column a mark or a space, the third to seventh columns the contents of the packets in each period, and the eighth column the packet function.

This example description will be explained by comparison with the drive waveform of FIG. 36. The Pre pulse packet in period ① is given as (CP-1, L-1, CP-2, L-2, R-flag)=(0, Per, Tpre, Ppre, 0). CP-1=0 means that the level at the starting point of a mark is set forcibly to Per. Originally, in the drive waveform, there is no change point at CP-1=0, but the initial level of the mark is set by this change point. This is to avoid the continuation of a past erroneous level value when the circuit runs away or goes out of control.

A similar processing is conducted with a virtual change point set also at the starting point of a space. This virtual initialization change point is shown in (5) of FIG. 36.

CP-2=Tpre indicates that the level changes Tpre time after the starting point of period ①, and the level after this change is L-2=Ppre. R-flag=0 indicates that this packet is not repeated. In a similar fashion, the Top pulse packet for period ② is (Ttop, Pw, N.C, *, 0). CP-2=N.C indicates that there is no change point in the same period after CP-1. Therefore, the level after CP-2 becomes "don't care" (*). Periods ③ and ④ are a Multi pulse repeat packet expressed as (0, Pw, Tmp, Pb, 1). The multi pulses are formed by repeating the Multi pulse repeat packet in units of 1T. There is no change point in the drive waveform at the start of period ③. By using the Multi pulse packet described above, however, the types of the packets required for description is reduced. Period ⑤ indicates a Cooling pulse packet.

The drive waveform of the 5T mark can be expressed by the four types of packets described above. In similar fashion, the mark of 4T or more can also be described with the four types of packets described above simply by differentiating the number of Multi pulses. The number of Multi pulses is uniquely determined in dependence on the mark length M(n), and therefore the waveform can be decoded by detecting M(n). As shown in periods from ⑨, the 3T mark, which is equivalent to the pulse of 4T or more and simply lacking Multi pulses, can be expressed by three types of packet including the Pre pulse packet, the Top pulse packet and the Cooling pulse packet.

The 3T space of periods ⑥ to ⑧ can be expressed by the Erase packet (0, Pc1, Ter, Per, 0), the preceding value hold packet (N.C, *, N.C, *, 0) and the preceding value hold repeat packet (N.C, *, N.C, *, 1). The space of 3T or more can be expressed also by the three types of packets described above except that the number of repetitions of the preceding value hold repeat packet is different.

The preceding value hold packet and the preceding value hold repeat packet are provided for the following reason. As shown by c in FIG. 36, it is assumed that the range of change of Ter is not limited within period ⑥ but extends into adjacent period ⑦ in some cases. Therefore, the value that each CP-2 can assume is not limited to T or less but allowed to 2T or less. As a result, no different description of the drive waveform is required between CP-2<T and CP-2>T, but the drive waveform can be expressed in one packet. Therefore, the packet processing is required for the case in which CP-2 is T or more in the drive waveform decoder (3) 14 described later. To facilitate this processing, the succeeding packet is set as a preceding value hold packet for meeting the requirement for the case of CP-2>T and thus discriminated from the preceding value hold repeat packet. In similar fashion, the Top pulse packet (Ttop, Pw, N.C, *, 0) having only one change point is set to (N.C, *, Ttop, 0) as a mark description packet, whereby CP-2 of the preceding packet can be expanded to 2T or less. The waveform example of FIG. 36 involves the foregoing description since CP-2 of the preceding packet is Tpre which is smaller than T and assumed to remain unchanged.

(4.2.2.4) Drive Waveform Description Using Variables and Variable Values Table

To summarize, the 3T mark can be expressed by three packets, the 4T mark or more by four packets, and the space by three packets regardless of the space length. This waveform expression, however, is simply based on the assumption that the parameters Ppre, Ttop, Tc1, Ter are variables changing in dependence on S(n−1), M(n) and S(n), and the parameters Tpre, Tmp, Pw, Per, Pc1, Pb are constants not dependent on S(n−1), M(n) and S(n), and does not represent the description of an actual waveform. The complete description and decoding of a waveform becomes possible by setting specific values of the variables in dependence on S(n−1), M(n) and S(n).

In view of this, the fourth embodiment is so configured to prepare a waveform description using the variables and the constants described above and a variable values table and a constant values table with parameters arranged in dependency on S(n−1), M(n) and S(n). As a result, the packets with the variable values and the constant values expressed by label (called the index packets) are converted into the packets with the variable values and the constant values expressed by actual values (called the valued packets).

Figure 38:
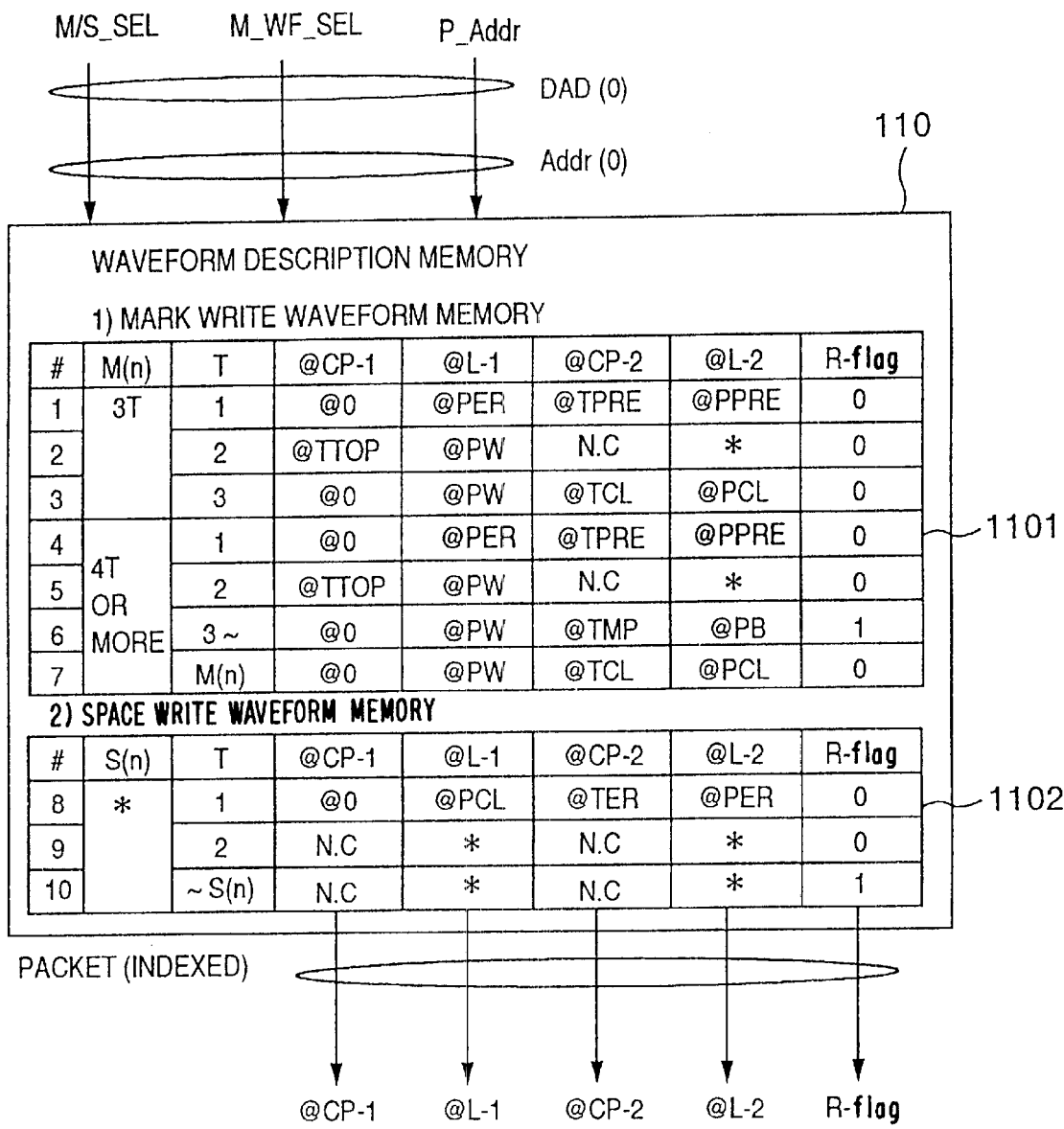
FIG. 38 is a diagram showing the contents of description of the drive waveform stored in the drive waveform information storage according to the fourth and fifth embodiments.
Figure 39:
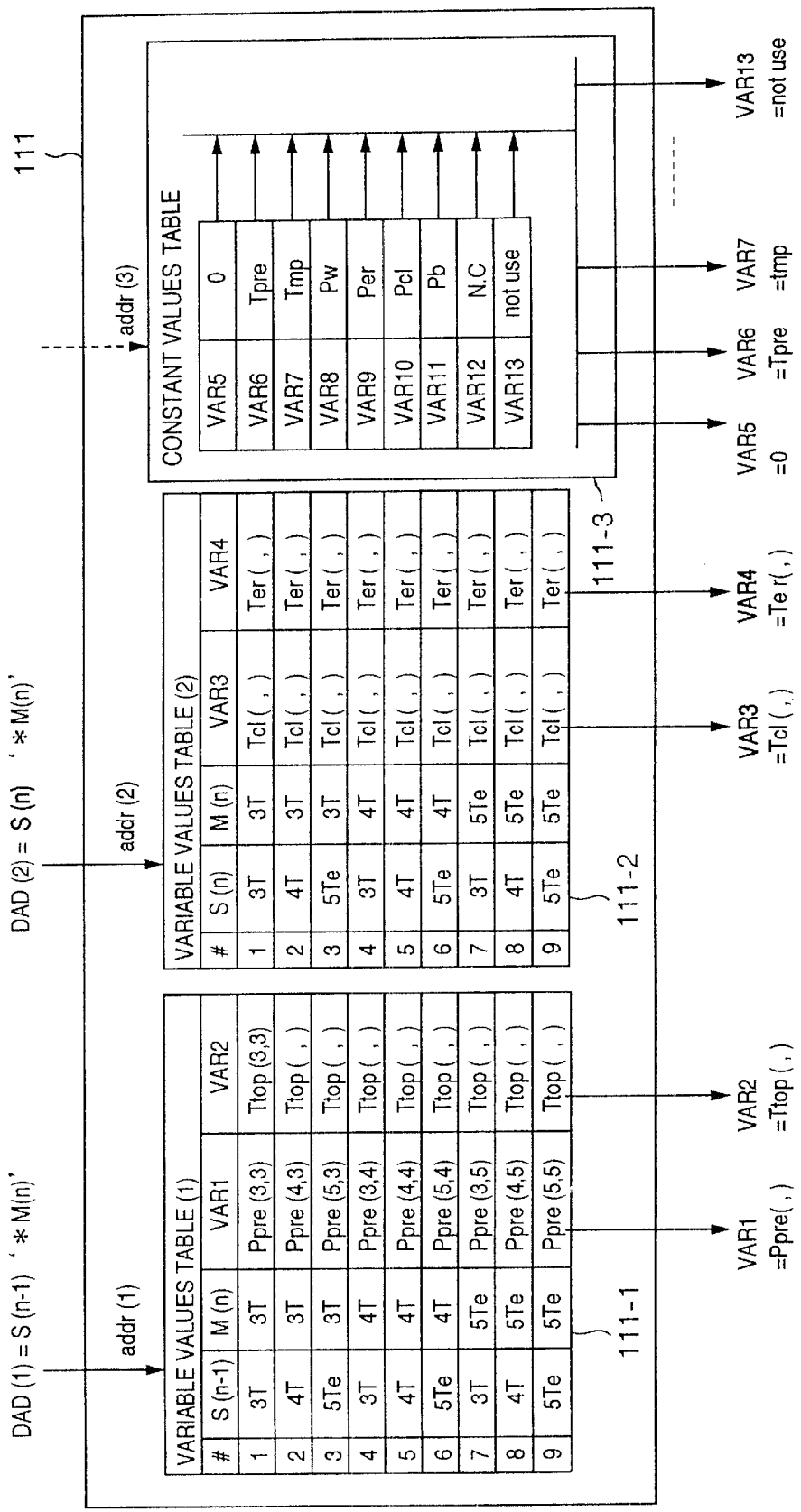
FIG. 39 is a diagram showing a configuration of a variable values storage unit of the drive waveform information storage and the contents stored therein according to the fourth and fifth embodiments.

FIG. 38 shows the mark and space description using variables and constants. Characters @CP-1, @L-1, @CP-2 and @L-2 represent the variables (labels) of CP-1, L-1, CP-2 and L-2, respectively. In similar fashion, the characters such as @Tpre and @Ppre accompanied by @ represent not a value itself but the label of a particular variable or constant. A configuration of the variable values table and the constant values table is shown in FIG. 39. In accordance with these tables, the indexed packets expressed by the label shown in FIG. 38 are replaced by the variable values and the constant values of FIG. 39, so that valued packets are generated based on the actual values. The valued packets are each decoded to the drive waveform by the drive waveform decoder (3) 14. The configuration and the operation of each component part of the fourth embodiment will be explained below.

(4.2.3) Address Generator (4) of Fourth Embodiment

Figure 32:
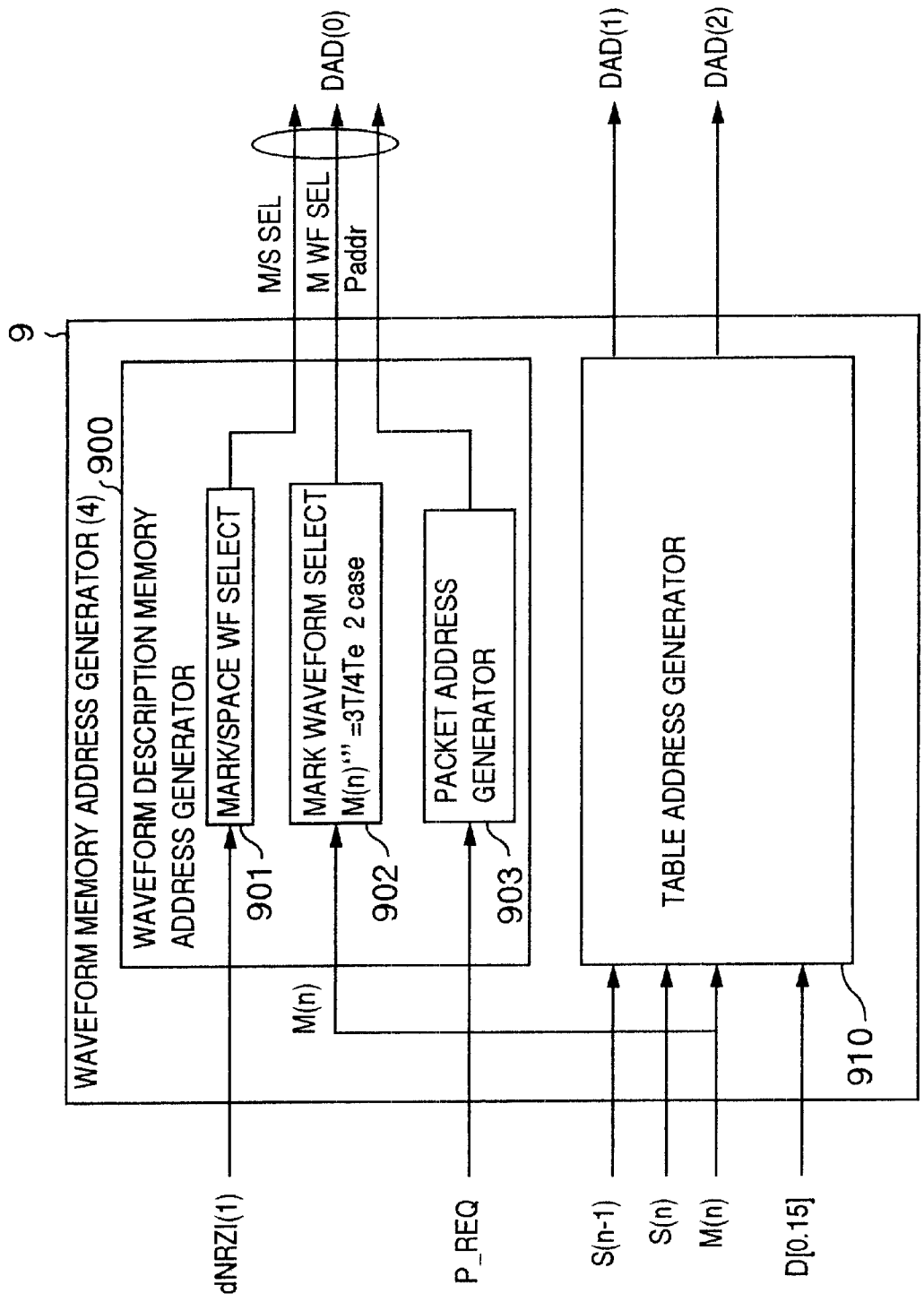
FIG. 32 is a diagram showing a fourth configuration of the address generator.

FIG. 32 shows a configuration of the address generator (4) 9 according to the fourth embodiment. This address generator (4) 9 includes a waveform description memory address generator 900 and a table address generator 910.

(4.2.3.1) Drive Waveform Description Memory Address Generator

The drive waveform description memory address generator 900 generates an address for selecting an indexed packet for describing the mark and the space stored in the waveform description memory 110 shown in FIG. 38. This drive waveform description memory address generator 900 includes a mark/space waveform selector 901 for selecting a packet series describing a mark or a packet series describing a space, mark waveform selector (mark description waveform 3T/4Te selector) 902 for selecting a packet series describing a 3T mark or a packet series describing a 4T mark or more of the mark description waveform, and packet addressing generator 903 for generating an address of each packet of the packet series selected.

The mark/space waveform selector 901 outputs an output signal M/S_SEl based on the dNRZI (1) signal (the NRZI signal delayed by a predetermined time) supplied from the timing generator 4. The mark description waveform 3T/4Te selector 902 outputs an output signal M_WF_SEL based on the detected mark length M(n) supplied from the mark/space length detector 8. The packet addressing generator 903, on the other hand, outputs an output signal P_addr based on the packet request signal P_REQ supplied from the drive waveform decoder (3) 14 described later. The output signals M/S_SEL, M_WF_SEL and P_addr are collectively called the DAD(0).

(4.2.3.2) Table Address Generator

Figure 33:
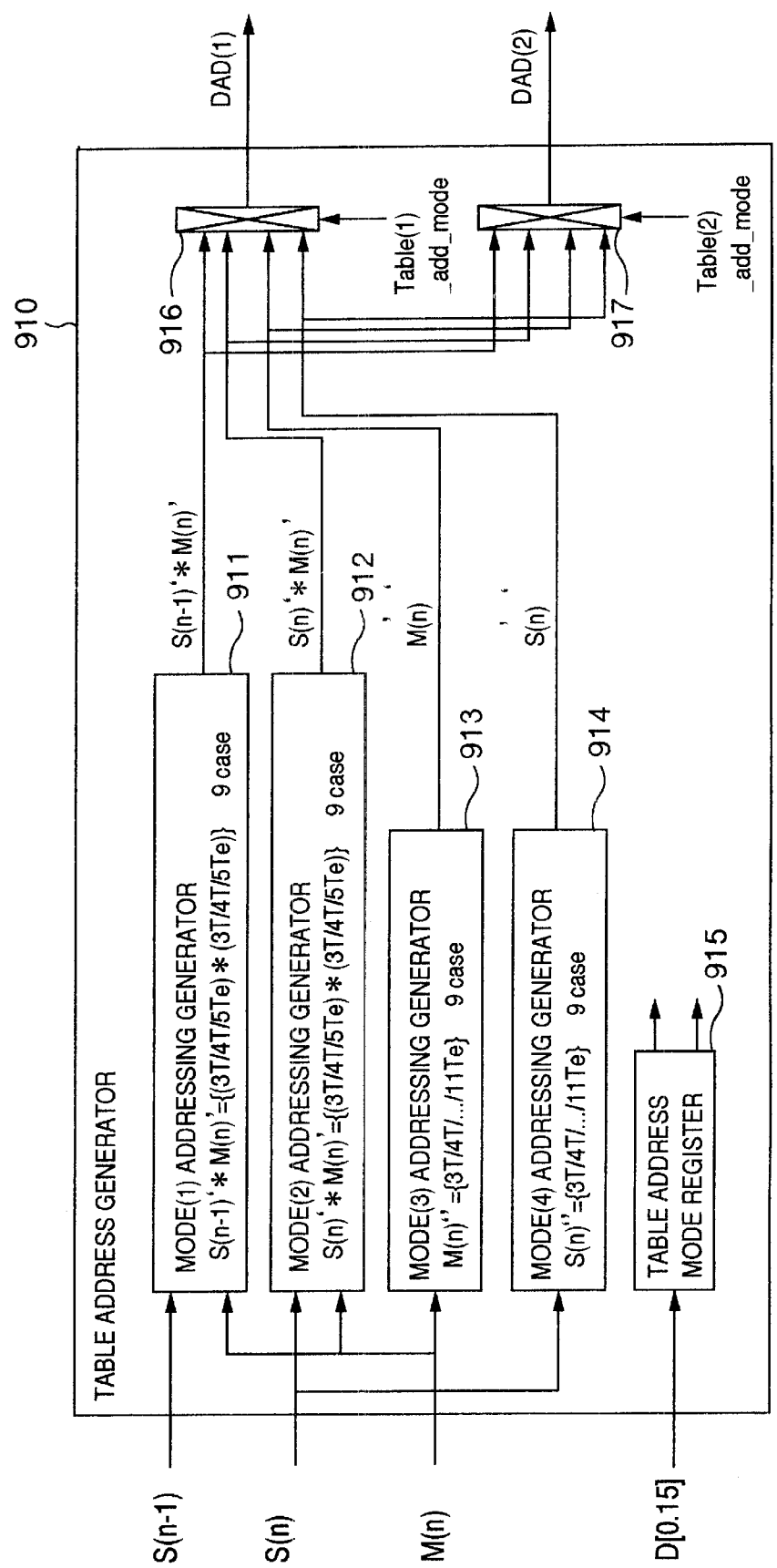
FIG. 33 is a diagram showing a configuration of the table address generator of the fourth address generator.

FIG. 33 shows a configuration of the table address generator 910. This table address generator 910 generates an address in a table containing variable values corresponding to the above-mentioned variables, based on the preceding space length S(n−1), the succeeding space length S(n) and the mark length M(n) supplied from the mark/space length detector 8. Each variable has a different value depending on S(n−1), S(n) and M(n), and has a different degree of dependence on S(n−1), S(n) and M(n). This table address generator 910 has the following four types of dependence mode. These modes can be selected by the selectors 916, 917.

Numeral 911 designates a mode (1) address generator (mode (1) address generator) which outputs table addresses corresponding to nine cases of the product S(n−1) '*M(n)' of three cases S(n−1)={3T/4T/5T or more} and three cases M(n)={3T/4T/5T or more}. Numeral 912 designates a mode (2) address generator which outputs table addresses corresponding to nine cases of the product S(n) '*M(n)' of three cases S(n)={3T/4T/5T or more} and three cases of M(n)={3T/4T/5T or more}. Numeral 923 designates a mode (3) address generator which outputs table addresses corresponding to nine cases of M(n)={3T/4T , , , /11T or more}. Numeral 914 designates a mode (4) address generator which outputs table addresses corresponding to nine cases of S(n)={3T/4T , , , /11T or more}.

The outputs of the address generators of modes (1) to (4) are supplied to the selectors 916 and 917, respectively. The selector 916 selectively outputs one of the outputs of the mode address generators. The mode address selected is set by the table address mode register 915. In similar fashion, the selector 917 selectively outputs one of the outputs of the mode address generators. The output signal DAD(1) of the selector 916 makes up an address signal for the variable values table (1) 112 described later. The output signal DAD(2) of the selector 917, on the other hand, constitutes an address signal of the variable values table (2) 113. In accordance with the example drive waveform shown in FIG. 36, the selector 916 selects the output S(n−1) '*M(n)' of the mode (1) address generator 911. Also, the selector 917 selects the output S(n) '*M(n)' of the mode (2) address generator 912.

The output signal DAD(0) of the drive waveform description memory address generator 900 and the output signals DAD(1) and DAD(2) of the table address generator 910 are collectively called the output signal DAD of the address generator (4) 9. This address signal DAD is supplied to the drive waveform information storage (3) 11 through the switching unit 10.

(4.2.4) Drive Waveform Information Storage (3)

Figure 34:
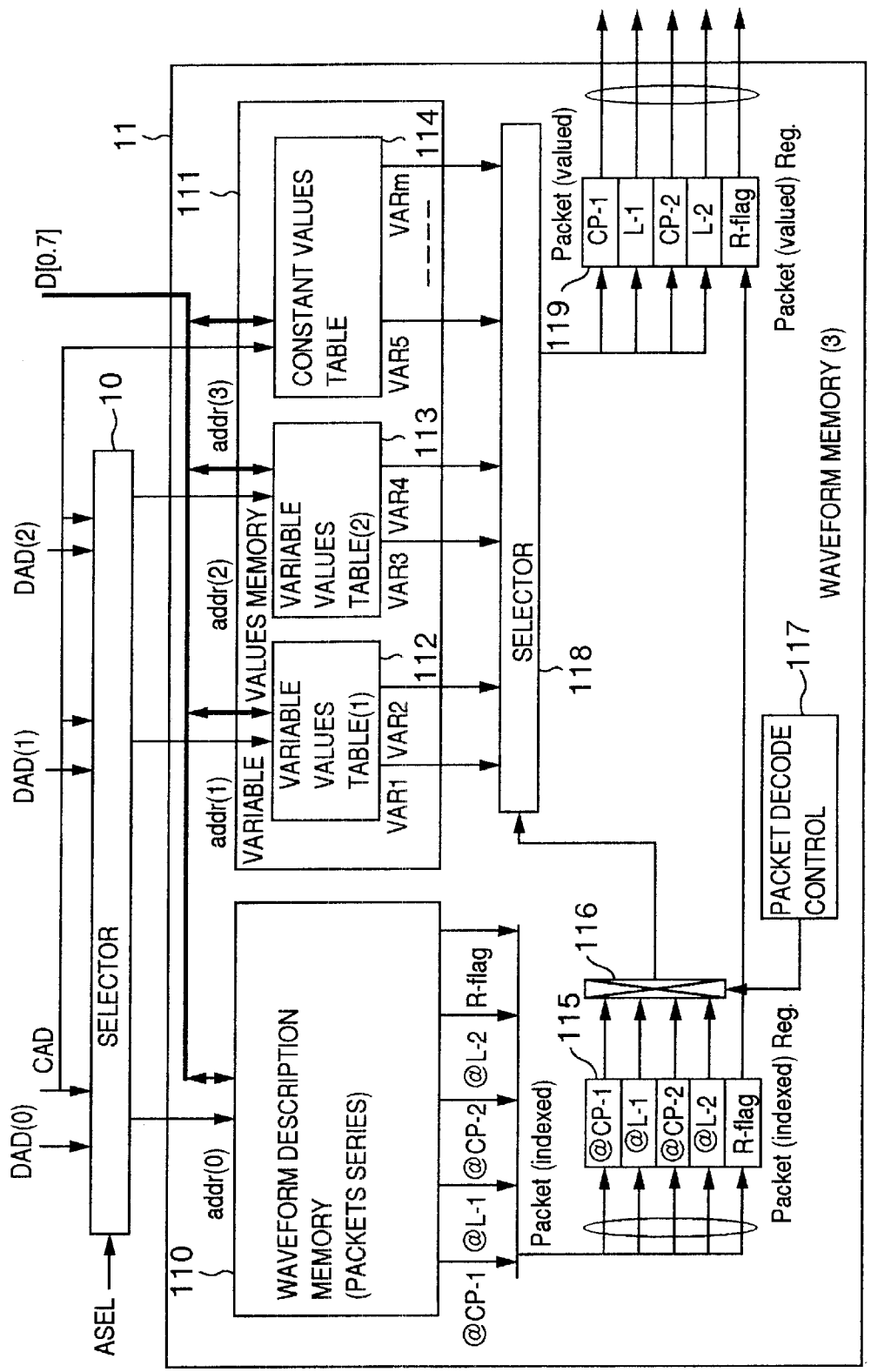
FIG. 34 is a diagram showing a drive waveform information storage (3) according to the fourth and fifth embodiments.

FIG. 34 shows a configuration of the drive waveform information storage (3) 11 according to a fourth embodiment. This drive waveform information storage (3) 11 includes a drive waveform description memory 110 for storing the drive waveform described in the indexed packet described above, a variable values memory 111 for storing the variable values corresponding to each variable and the constant values, a packet (index) register 115 for temporarily receiving the indexed packet data Packet (indexed)=(@CP-1, @L-1, @CP-2, @L-2, R-flag) output from the drive waveform description memory 110, a selector 116 for selecting @CP-1, @L-1, @CP-2 or @L-2 of the packet (index) register 115 and outputs it as a control signal for the selector 115, a packet decode controller 117 for controlling the selector 116, a selector 118 for selecting one of the variable values VAR1 to VAR4 and the constant values VAR5 to VARm (m: integer) supplied from the variable value storage memory 111 in accordance with the output signal of the selector 116 and supplying the selected output to the register at a predetermined position of the packet (numerical value) register 119, and a packet (numerical value) register 119 for temporarily storing a valued packet, i.e. Packet (valued)= (CP-1, L-1, CP-2, L-2, R-flag) based on the values corresponding to the variables and constants supplied from the output of the selector 118.

(4.2.4.1) Drive Waveform Description Memory

FIG. 38 shows a configuration of the drive waveform description memory 110. Numeral 1101 designates a mark write waveform memory (mark drive waveform description memory unit), and numeral 1102 a space write waveform memory (space drive waveform description memory unit). In FIG. 38, #1 to #10 in the first column designate the addresses of the indexed packets in the case where the mark drive waveform description memory unit 1101 and the space drive waveform description memory unit 1102 are configured of a single memory. Characters M(n) and S(n) in the second column designate the mark length and the space length, respectively. The character T in the third column designates the period in units of T from the starting time point of the mark or the space. The fourth to eighth columns designate the contents of each index packet. As described above, the drive waveform description memory 110 describes each drive waveform using the label of a variable and a constant. The character @ designates a label.

The drive waveform description memory 110 designates an address in accordance with the DAD(0) signal supplied from the address generator (4) 9, and outputs a designated index packet. Among the DAD(0) signals, the M/S_SEL signal selects the mark drive waveform description memory unit 1101 (#1 to #7) or the space drive waveform description memory unit 1102 (#8 to #10). Also, the M_WF_SEL signal selects the 3T mark drive waveform (#1 to #3) or the mark drive waveform (#4 to #7) of 4T or more stored in the mark drive waveform description memory unit 1101. The P_addr signal selects, as shown in the third column, the address of the indexed packet of each drive waveform.

The drive waveform description memory 110 outputs the data Packet (indexed)=(@CP-1, @L-1, @CP-2, @L-2, R-flag) of the indexed packet selected by the address signal DAD(0). When T=1 of the 3T mark is selected, for example, the output is Packet (indexed)=(@0, @Per, @Tpre, @Ppre, 0). This output signal Packet (indexed) is temporarily stored in the packet (index) register 115.

Each of @CP-1, @L-1, @CP-2, @L-2 of Packet (indexed) constitutes information as to which is selected among VAR1 to VARm output from the variable values memory 111. In the case where @L-2 =@Ppre, for example, VARx corresponding to the variable Ppre is selected. Thus, the number of bits required for each label is determined in dependency on the number m. If m<16, only four bits or less is sufficient. Thus, the size of the indexed packet is configured of a total of 17 bits (4 bits×4 labels+1 bit) (R-flag). According to this embodiment, the drive waveform description memory 110 can describe the mark and space drive waveforms with ten indexed packets, and therefore the memory size is only 170 bits (=17 bits×10 packets).

(4.2.4.2) Variable Values Memory

FIG. 39 shows a configuration of the variable values memory 111. The variable values memory 111 includes a variable values table (1) 111-1 for storing the variable values of the variables VAR1, VAR2 changed in value in dependency on S(n−1) '*M(n)', a variable values table (2) 111-2 for storing the variable values of the variables VAR3, VAR4 changed in value in dependency on S(n) '*M(n)', and a constant values table 111-3 for storing the values of the constants VAR5 to VAR13. According to this embodiment, the addressing mode of the variable values table (1) is the output of the mode (1) address generator 911, as described above. Also, the address mode of the variable values table (2) is the output of the mode (2) address generator 912. The addressing mode of each table can be set independently of each other from four modes, as already described.

In FIG. 39, various values are arranged with the variable VAR1 corresponding to the variable Ppre and the variable VAR2 corresponding to the variable Ttop. Also, the variable VAR3 is arranged as a value corresponding to the variable Tc1 and the variable VAR4 as a value corresponding to the variable Ter. The constants VAR5 to VAR11 are arranged as values corresponding to the constants 0, Tpre, Tmp, Pw, Per, Pc1 and Pb, respectively. The constant VAR12 is a code indicating the absence of a change point. VAR13 is not used.

In FIG. 39, A(x, y) indicates the value of the variable A when S(n) or S(n−1) is x and M(n) is y. Also, 5Te indicates that the mark length or the space length is 5T or more.

The variable values table (1) 111-1 outputs the variable values of VAR1 and VAR2 corresponding to the address signal DAD(1)=S(n−1) '*M(n)'. In the case where S(n−1) '=3T, M(n)'=5T, for example, the variable values Ppre (3, 5) and Ttop (3, 5) are output. The variable values table (2) 111-2 outputs the variable values of VAR3 and VAR4 corresponding to the address signal DAD(2)=S(n) '*M(n)'. In the case where S(n)'=3T, M(n)'=5T, for example, the variable values Tc1 (3, 5) and Ter (3, 5) are output.

(4.2.4.3) Memory Size

The size of this variable values memory 111 is as follows. Assume that the time resolution T/m is T/20 and the level resolution (resolution of the high-speed current DAC 31) is 1/256. The temporal variable value (say, Tc1) is 6 bits (assuming that the change width up to 2T is allowed) and the level variable value is 8 bits. Either temporal variables or level variables can be arranged in the variable values table (1) 111-1 and the variable values table (2) 111-2. It is therefore necessary to secure 8 bits (corresponding to the larger number of bits) per variable value. Therefore, the memory size of the variable values table (1) 111-1 is 144 bits (=8 bits×9 words×2 variables), and the memory size of the variable values-table (2) 111-2 is similarly 144 bits (=8 bits×9 words×2 variables).

The size of the constant values table 111-3 is 72 bits (=8 bits×9 constants). Therefore, the variable values memory 111 requires the size of only 360 bits in total. Thus, only 530 bits are required including 170 bits for the drive waveform description memory 110 explained above.

As compared with 1134 bits for the first embodiment (FIG. 18) and 332 bits for the second embodiment described with the index information (FIG. 22) and the partial pattern information (FIG. 21), the waveform description method of the fourth embodiment can be controlled both temporally and in terms of level, while at the same time reducing the memory size below that of the first embodiment. Also, as compared with the second embodiment, a large freedom of the waveform description is obtained with a slight increase in memory size.

(4.2.4.4) Drive Waveform Information Storage (4)

Figure 35:
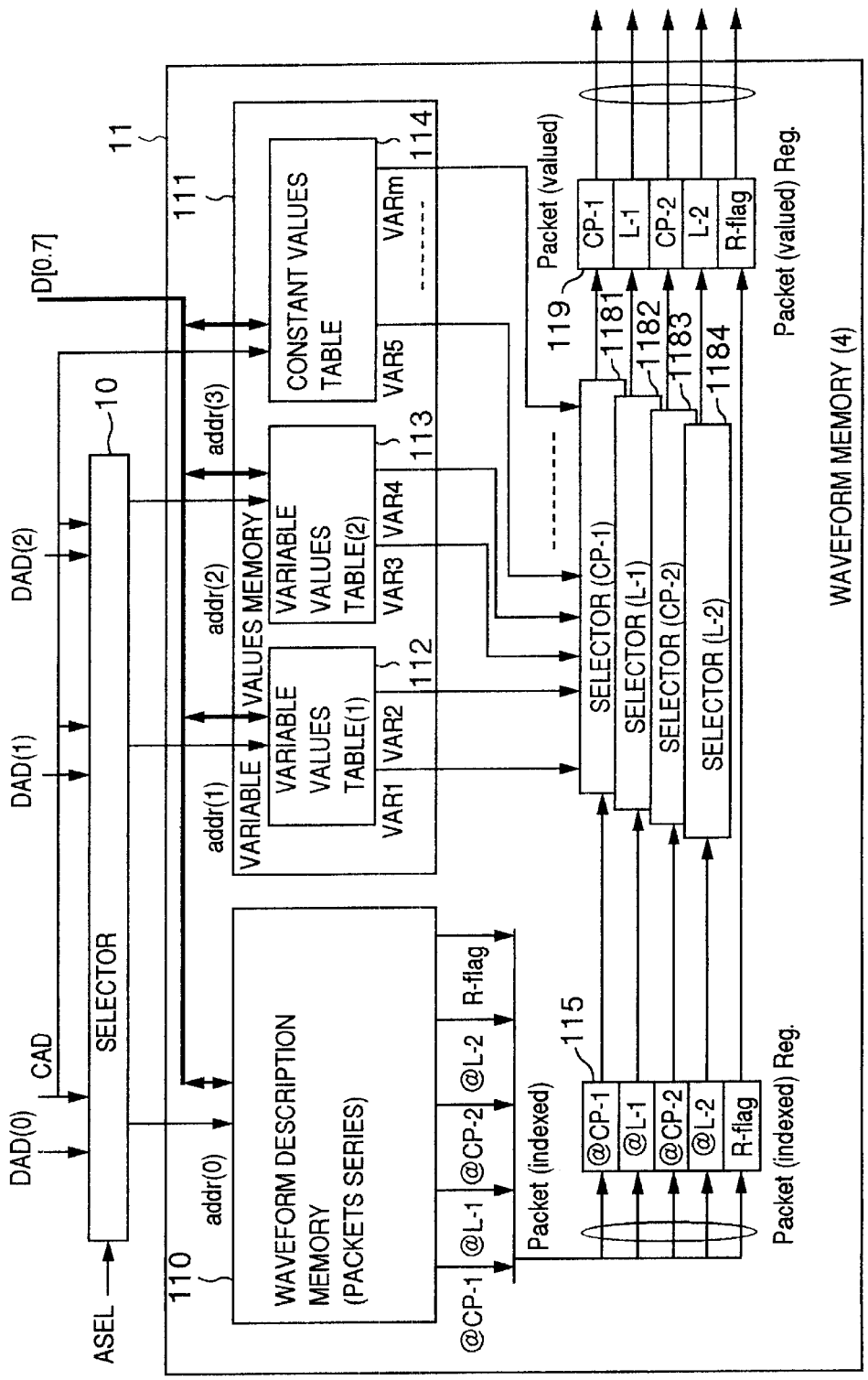
FIG. 35 is a diagram showing a drive waveform information storage (4) according to the fourth and fifth embodiments.

FIG. 35 shows a configuration of another drive waveform information storage (4) 11 according to the fourth embodiment. The difference of this drive waveform information storage from the drive waveform information storage (3) 11 shown in FIG. 34 is that the selector 118 has a multiplexing function for concurrent processing of indexed packets thereby to generate a valued packet for an improved processing speed. Numeral 1181 designates a selector for selecting one of the variable values and the constant values VAR1 to VARm output from the variable values memory 111 corresponding to @CP-1 of the packet (index) register 115 and supplies the selected value to L-1 of the packet (numerical value) register 119. Numeral 1183 designates a selector for selecting one of the variable values and the constant values VAR1 to VARm output from the variable values memory 111 corresponding to @CP-2 of the packet (index) register 115 and supplies the selected value to CP-2 of the packet (numerical value) register 119. Numeral 1184 designates a selector for selecting one of the variable values and the constant values VAR1 to VARm output from the variable values memory 111 corresponding to @L-2 of the packet (index) register 115 and supplies the selected value to L-2 of the packet (numerical value) register 119. The output signal Packet (valued) of the packet (numerical value) register 119 makes up an output signal of the drive waveform description units (3) and (4). This output signal is supplied to the drive waveform decoder (3) 14 thereby to decode the actual drive waveform.

(4.2.5) Drive Waveform Decoder (3) of Fourth Embodiment
(4.2.5.1) Configuration of Drive Waveform Decoder (3)

Figure 40:
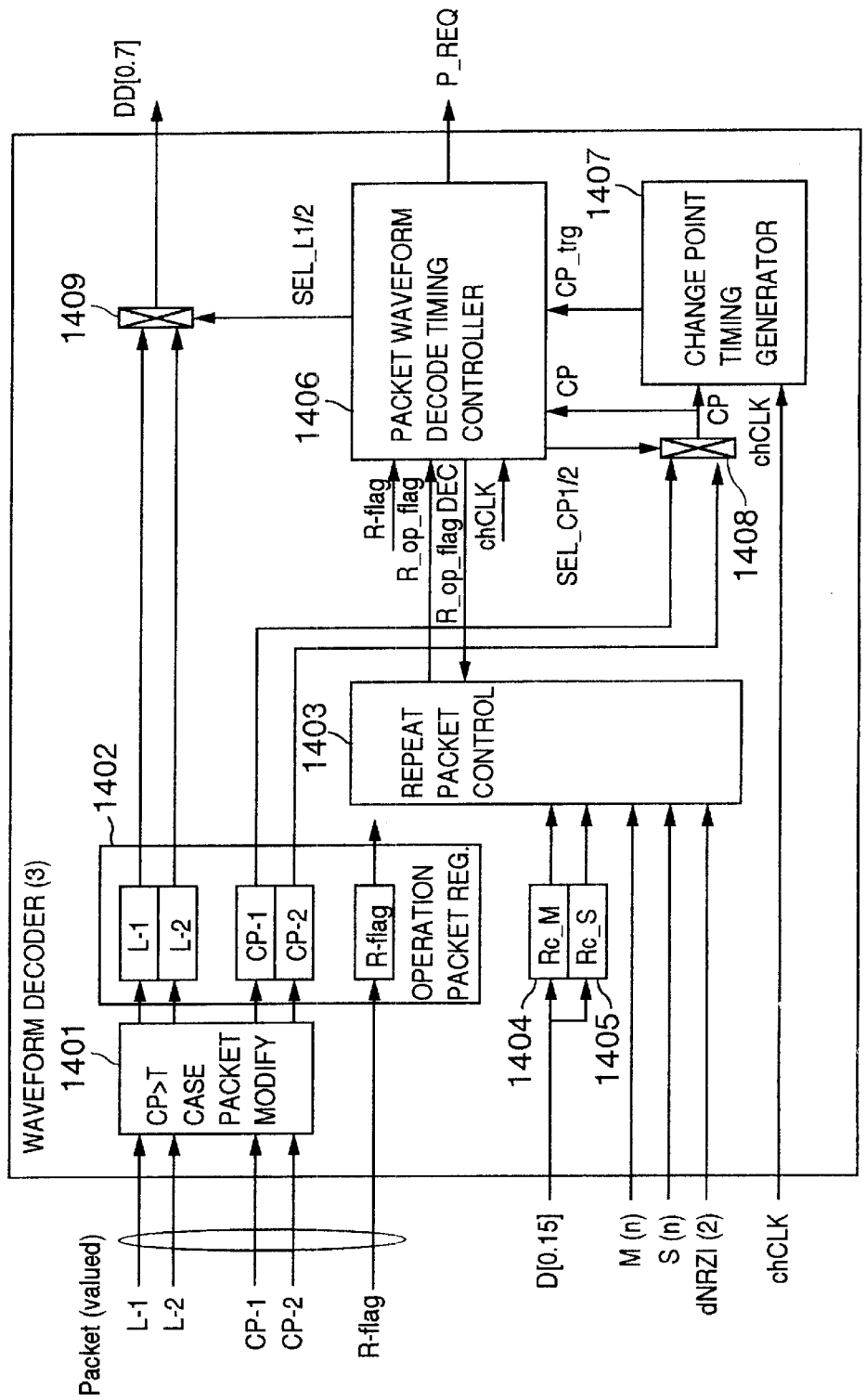
FIG. 40 is a diagram showing the drive waveform decoder (3) according to the fourth and fifth embodiments.

FIG. 40 shows a configuration of the drive waveform decoder (3) 14 according to the fourth embodiment. Numeral 1401 designates packet modifier for correcting the valued packet in the case where CP-2>T, numeral 1402 an operation packet register used for decoding the actual drive waveform, numeral 1403 repeat packet controller for performing the repetitive processing of the repeat packet, numeral 1406 a packet waveform decode timing controller for controlling the operation timing of drive waveform decoding by the drive waveform decoder (3) 14, numeral 1407 a change point timing generator for generating the timing of a change point corresponding to CP-1 and CP-2 of the operation packet register 1402 supplied through the selector 1408, numeral 1409 a selector for outputting by switching the output signals of L-1 and L-2 of the operation packet register 1402 by a control signal SEL_L1/2 supplied from the packet waveform decode timing controller 1406, numeral 1408 a selector for switching the output signal of CP-1, CP-2 of the operation packet register 1402 by a control signal SEL_CP1/2 supplied from the packet waveform decode timing controller 1406 and supplying the resulting signal to the change point timing generator 1407, numeral 1404 a mark repeat constant register for storing constants for calculating the number of repetitions of the mark repeat packet (the packet having an attribute of R-flag=1), and numeral 1405 a space repeat constant register for storing constants for calculating the number of repetitions of the space repeat packet (the packet having an attribute of R-flag=1).

(4.2.5.2) General Operation of Drive Waveform Decoder

Figure 41:
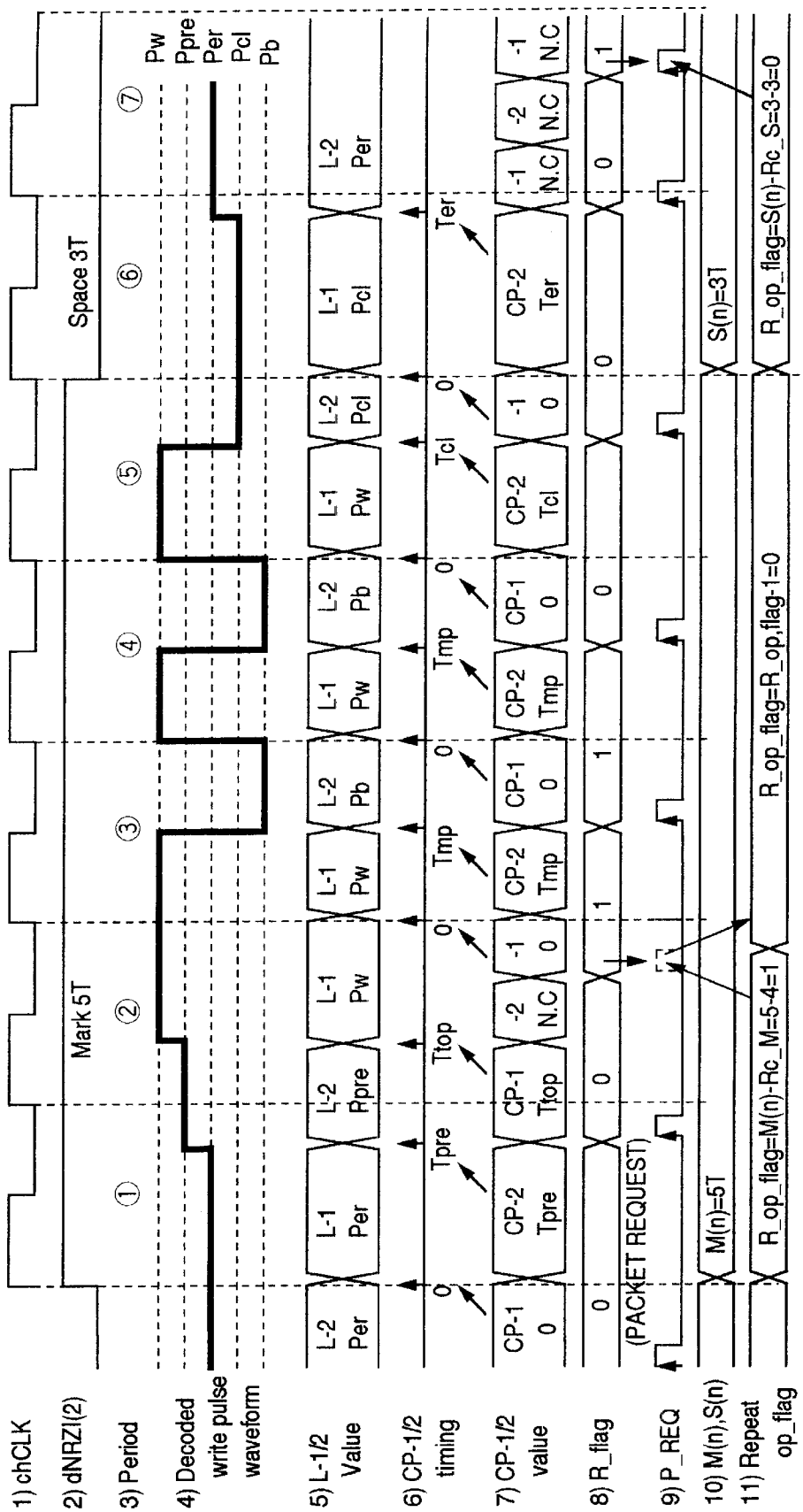
FIG. 41 is a diagram showing the operation timing (1/2) of the drive waveform decoder (3) according to the fourth and fifth embodiments.
Figure 42:
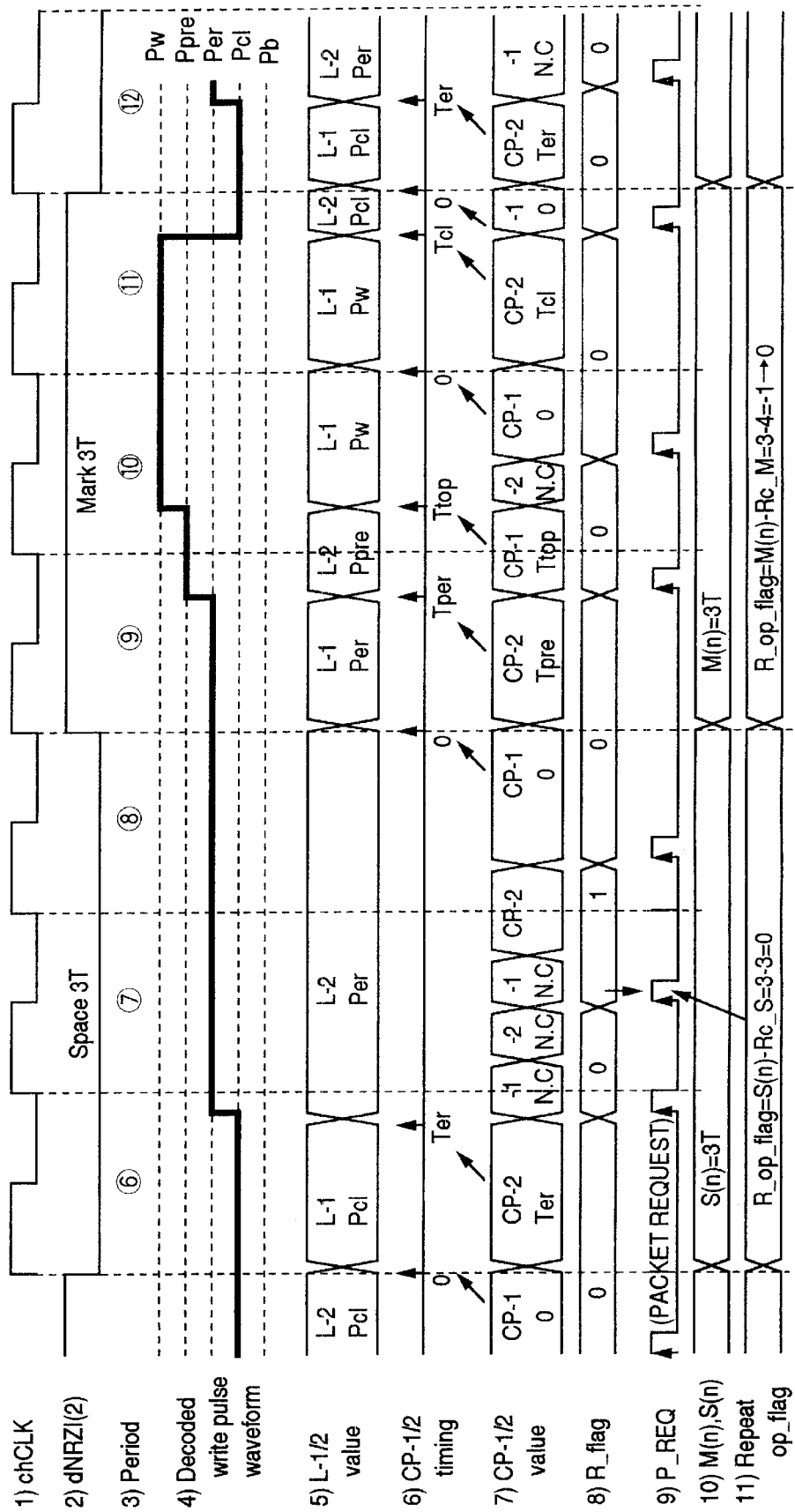
FIG. 42 is a diagram showing the operation timing (2/2) of the drive waveform decoder (3) according to the fourth and fifth embodiments.

FIGS. 41 and 42 show the operation timing of the drive waveform decoder (3) 14 according to the fourth embodiment. This operation timing corresponds to the drive waveform example shown in FIG. 36 and the drive waveform description examples shown in FIGS. 38 and 39. In FIGS. 41 and 42, (1) designates a channel clock chCLK (period T), (2) the dNRZI (2) supplied from the timing generator 4, which is the NRZI signal delayed by a predetermined time, (3) a period, (4) a decoded drive waveform, (5) a level value (L-1 or L-2) output from the selector 1409, (6) the timing of the change point timing signal CP_trg output from the change point timing generator 1407, (7) a value of the change point value (CP-1 or CP-2) signal CP supplied to the change point timing generator 1407 through the selector 1408, (8) the R-flag, (9) a packet request signal P_REQ for the change point timing generator 1407 to request the next packet, (10) the internal storage status of the repeat packet processing unit 1403 for fetching M(n) and S(n) supplied from the mark/space length detector 8 and performing the repeating operation of the repeat packet, and (11) the Repeat_op_flag signal (based on which the packet waveform decode timing controller 1406 outputs the packet request signal P_REQ) output from the repeat packet processing unit 1403 and supplied to the packet waveform decode timing controller 1406.

The valued packet signal Packet (valued) supplied from the drive waveform information storage (3) 11 is corrected (as described in detail later) by the packet modifier 1401 and introduced to the operation packet register 1402. The packet waveform decode timing controller 1406 first supplies CP-1 of the operation packet register to the change point timing generator 1407 through the selector 1408. The change point timing generator 1407 outputs the CP_trg signal at a timing (CP-1 after the starting point of the period T) corresponding to CP-1. The change point timing generator 1407 controls the selector 1409 based on the CP_trg signal corresponding to CP-1 and causes the selector 1409 to output the L-1 signal of the operation packet register 1402. The packet waveform decode timing controller 1406, upon receipt of the CP_trg signal corresponding to CP-1, controls the selector 1408 and supplies CP-2 to the change point timing generator 1407. Upon receipt of the CP_trg signal corresponding to CP-2, the selector 1409 outputs L-2.

The output signal DD[0,7] of the selector 1409 constitutes an output signal of the drive waveform decoder (3) 14. Basically, this single-packet processing is repeated at intervals of 1T thereby to decode the drive waveform.

In the case where the CP-1 value indicates the absence of a change point, the packet waveform decode timing controller 1406 supplies the next C-2 to the change point timing generator 1407. In the case where the CP-2 value indicates the absence of a change point, on the other hand, CP-1 of the next operation packet is supplied to the change point timing generator 1407.

In the case where the repeat flag R_flag of the packet received by the operation packet register 1402 is 0 (no-repeat packet), the packet waveform decode timing controller 1406 outputs a packet request signal P_REQ for requesting the next packet. In the case where the packet of the operation packet register is a repeat packet (R_flag=1) and R_op_flag=0, then P_REQ is output. In the case where R_op_flag is larger than 0, however, the signal P_REQ is not output before the signal R_op_flag becomes 0 but the processing of the operation packet of the operation packet register 1402 is repeated. At the same time, in the case where the signal R_op_flag is larger than 0, the signal R_op_flag_DEC is output to the repeat packet processing means 1403 indicating that the repeat processing is going on, at a timing of outputting P_REQ.

(4.2.5.3) Repeat Packet Processing Unit

Figure 45:
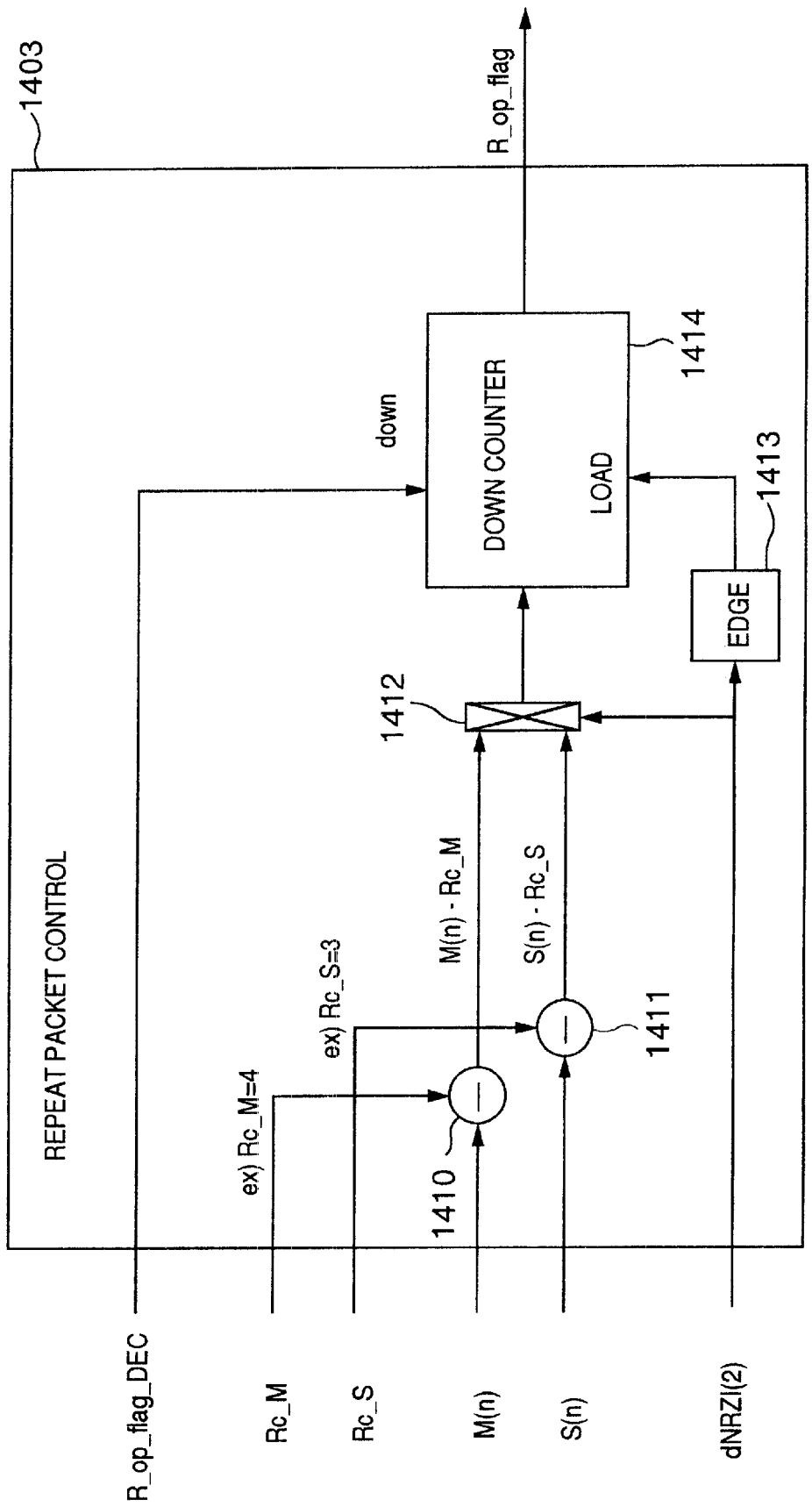
FIG. 45 is a diagram showing a configuration of a repeat packet controller of the drive waveform decoder (3) according to the fourth and fifth embodiments.

FIG. 45 shows a configuration of the repeat packet processing unit 1403. Numeral 1410 designates subtracter for subtracting the output value Rc_M of the mark repeat constant register 1404 from the mark length M(n). Numeral 1411 designates subtracter for subtracting the output value Rc_S of the space constant register 1405 from the space length S(n). Numeral 1412 designates a selector for selecting the output of the subtracter 1410 and the subtracter 1411 by the timing signal dNRZI and supplies the selected signal to a down counter 1414. Numeral 1414 designates the down counter for receiving the output signal of the selector 1412 at the edge of dNRZI, down-counting it by the R_op_flag_DEC signal supplied from the packet waveform decode timing controller 1406, and supplying the resulting output to the packet waveform decode timing controller 1406 as the R_op_flag.

The repeat packet processing unit 1403 controls the repetitive processing of the repeat packet by the packet waveform decode timing controller 1406. In the case of the fourth embodiment (the drive waveform example and the drive waveform description), the repeat packet makes (a-3) repetitions when the mark length M(n)=aT.

In the case of 3T, the number of repetition is 0 (no repeat packet), and in the case of 4T, the number of repetition is 1. Also, when the space length S(n) equals bT, the repeat packet makes (b-3) repetitions. As a result, Rc_M is set to 3 in the mark repeat constant register 1404. In similar fashion, Rc_S is set to 3 in the space constant register 1405. This setting loads the down counter 1414 with a value corresponding to the mark/space at an edge of dNRZI (2) as shown in (11) of FIG. 41. Each time the packet waveform decode timing controller 1406 processes the repeat packet, the signal R_op_flag_DEC is output, so that the value on the down counter 1414 is decremented in accordance with the output signal. Upon complete processing of a predetermined repeat packet, the output signal R_op_flag of the down counter becomes zero, and the packet waveform decode timing controller 1406 stops the repetition of the repeat packet and starts the processing of the next no-repeat packet.

(4.2.5.4) Packet Modifier

In the case where CP-2>T, the packet modifier 1401 corrects the operation packet supplied to the operation packet register 1402 and the succeeding packet, and makes possible the waveform description of CP-2>T, with the result that the memory capacity of the drive waveform description memory 111 is reduced while at the same time increasing the freedom of the drive waveform described and decoded.

Figure 44:
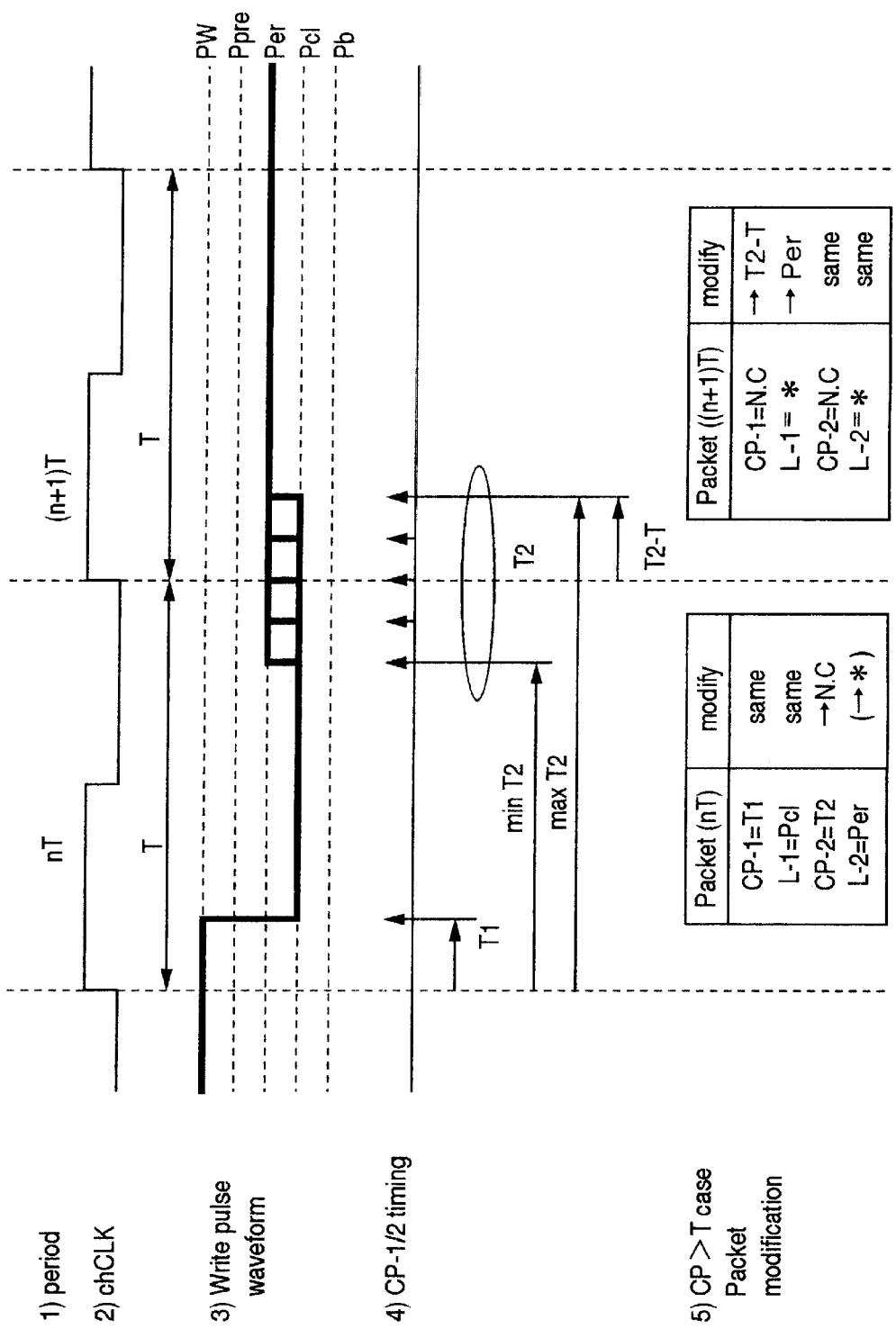
FIG. 44 is a diagram for explaining the operation of the packet modifier of the drive waveform decoder (3) according to the fourth and fifth embodiments.

FIG. 44 shows an operation example of the packet modifier 1401. This example corresponds to the case in which Ter designated by c in FIG. 36 has changed by T or more. In FIG. 44, (1) designates a period with T as a unit, (2) a channel clock chCLK (period T), (3) an example of the drive waveform, (4) the CP_trg signal output from the change point timing generator 1407 as a signal corresponding to CP-1, CP-2, and (5) the contents of the packet before and after processing.

In the shown case, CP-2=T2 of the packet Packet (nT) to be executed during the period nT is changed between the minimum value minT2<T and the maximum value maxT2>T. In the case where T2<T, the packet is not corrected. In the case where T2>T, on the other hand, packets are corrected as follows. CP-2 of the Packet (nT) is corrected to the absence of a change point. And CP-1 of the packet Packet ((n+1)T) to be executed during the period (n+1)T is corrected to the value of T2-T, and L-1 is corrected to the value of L-2 of Packet (nT), i.e. Per in this case. The prerequisite of this correction is to modify Packet ((n+1)T) to at least a packet with CP-1 having no change point. This is the reason of the division into the preceding hold packet (N.C, *, N.C, *, 0) and the preceding hold repeat packet (N.C, *, N.C, *, 1).

Figure 43:
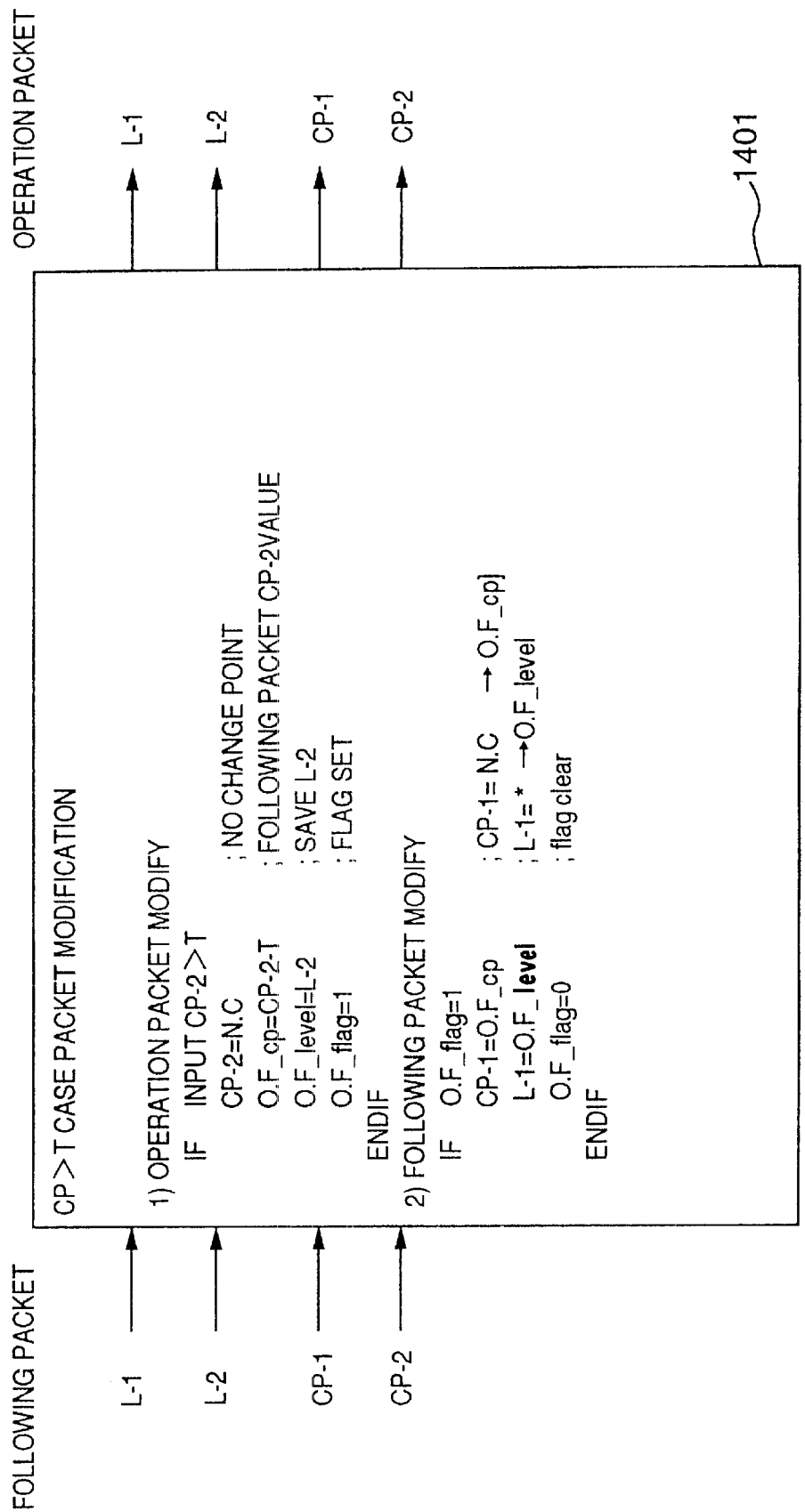
FIG. 43 is a diagram showing the function of the packet modifier of the drive waveform decoder (3) according to the fourth and fifth embodiments.

FIG. 43 shows the processing steps for the packet modifier 1401.

(4.2.5.5) Change Point Timing Generator

The change point timing generator 1407 outputs the timing signal CP_trg corresponding to the timing value CP (change point from the starting point of each period with cycle T) supplied through the selector 1408. The time resolution of CP_trg is T/m.

Figure 46:
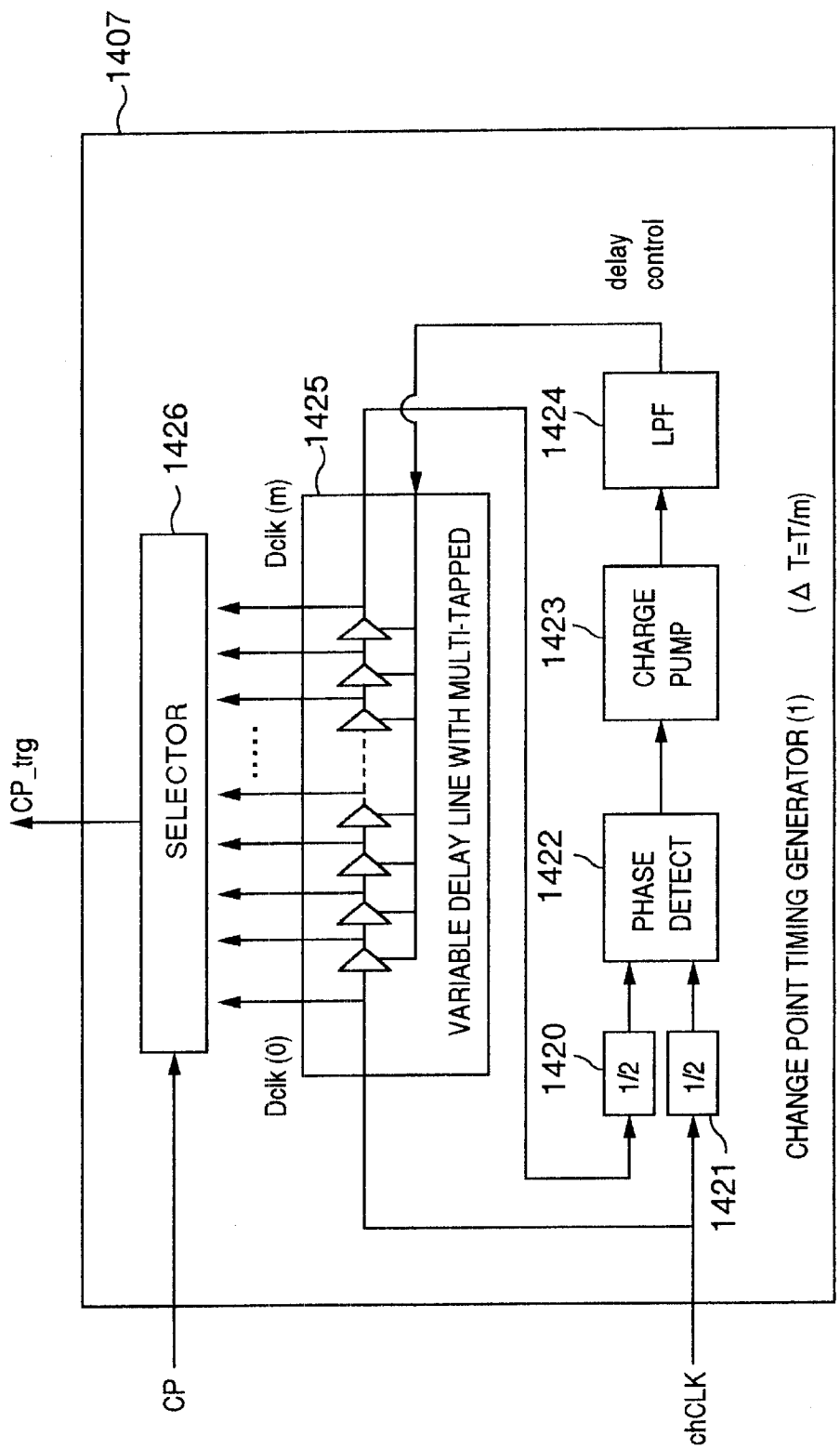
FIG. 46 is a diagram showing a configuration of a change point timing generator of the drive waveform decoder (3) according to the fourth and fifth embodiments.

FIG. 46 shows a configuration of the change point timing generator 1407. Numeral 1421 designates a frequency divider circuit for dividing the channel clock chCLK (period T) into two frequencies, and numeral 1425 a variable delay line with multi-taps for outputting (m+1) signals Dclk(0) to Dclk(m) (including the input signal) each delayed by T/m time with chCLK as an input signal. Numeral 1420 designates a frequency divider circuit for dividing the frequency of the output signal Dclk (m) of the variable delay line with taps into two parts, numeral 1422 a phase detector for detecting the phase difference between the output signals of the frequency divider circuits 1421 and 1420, numeral 1423 a charge pump for generating a DC component corresponding to the detection result of the phase difference, and numeral 1424 a low-pass filter for determining the loop characteristic. The output of the low-pass filter 1424 determines the delay amount of the variable delay line with taps. Numeral 1426 designates a selector for selecting a signal corresponding to CP among the timing signals Dclk (0) to Dclk (m) output from the variable delay line 1424 with taps and outputs the signal CP_trg.

Figure 47:
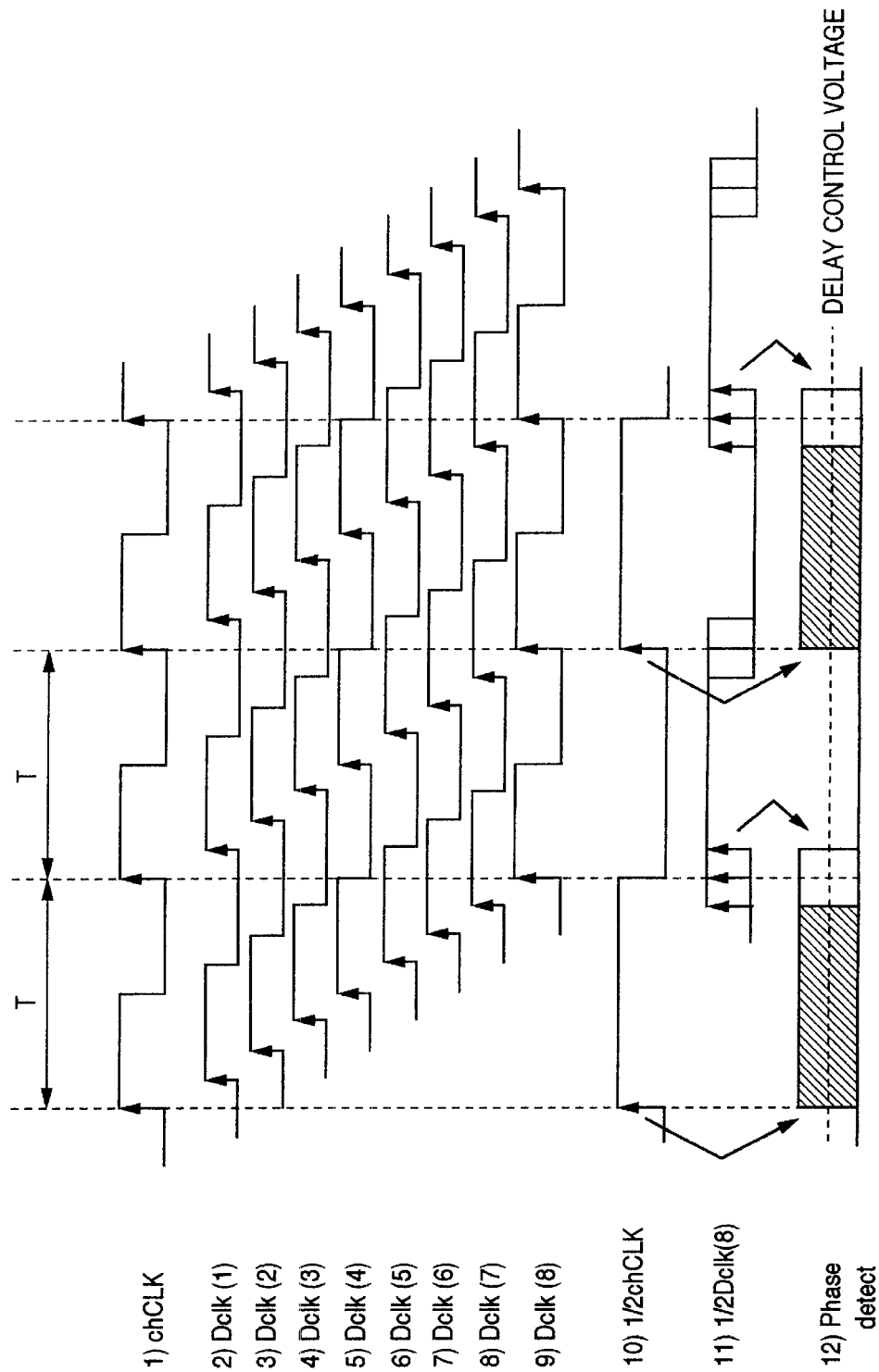
FIG. 47 is a diagram showing the internal operation timing of the change point timing generator of the drive waveform decoder (3) according to the fourth and fifth embodiments.

FIG. 47 shows the operation timing of the change point timing generator. In FIG. 47, m=8 (time resolution T/8), and (1) designates chCLK=Dclk (0); (2) to (9) Dclk (1) to Dclk (8); (10) the output signal of the frequency divider circuit 1421 which divides the chCLK into two frequencies; (11) the output signal of the frequency divider circuit 1420 for dividing Dclk (8) into two frequencies; and (12) the manner in which the output is produced from the phase detection circuit. The component elements of this change point timing generator 1407, except for the selector 1426, constitute what is called a phase locked loop (PLL). As shown in FIG. 47, this PLL delays Cclk (8) by just 1T with respect to the input signal chCLK=Dclk (0), and controls the delay amount of the variable delay line with taps in such a manner that the two signals are in phase with each other. As a result, Cclk (8) is delayed by 1T, and the delay amount of the output signal Dclk (n), (n: 1 to 8) from each intermediate tap is n×(T/8). The selector 1426 selects the signal of Dclk (n) corresponding to the CP value, whereby the timing of the change point can be generated with the time resolution of T/8. The change in the delay amount due to the variations of the delay line or the temperature is corrected by the feedback loop of PLL, and therefore stable division of T by m is possible.

The change point timing generator 1407 is not limited to this configuration, but similar timing can be generated with a PLL configuration in which the output signal Dclk (m) is supplied to the input of the delay line with taps to operate as a variable controlled oscillator (VCO) so that the output signal Dclk (m) is in phase with the chCLK.

In this way, a multiplicity of timing signals having different delay amounts but the same frequency as chCLK are generated and selected as change point timing signals for the following reason. Generally, it is possible in principle to generate these timing signals by generating a clock signal m times higher in frequency than chCLK in a multiplication circuit, counting up using the m-tuple clock, and comparing the resulting signal with the timing signal CP. Nevertheless, the recording/reproduction rate of the optical disk has increased to such an extent that the chCLK frequency is now 30 MHz to 60 MHz. When m is 20, for example, the generation of change point timing signals requires a clock frequency of 600 MHz to 1.2 GHz. Realization of this frequency encounters the problem of the high cost of the operation of the laser drive integrated circuit 27. With the configuration of the timing signal generator 1407 according to this embodiment, the clock frequency required for generating the change point timing is about the same as chCLK and therefore it is possible to realize an inexpensive laser drive integrated circuit 27.

(4.3) Effects of Fourth Embodiment

The fourth embodiment has the following effects, in addition to those of the first embodiment. As compared with the first embodiment which involves 1134 bits (FIG. 18) and the second embodiment which involves 332 bits for description with the index information (FIG. 22) and the partial pattern information (FIG. 21), the waveform description method according to the fourth embodiment permits the control in terms of time axis and level and can reduce the memory size with respect to the first embodiment onwards. Also, a great freedom of waveform description can be allowed with a slight increase of memory size as compared with the second embodiment.

(5) Fifth Embodiment

Now, a fifth embodiment of the invention will be explained.

(5.1) Configuration of Fifth Embodiment

Figure 31:
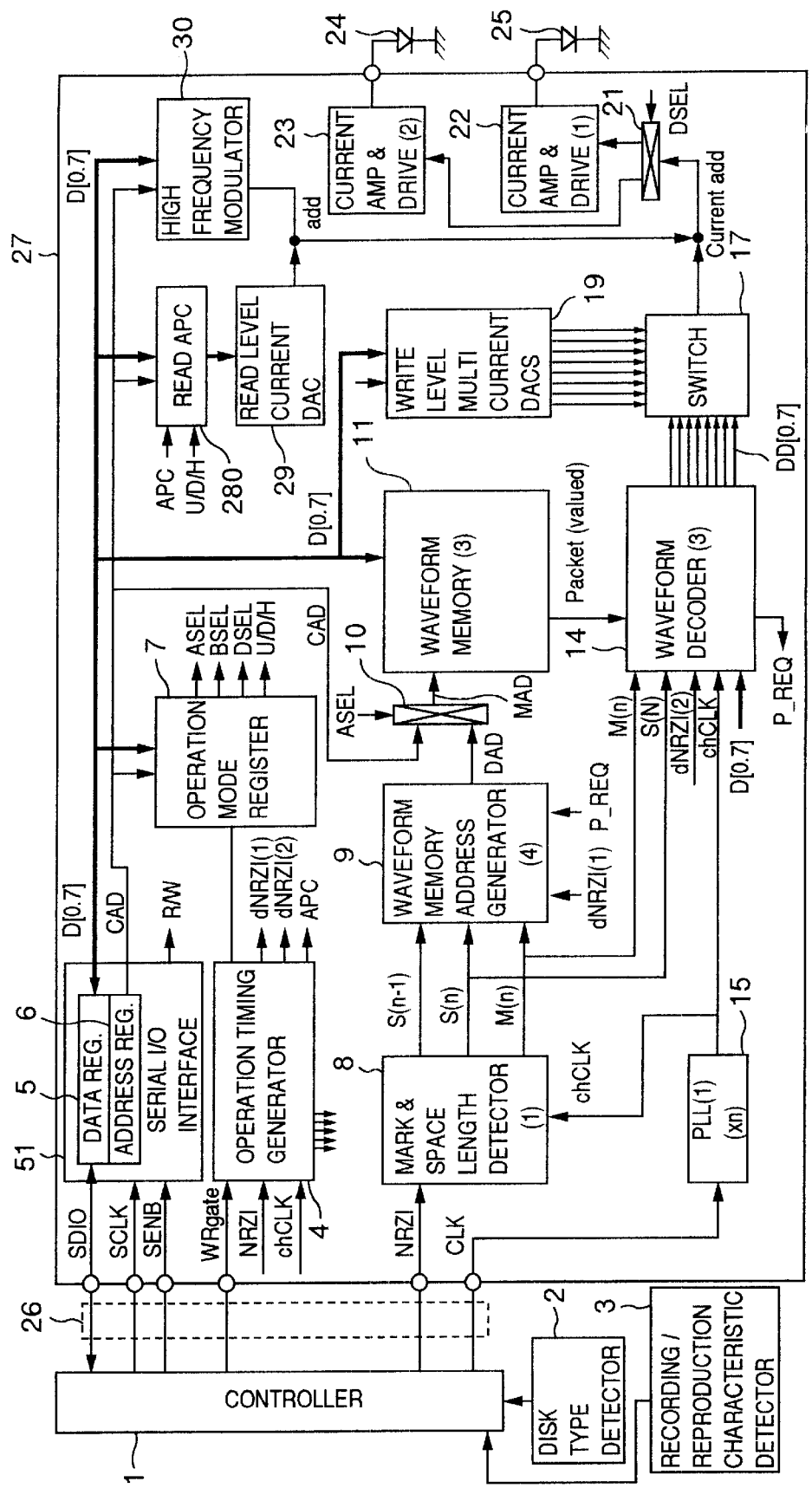
FIG. 31 is a diagram showing a configuration according to a fifth embodiment of the invention.

FIG. 31 shows the configuration of a fifth embodiment of the invention. Those component elements having the same functions as the corresponding component elements in the fourth embodiment are designated by the same reference numerals, respectively. The fifth embodiment is different from the fourth embodiment in that the digital adder 32 and the high-speed current DAC 31 are replaced by a write level multi-current DACs (current setting means) 19 (the same as the first current setting means) for outputting a current value corresponding to each level of the drive waveform by setting from the controller 1, and a read level current DAC (read level current supply means) 29 for outputting a current corresponding to the output value of the auto power controller 32 and the switch 17 for selecting and outputting the output currents of the current setting unit 19 in accordance with the signal DD of the drive waveform decoder (3) 14.

In the case of the drive waveform example shown in FIG. 36, the current setting unit 19 has at least five current output terminals with the output currents thereof settable independently, corresponding to the five-value levels of Pw, Ppre, Per, Pc1 and Pb. The switch 17 is controlled by the output signal DD (L-1 and L-2 of the level signals) of the drive waveform decoder (3) 14 and a current of a corresponding level is output from the switch 17. According to the fourth embodiment, the output signal DD[0,7] of the drive waveform decoder (3) 14 constitutes an input signal of the 8-bit high-speed current DAC, and the DAD[0,7] signal directly corresponds to the drive waveform level. In the fifth embodiment, in contrast, the signal DD[0,m] makes up a select signal for selecting a current corresponding to the level. This signal indirectly corresponds to the level. The 5-value levels, therefore, can be realized only with 3 bits of DD[0,m].

In the fourth embodiment, the variable values and the constant values corresponding to levels L-1, L-2 stored in the variable values memory 111 are 8 bits corresponding to the 8-bit high-speed current DAC 31. According to the fifth embodiment, on the other hand, a 3-bit control code is used for controlling the switch 17. In the fourth embodiment which involves the level variable value of 8 bits and the temporal variable value of 6 bits, the bit width of each variable value and constant value of the variable value memory 111 is 8 bits, i.e. the larger one of the bit widths of the 8-bit level variable value and the 6-bit temporal variable value. In the fifth embodiment, on the other hand, a larger bit width of only 6 bits is sufficient. As a result, the size of the variable value memory 111 of the fifth embodiment is 270 bits (=6 bits×97 words×2 variables×2 tables+6 bits×9 constants) which is 6/8 times smaller than the figure for the fourth embodiment.

The switch 17 selects and outputs five currents input beforehand. It is therefore possible to output a select signal without being affected by the settling time of the DAC unlike in the fourth embodiment.

(5.2) Effects of Fifth Embodiment

As compared with the fourth embodiment, the size of the variable values memory 111 can be reduced to 6/8 and the increased high-speed requirement of the drive waveform can be met at the same time.

It will thus be understood from the foregoing description that according to the present invention, the recording strategy can be changed according to the variations and fluctuations of the recording media and the characteristics of the recording media, while at the same time reducing the number of signal lines for flexible wiring and alleviating the effect of signal distortion.

What is claimed is:

1. A laser driver integrated circuit (IC), comprising:
an input terminal arranged to receive an input signal supplied from an external control circuit;
a drive waveform generating unit which generates a drive waveform signal based on the input signal supplied through the input terminal;
a first current supply unit which supplies a first drive current to a first laser diode;
a second current supply unit which supplies a second drive current to a second laser diode; and
a switching unit disposed between the drive waveform generating unit and the respective first and second current supply units, which selectively supplies the drive waveform signal generated by the drive waveform generating unit to one of the first current supply unit and the second current supply units,
wherein the drive waveform generating unit is commonly used by the first and second laser diodes.

2. A laser driver integrated circuit (IC) according to claim 1, wherein the drive waveform generating unit includes a drive waveform information storage unit which stores a recording strategy according to a type of disk.

3. An optical disk apparatus comprising:
a first laser diode used for recording data on a first type of optical disk or reproducing data from the first type of optical disk;
a second laser diode used for recording data on a second type of optical disk or reproducing data from the second type of optical disk;
a controller used for controlling the operation of the first and second laser diodes; and
a laser driver integrated circuit (IC) arranged to drive the first and second laser diodes based on an input signal from the controller, said laser driver IC comprising:
a drive waveform generating unit for generating a drive waveform signal based on the input signal from the controller;
a first current supply unit for supplying a first drive current to the first laser diode;
a second current supply unit for supplying a second drive current to the second laser diode; and
a switching unit disposed between the drive waveform generating unit and the respective first and second current supply units, for selectively supplying the drive waveform signal generated by the drive waveform generating unit to one of the first and second supply units.

4. An optical disk apparatus as claimed in claim 3, wherein the drive waveform generating unit includes a drive waveform memory for storing a recording strategy according to a type of optical disk.

5. An optical disk apparatus as claimed in claim 3, wherein the drive waveform generating unit comprises:
a drive waveform information storage unit for storing at least information of a drive waveform for driving a selected one of the first and second laser diodes in accordance with a recording signal to be recorded on the optical disk;
a decoder for decoding the drive waveform based on the drive waveform information stored in the drive waveform information storage unit; and
an addressing generator for selecting the drive waveform information stored in the drive waveform information storage unit based on a mark length and an adjacent space length of the recording signal to be recorded on the optical disk.

6. An optical disk apparatus as claimed in claim 5, wherein the drive waveform information storage unit stores the drive waveform information as drive waveform information described based on:
a level L of the drive waveform, the level L representing a recording power of the selected one of the first and second laser diodes; and
a number of repetitions of the level L in units of a time period (T/2) which is a minimum time period after which the level L of the drive waveform is permitted to change.

7. An optical disk apparatus as claimed in claim 5, wherein the drive waveform information storage unit stores the drive waveform information as drive waveform information described by a series of packets of drive waveform information {(L1n, L2n, RLn), n: 0 to n}, each of the packets including:
a level L1 of the drive waveform during a time period (T/2) which is a minimum time period after which a level of the drive waveform is permitted to change, the level of the drive waveform representing a recording power of the selected one of the first and second laser diodes,
a level L2 of the drive waveform during a time period (T/2) succeeding the time period (T/2) during which the level of the drive waveform is L1, and
a number of repetitions of a set of the time period (T/2) during which the level of the drive waveform is L1 and the succeeding time period during which the level of the drive waveform is L2.

8. An optical disk apparatus as claimed in claim 5, wherein the drive waveform information storage unit stores the drive waveform information as drive waveform information described by a series of sets of drive waveform information, each of the sets including:

timing information of a level change point at which a level L of the drive waveform changes, the level L representing a recording power of the selected one of the first and second laser diodes; and the level L of the drive waveform after the level change point.

9. An optical disk apparatus as claimed in claim 5, wherein the decoder decodes the drive waveform in units of packets, and replaces the number of a predetermined packet with a value calculated based on a mark length or a space length detected from the recording signal.

10. An optical disk apparatus as claimed in claim 5, further comprising a detector arranged to detect recording and reproduction characteristics of an optical disk, including drive waveform information based on detected recording and reproduction characteristics.

11. A laser driver integrated circuit (IC) comprising:

a drive waveform generating unit which generates a drive waveform signal based on an input signal from an external control circuit;

a first current supply unit which supplies a first drive current to a first laser diode based on the drive waveform signal;

a second current supply unit which supplies a second drive current to a second laser diode based on the drive waveform signal; and a switching unit disposed between the drive waveform generating unit and the respective first and second current supply units, which selectively supplies the drive waveform signal to one of the first current supply unit and the second current supply unit, wherein the drive waveform generating unit is commonly used by the first and second laser diodes.

12. A laser driver IC as claimed in claim 11, wherein the drive waveform generating unit includes a drive waveform memory for storing a recording strategy according to a type of optical disk.

13. A laser driver IC as claimed in claim 11, wherein the drive waveform generating unit comprises:

a drive waveform information storage unit for storing at least information of a drive waveform for driving a selected one of the first and second laser diodes in accordance with a recording signal to be recorded on the optical disk;

a decoder for decoding the drive waveform based on the drive waveform information stored in the drive waveform information storage unit; and an addressing generator for selecting the drive waveform information stored in the drive waveform information storage unit based on a mark length and an adjacent space length of the recording signal to be recorded on the optical disk.

14. A laser driver IC as claimed in claim 11, wherein the decoder decodes the drive waveform in units of packets, and replaces the number of a predetermined packet with a value calculated based on a mark length or a space length detected from the recording signal.

15. An optical disk apparatus comprising:

a first laser diode used for recording data on a first type of optical disk or reproducing data from the first type of optical disk;

a second laser diode used for recording data on a second type of optical disk or reproducing data from the second type of optical disk;

a controller used for controlling the operation of the first and second laser diodes; and a laser driver integrated circuit (IC) arranged to drive the first and second laser diodes based on an input signal from the controller, said laser driver IC comprising:

a drive waveform generating unit for generating a drive waveform signal based on the input signal from the controller;

a first current supply unit for supplying a first drive current to the first laser diode; and a second current supply unit for supplying a second drive current to the second laser diode; and a switching unit disposed between the drive waveform generating unit and the respective first and second current supply units, for selectively supplying the drive waveform signal generated by the drive waveform generating unit to one of the first and second supply units.

16. An optical disk apparatus as claimed in claim 15, wherein the drive waveform generating unit includes a drive waveform memory for storing a recording strategy according to a type of optical disk.

17. An optical disk apparatus as claimed in claim 15, wherein the drive waveform generating unit comprises:

a drive waveform information storage unit for storing at least information of a drive waveform for driving a selected one of the first and second laser diodes in accordance with a recording signal to be recorded on the optical disk;

a decoder for decoding the drive waveform based on the drive waveform information stored in the drive waveform information storage unit; and an addressing generator for selecting the drive waveform information stored in the drive waveform information storage unit based on a mark length and an adjacent space length of the recording signal to be recorded on the optical disk.

18. An optical disk apparatus as claimed in claim 17, wherein the drive waveform information storage unit stores the drive waveform information as drive waveform information described based on:

a level L of the drive waveform, the level L representing a recording power of the selected one of the first and second laser diodes; and a number of repetitions of the level L in units of a time period (T/2) which is a minimum time period after which the level L of the drive waveform is permitted to change.

19. An optical disk apparatus as claimed in claim 17, wherein the decoder decodes the drive waveform in units of packets, and replaces the number of a predetermined packet with a value calculated based on a mark length or a space length detected from the recording signal.

20. An optical disk apparatus as claimed in claim 17, further comprising a detector arranged to detect recording and reproduction characteristics of an optical disk, including drive waveform information based on detected recording and reproduction characteristics.

* * * * *